(12) United States Patent
Onishi

(10) Patent No.: US 8,297,825 B2
(45) Date of Patent: Oct. 30, 2012

(54) SURFACE LIGHT SOURCE DEVICE

(75) Inventor: Toshiki Onishi, Osaka (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 12/933,292

(22) PCT Filed: Jan. 28, 2009

(86) PCT No.: PCT/JP2009/000331
§ 371 (c)(1),
(2), (4) Date: Sep. 17, 2010

(87) PCT Pub. No.: WO2009/116224
PCT Pub. Date: Sep. 24, 2009

(65) Prior Publication Data
US 2011/0026270 A1 Feb. 3, 2011

(30) Foreign Application Priority Data

Mar. 19, 2008 (JP) .................. 2008-072582
Aug. 6, 2008 (JP) .................. 2008-203165

(51) Int. Cl.
*F21V 9/04* (2006.01)
(52) U.S. Cl. ............... 362/607; 362/611; 362/612
(58) Field of Classification Search ............. 362/607, 362/612, 609
See application file for complete search history.

(56) References Cited

U.S. PATENT DOCUMENTS

| 6,036,340 | A | * | 3/2000 | Fohl et al. ............ 362/511 |
| 6,601,962 | B1 | | 8/2003 | Ehara et al. |
| 2003/0063458 | A1 | | 4/2003 | Chien et al. |
| 2006/0209563 | A1 | | 9/2006 | Hirota et al. |

FOREIGN PATENT DOCUMENTS

| JP | 9-507584 | 7/1997 |
| JP | 2000-156103 | 6/2000 |
| JP | 2001-345008 | 12/2001 |
| JP | U 3084161 | 12/2001 |
| JP | 2002-169480 | 6/2002 |
| JP | 2002-175713 | 6/2002 |
| JP | 2002-324422 | 11/2002 |
| JP | 2006-331683 | 12/2006 |
| WO | WO 94/20871 | 9/1994 |

* cited by examiner

*Primary Examiner* — Evan Dzierzynski
(74) *Attorney, Agent, or Firm* — Hamre, Schumann, Mueller & Larson, P.C.

(57) ABSTRACT

A surface light source device from which large planar light with a uniform light intensity distribution can be obtained from spot-like laser light. The surface light source device (100) comprises a laser light source (110) for emitting the laser light, an optical system including one or more reflective diffusion members (120), and an optical waveguide (130) combined with the optical system for converting the reflected and diffused laser light into the planar light and emitting from a principal plane. The reflective diffusion member (120) converts the laser light emitted from the laser light source (110) into linear light having an arcuate radiation pattern.

20 Claims, 43 Drawing Sheets

SURFACE LIGHT SOURCE DEVICE

TECHNICAL FIELD

The present invention relates to a planar light source apparatus that emits a planar light. More particularly, the present invention relates to a planar light source apparatus that generates a planar light from a laser light source.

BACKGROUND ART

Recently, liquid crystal display apparatuses (i.e. liquid crystal displays ("LCDs")) are spreading as display apparatuses for various electronic equipment such as personal computers, mobile terminals and television displays. Liquid crystal display apparatuses are non-self-luminous display apparatuses, and therefore need to have a planar light source apparatus (hereinafter "light source apparatus") in addition to a liquid crystal display element. The planar light source apparatus is demanded to provide a wider color reproduction area, reduced activation time and higher efficiency, and furthermore is demanded to be made thinner. Therefore, a planar light source apparatus (i.e. laser backlight) using a laser light source is gaining popularity.

A laser light generated in a laser light source is a spot light with strong directivity. Accordingly, in case where a laser light source is used in a planar light source apparatus, a technique of converting this laser light, which is a spot light, into a planar light, is required. For example, Patent Document 1 and Patent Document 2 disclose a planar light source apparatus using a laser light source.

FIG. 1 is a perspective view showing a configuration of the planar light source apparatus disclosed in Patent Document 1.

Planar light source apparatus 10 shown in FIG. 1 has laser light source 20, reflecting member 30 and deflecting member 40. Reflecting member 30 has film 33 arranging a plurality of reflection-type volume holograms in one plane of base material 32, and deflects laser light 21 incident on this plane at a high angle of incidence, toward a direction virtually vertical to the end surface of deflecting member 40. By this means, reflecting member 30 widens a laser light in one dimension, converts the laser light into linear lights, and allows the converted linear lights to be incident on deflecting member 40. Deflecting member 40 allows the incident light to propagate inside by light guiding body 42, to deflect on a plurality of half mirrors 43 and to be emitted from portions of the main surface. Thus, planar light source apparatus 10 can generate a planar light from a laser light source.

FIG. 2 is a perspective view showing a configuration of a planar light source apparatus disclosed in Patent Document 2.

Planar light source apparatus 50 shown in FIG. 2 has laser light source 60, reflecting part 70 and light guiding plate 80, Reflecting part 70 has a plurality of triangular prism shapes 71 in one plane, and deflects a laser light incident diagonally on this is plane at a high angle of incidence, in a direction virtually vertical to the end surface of light guiding plate 80. By this means, reflecting part 70 widens a laser light in one dimension, converts the light into linear lights and allows the converted linear lights to be incident on light guiding plate 80. Light guiding plate 80 deflects the incident light by a plurality of grooves 81 provided in the main surface of light guiding plate 80 and emits the lights from portions of its main surface. In this way, planar light source apparatus 50 can generate a planar light from a laser light source.

Patent Document 1: Japanese Patent Application Laid-Open No. 2002-169480

Patent Document 2: Japanese Patent Application Laid-Open No. 2001-345008

DISCLOSURE OF INVENTION

Problems to be Solved by the Invention

However, in recent years, screens are being made larger in the field of television displays, and planar light source apparatuses used in these displays are also made larger. If the main surface to emit a planar light becomes larger, the planar light source apparatus needs to convert a light into linear lights of a longer width and is required to provide a more uniform distribution of light intensity.

However, with the planar light source apparatuses disclosed in Patent Document 1 and Patent Document 2, it is difficult to have a planar light of a uniform distribution of light intensity while coping with the trend of making larger displays. The reason is as follows. In order to have a large planar light of a uniform distribution of light intensity in the planar light source apparatus disclosed in Patent Document 1 and Patent Document 2, it is possible to use laser lights of a large beam diameter. However, the optical path for a laser light needs to be secured between reflecting member 30 or reflecting part 70 and deflecting member 40 or light guiding plate 80, and therefore there is limitation in widening the beam diameter. Further, with the planar light source apparatus disclosed in Patent Document 2 in particular, although it is possible to increase the angle of divergence of a laser light, a wide optical path needs to be secured for the laser light in proportion to the increase in the emission angle, and therefore there is a limitation as in the case of widening the beam diameter. Additionally, in this case, a magnifying optical system for increasing the angle of divergence of a laser light is additionally required in the laser light source.

That is, if the planar light source apparatuses disclosed in Patent Document 1 and Patent Document 2 try to have a planar light of a uniform distribution of light intensity while coping with the trend of making larger displays, this makes the overall size of apparatuses larger. Accordingly, it is difficult to apply these planar light source apparatuses to large displays that are demanded to make the screens larger while the whole apparatuses are demanded to be made smaller and thinner.

Therefore, another method of significantly increasing the angle of incidence of a laser light is possible. However, in order to provide a uniform distribution of light intensity, hologram elements or triangular prism shapes need to be arranged at substantially fine pitches, and there is limitation in making the pitches fine.

It is therefore an object of the present invention to provide a planar light source apparatus that can have a planar light of a wide and uniform distribution of light intensity from a laser light which is a spot light.

Means for Solving the Problem

The planar light source apparatus according to the present invention employs a configuration which includes: a laser light source that emits a laser light; an optical system that has at least one or more reflection-type diffusing members that make the light undergo reflected diffusion; a light guiding plate that is combined with the optical system to convert the reflected and diffused laser light to emit from a main surface, and in which the at least one reflection-type diffusing member converts the laser light emitted from the laser light source into linear lights having an arcuate radiation pattern.

Advantageous Effects of Invention

According to the present invention, linear lights are acquired by radiating a laser light from a laser light source by reflected diffusion, so that it is possible to have a planar light of a wide and uniform distribution of light intensity from a laser light which is a spot light.

BEST MODE FOR CARRYING OUT THE INVENTION

Figure 1:
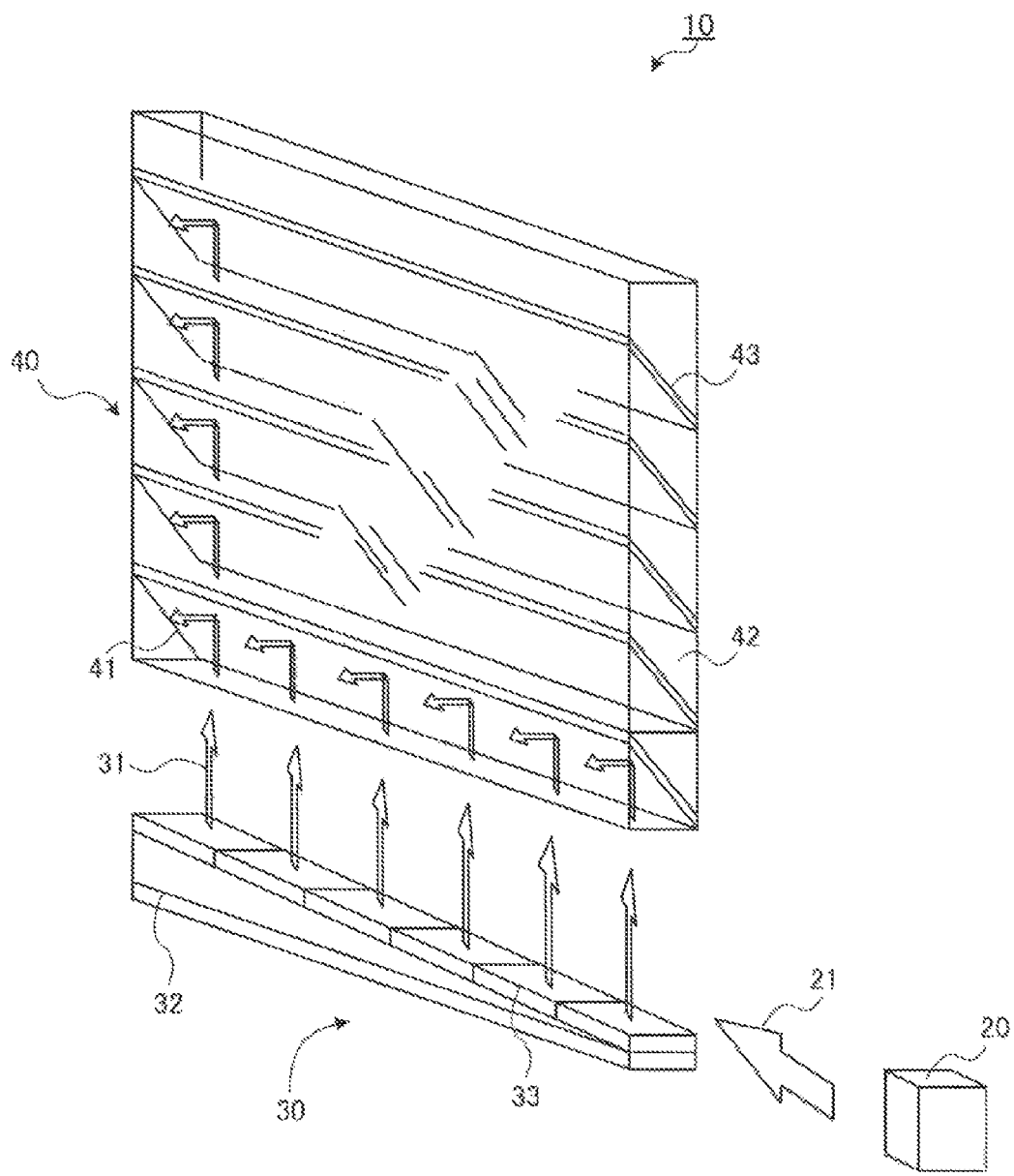
FIG. 1 is a perspective view showing a configuration of a conventional planar light source apparatus.
Figure 2:
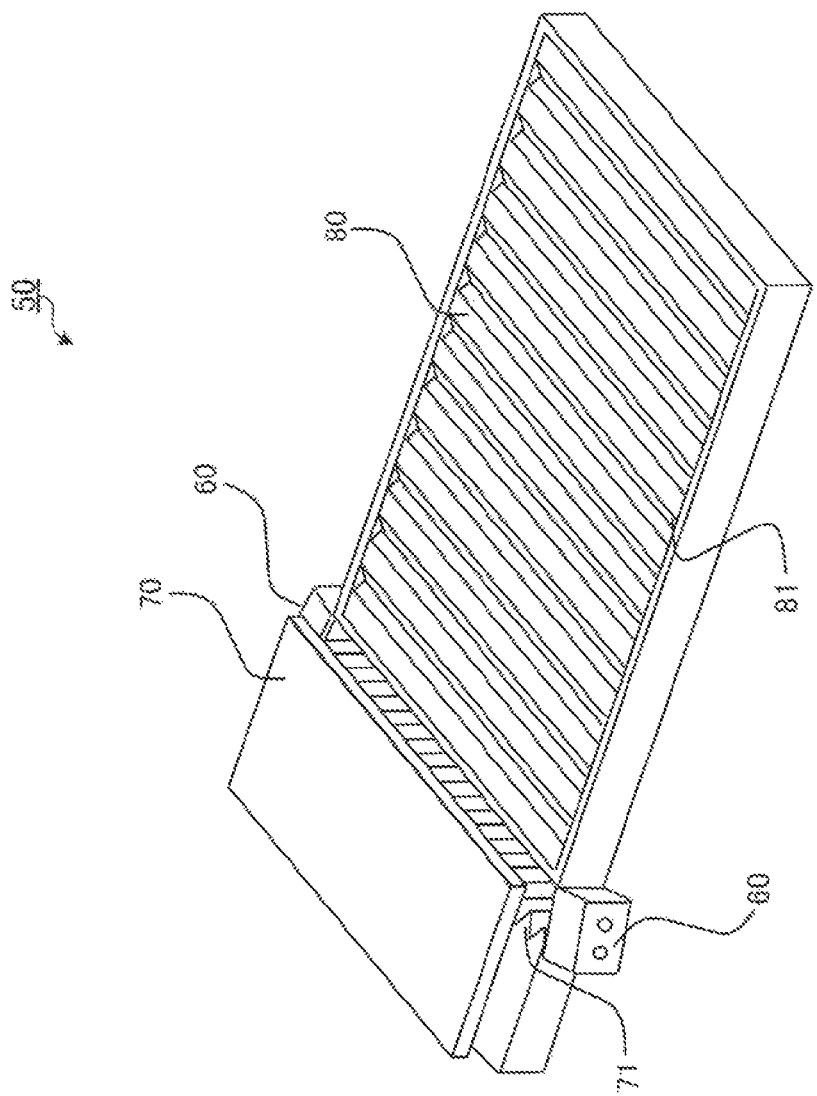
FIG. 2 is a perspective view showing a configuration of another conventional planar light source apparatus.

Hereinafter, embodiments of the present invention will be explained in detail with reference to the accompanying drawings. In the drawings, the same components will be assigned the same reference numerals and will not be repeatedly explained.

(Embodiment 1)

Figure 3:
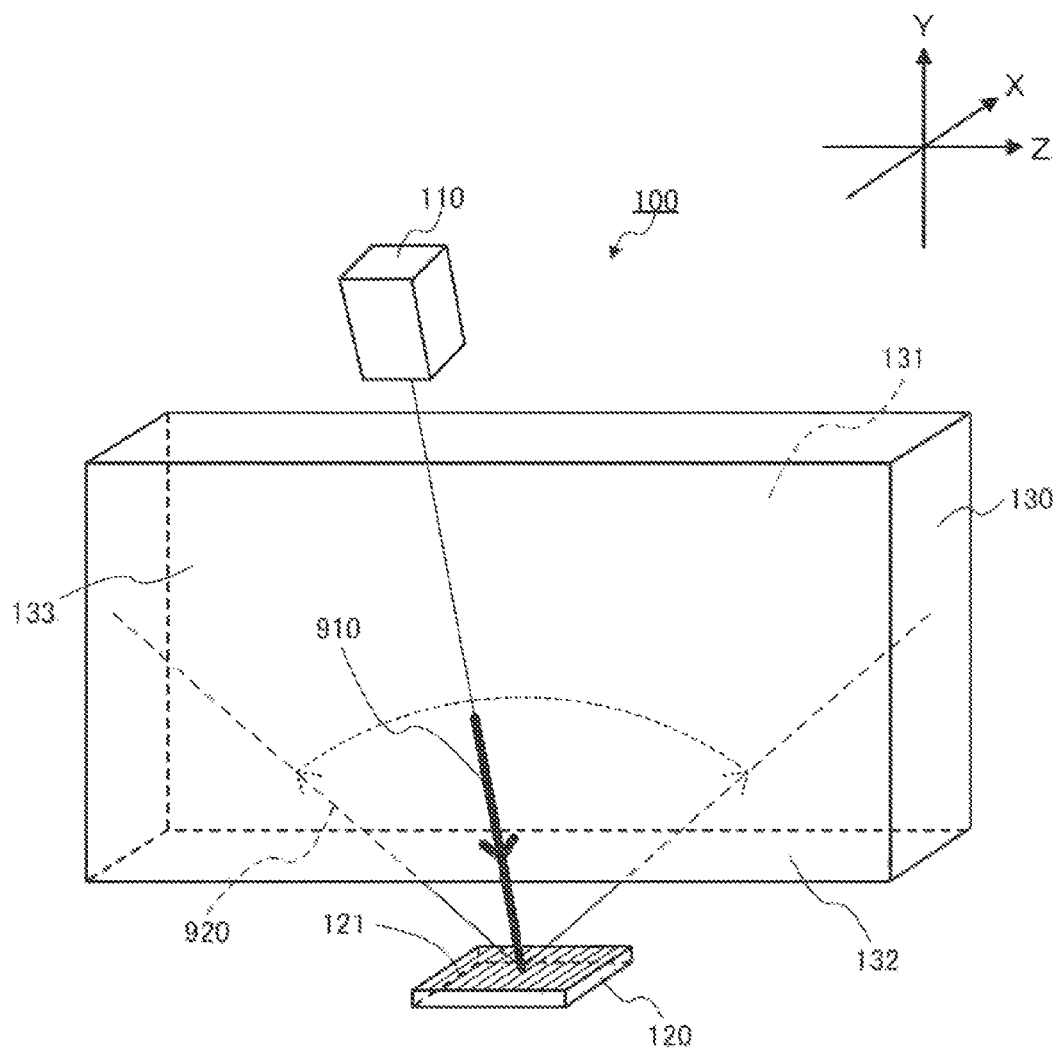
FIG. 3 is a perspective view showing a configuration of a planar light source apparatus according to Embodiment 1 of the present invention.

FIG. 3 is a perspective view showing a configuration of a planar light source apparatus according to Embodiment 1 of the present invention.

As shown in FIG. 3, planar light source apparatus 100 according to Embodiment 1 has laser light source 110, reflection-type diffusing plate 120 and light guiding plate 130.

For ease of explanation, assume that main surface 131 (hereinafter "emission surface") of light guiding plate 130 that emits a planar light is orthogonal to end surface 132 (hereinafter "first end surface") on which linear lights are incident according to the present embodiment. Further, the normal direction of emission surface 131 is the X axis, the normal direction of first end surface 132 is the Y axis and the direction orthogonal to the X axis and the Y axis is the Z axis. Further, the emission surface 131 side of light guiding plate 130 where the observer is present is appropriately referred to as "observer side," and the side opposite to the observer side of light guiding plate 130 is appropriately referred to "back side."

With planar light source apparatus 100, laser light source 110 is arranged on the back side of light guiding plate 130, and reflection-type diffusing plate 120 is arranged such that diffusing plate reflection surface 121 (described later) faces first end surface 132 of light guiding plate 130. Note that laser light source 110 can be positioned and oriented differently as long as a laser light can be made finally incident on diffusing plate reflecting surface 121 of reflection-type diffusing plate 120 by combining laser light source 110 with various optical elements. Hereinafter, laser light source 110 will not be shown appropriately in each figure.

Laser light source 110 generates red, blue and green laser lights by a semiconductor laser diode ("LD") and a second-harmonic generation ("SHG") apparatus (not shown). Then, laser light source 110 generates a white laser light by mixing generated laser lights of various colors by, for example, a dichroic prism (not shown), and allows the generated white laser light to be incident on reflection-type diffusing plate 120 from predetermined incident direction 910.

Reflection-type diffusing plate 120 reflects a laser light incident from predetermined incident direction 910, on diffusing plate reflection surface 121, and allows the reflected lights (hereinafter "diffusely-reflected lights") to be incident on first end surface 132 of light guiding plate 130. To be more specific, reflection-type diffusing plate 120 radiates a laser light in an arcuate pattern such that the laser light is widened in the Z axis direction, by diffusing the laser light while reflecting the laser light (hereinafter "reflected diffusion"), and emits lights as linear lights in emission directions 920 of the radial pattern. The configuration of reflection-type diffusing plate 120 will be described later.

Light guiding plate 130 is made of an optically transparent resin of a rectangular flat shape, with a rectangular cross-section, and fine concave-convex structures (not shown) are formed in surface 133 (hereinafter "back surface") facing emission surface 131. Light guiding plate 130 allows linear lights incident from first end surface 132 to propagate while being reflected inside. Further, the concave-convex structures of emission surface 131 or back surface 133 of light guiding plate 130 deflect the lights propagating inside, toward emission surface 131, and converts the lights into a planar light to be emitted from emission surface 131. To reduce leak of lights from surfaces other than emission surface 131, light guiding plate 130 arranges, in the surfaces other than the emission surface, reflecting members (not shown) that reflect lights from the inside of light guiding plate 130 and returns the lights to the inside of light guiding plate 130. The diffusely-reflected lights incident from reflection-type diffusing plate 120 are lights diffused in a radial pattern as described above, and therefore lights propagating inside travel in random directions, so that the distribution of light intensity of the planar light to emitted from emission plane 131 becomes uniform.

Note that a scattering light guiding body including material to scatter lights inside may be used as light guiding plate 130. By changing the concentration of scattering material from portion to portion, it is possible to have a desired diffusing pattern.

This planar light source apparatus 100 acquires diffusely-reflected lights by radiating a laser light in an arcuate pattern, from laser light source 110 by reflected diffusion, so that it is possible to have a planar light of a wide and uniform distribution of light intensity from a laser light which is a spot light. Further, reflection-type diffusing plate 120 which is an optical component having a simple configuration is used, so that it is possible to have the above planar light with a simple configuration.

Next, the detailed configuration of reflection-type diffusing plate 120 will be explained.

In diffusing plate reflecting surface 121 of reflection-type diffusing plate 120, a plurality of fine groove structures are formed extending in parallel to the X axis direction. Individual groove structures are formed with convex parts projecting from diffusing plate reflecting surface 121, or concave parts denting in diffusing plate reflecting surface 121. Further, these convex parts or concave parts have, for example, a polygonal cross-section or an arcuate cross-section. The cross-sectional shape of the groove structures of diffusing plate reflecting surface 121 includes at least a plane which is not parallel to the reference plane of diffusing plate reflecting surface 121, and this plane defines a shape that allows a laser light from laser light source 110 to radiate in an arcuate pattern in the Z axis direction by reflected diffusion. Here, various specific examples of the groove structures will be explained with reference to the accompanying drawings.

Figure 4:
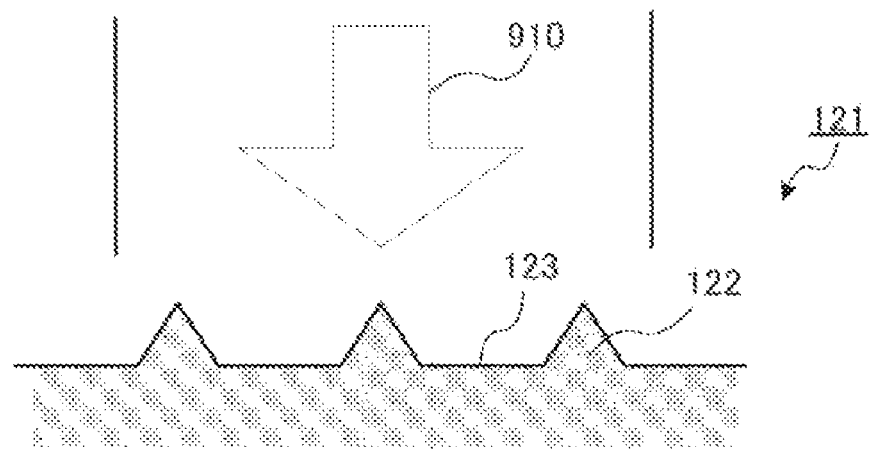
FIG. 4 is a main part cross-sectional view showing a first example of groove structures provided in a reflection-type diffusing plate according to Embodiment 1.

FIG. 4 is a main part cross-sectional view enlarging the cross-section when the first example of the groove structures provided in reflection-type diffusing plate 120 is cut in the Y-Z plane.

As shown in FIG. 4, a plurality of groove structures 122 with a triangular cross-sectional shape which projects from diffusing plate reflecting surface 121 and which has a plane inclined with respect to diffusing plate reflecting surface 121, are formed in diffusing plate reflecting surface 121. Further, flat portions 123 are formed between adjacent groove structures 122. A laser light incident on a portion of groove structure 122 is deflected toward the Z axis direction by the inclined surface of groove structure 122. As a result, even though the laser light incident on reflection-type diffusing plate 120 is a parallel light, diffusely-reflected lights are radiated in an arcuate pattern.

Figure 5:
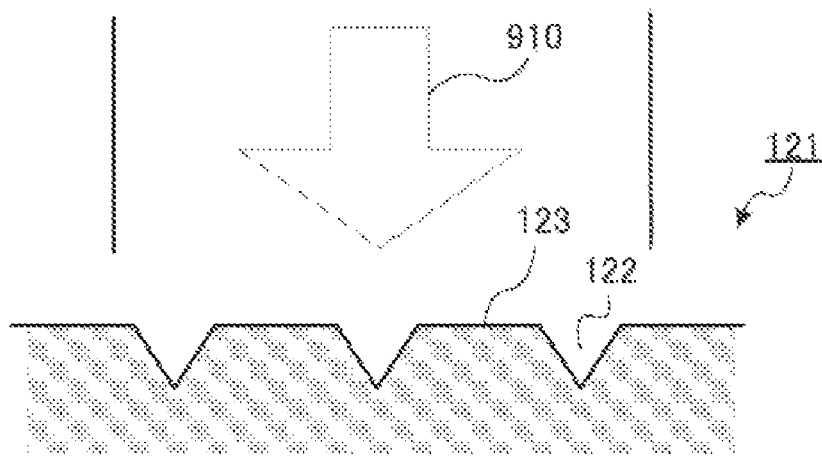
FIG. 5 is a main part cross-sectional view showing a second example of groove structures provided in a reflection-type diffusing plate according to Embodiment 1.

FIG. 5 is a main part cross-sectional view showing a second example of groove structures provided in reflection-type diffusing plate 120, and corresponds to FIG. 4.

In diffusing plate reflecting surface 121 shown in FIG. 5, groove structures 122 of a cross-sectional shape of a reverse triangle that is denting in diffusing plate reflecting surface 121 are formed. These groove structures 122 with a cross-sectional shape of a reverse triangle can deflect a laser light from laser light source 110, in the Z axis direction by reflected diffusion, and radiate it in an arcuate pattern.

Groove structures 122 shown in FIG. 4 and FIG. 5 can be formed by, for example, making diffusing plate reflecting surface 121 a metal plate to which mirror finishing is applied, and by applying hairline finishing to this surface. As the metal to use for diffusing plate reflecting surface 121, a metal such as silver, aluminum and rhodium that provides well-balanced high reflectivity with respect to visible light is appropriate. Further, groove structures 122 may be formed by, for example, making diffusing plate reflecting surface 121 a stainless plate, and by vapor-depositing aluminum on the surface after applying hairline finishing. These structures can provide the same reflection characteristics as the structures made by applying hairline finishing to aluminum, and increase the strength of groove structures 122. Further, on the surface of metal diffusing plate reflecting surface 121 that contacts air, an antioxidant film may be appropriately formed if necessary. Note that the stainless plate can be replaced with other metals or resin materials.

Reflection-type diffusing plate 120 employing the configuration shown in FIG. 4 and FIG. 5 can radiate a laser light in an arcuate pattern by reflected diffusion, and convert this laser light into wide and uniform diffusely-reflected lights.

Note that, in case where two facing surfaces among the surfaces forming a plurality of groove structures 122 form an angle of 90 degrees, a light incident on one surface is deflected 180 degrees and emitted from the other surface, and the laser light is emitted only in one direction even though there are two surfaces of different inclinations. Accordingly, the above two surfaces preferably form an angle other than 90 degrees. Further, in case where the above two surfaces form an angle of 45 degrees with respect to the X-Y plane, a laser light is not deflected toward the Z axis direction. Accordingly, the above two surfaces preferably form an angle other than 45 degrees with respect to the X-Y plane.

Further, in case where groove structures 122 have a cross-sectional shape of a denting reverse triangle, it is preferable not to make the angle between facing two surfaces too small. This is because, in case where this angle is small, there is a possibility that multireflection of a light occurs inside groove structures 122, energy is absorbed in these groove structures 122 and the amount of diffusely-reflected lights decreases.

Further, in case where surfaces forming a plurality of groove structures 122 shown in FIG. 4 and FIG. 5 form uniform angles and each surface is flat and in case where an incident laser light is a parallel light, the laser light is diffused only in three directions and therefore the beam densities of diffusely-reflected lights vary. Accordingly, it is preferable to make the beam densities of diffusely-reflected lights uniform by providing a certain angle of divergence to the incident laser light.

In addition, in order to make the variability of the beam densities uniform, it is equally possible to arrange a plurality of groove structures 122 of different inclinations, provide more fine concavities and convexities in the surfaces of groove structures 122 or arrange groove structures having curved surfaces.

Figure 6:
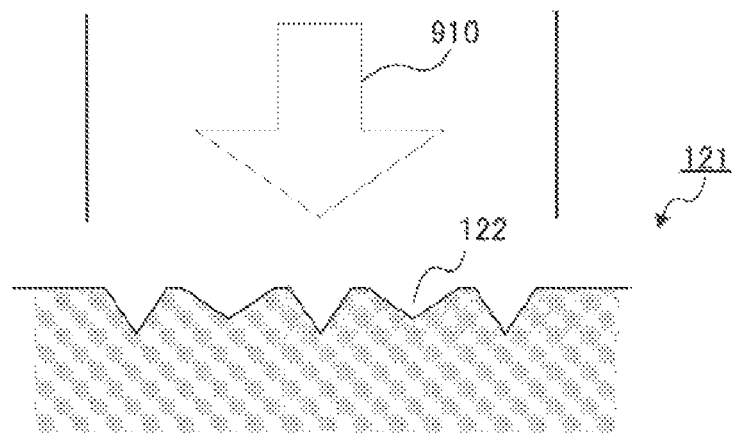
FIG. 6 is a main part cross-sectional view showing a third example of groove structures provided in a reflection-type diffusing plate according to Embodiment 1.

FIG. 6 is a main part cross-sectional view showing a third example of groove structures provided in reflection-type diffusing plate 120, and corresponds to FIG. 5. Groove structures 122 of diffusing, plate reflecting surface 121 shown in FIG. 6 include a plurality of concave parts of different vertex angles of triangular cross-sections.

Figure 7:
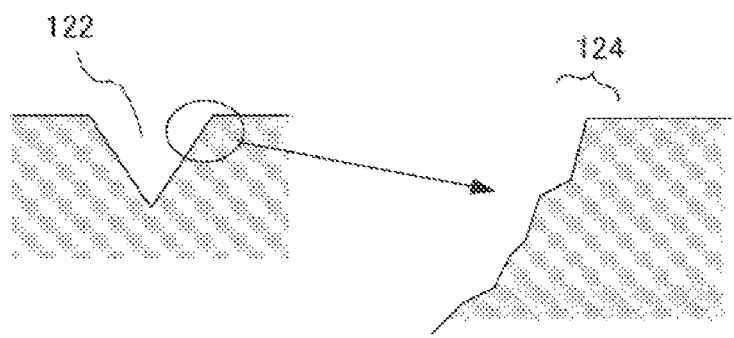
FIG. 7 is a main part cross-sectional view showing a fourth example of groove structures provided in a reflection-type diffusing plate according to Embodiment 1.

FIG. 7 is a main part cross-sectional view and a partial magnified view showing a fourth example of groove structures provided in reflection-type diffusing plate 120. Groove structures 122 shown in FIG. 7 include fine concavities and convexities 124 in their surfaces.

Figure 8:
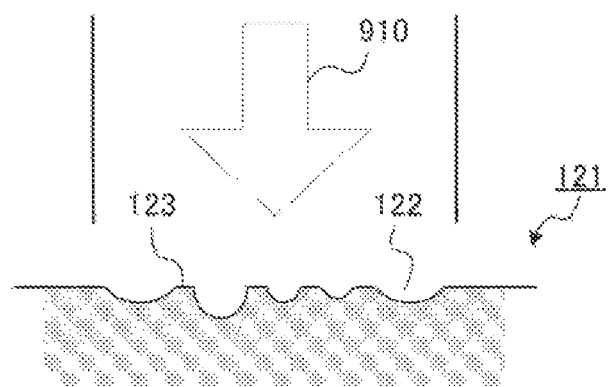
FIG. 8 is a main part cross-sectional view showing a fifth example of groove structures provided in a reflection-type diffusing plate according to Embodiment 1.

FIG. 8 is a main part cross-sectional view showing a fifth example of groove structures provided in reflection-type diffusing plate 120, and corresponds to FIG. 5. Groove structures 122 of diffusing plate reflecting surface 121 shown in FIG. 8 have a plurality of arcuate cross-sections of different sixes.

By adopting groove structures 122 shown in FIG. 6 and FIG. 8, it is possible to deflect a laser light in more directions and further make the variability of the beam densities of diffusely-reflected lights more uniform compared to the case where groove structures 122 shown in FIG. 4 and FIG. 5 are adopted. Note that groove structures 122 shown in FIG. 6 to FIG. 8 may adopt structures projecting with respect to flat portions 123 or structures denting in flat portions 123 similar to the case of groove structures 122 shown in FIG. 4 and FIG. 5.

Note that flat portions 123 of diffusing plate reflecting surface 121 are portions that simply reflect a laser light without diffusing a laser light, and therefore the number of flat portions is preferably as little as possible. To be more specific, the proportion of flat portions 123 with respect to the beam diameter of a laser light in the direction to diffuse the laser light is preferably, for example, 20 percent or less. Further, the cross-sectional shapes of individual groove structures 122 are preferably symmetrical with respect the X-Y plane such that the variability of the beam densities of diffusely-reflected lights is symmetrical with respect to the X-Y plane.

Further, the pitches (i.e. arrangement intervals) between groove structures 122 are preferably equal to or less than half of the beam diameter in the direction (here, the Z axis direction) in which a laser light from laser light source 110 is diffused. In this case, at least two groove structures are included in the range to radiate a laser light. Further, in case where groove structures 122 have random sizes or random shapes, groove structures 122 only need to be statistically uniform in the range of the beam diameter in the direction in which a laser light is diffused. To be more specific, groove structures 122 only need to have random sizes or random shapes, and small pitches.

By contrast with this, when the widths of grooves become closer to the order of nanometers, a laser light strongly shows the effect of diffraction. This is because beams having been incident on the grooves, then reflected and emitted cause diffraction when the beams are emitted from between grooves like the beams that are emitted from slits. In this case, the effect of diffraction is not algebraically restricted, and a light is widened in the Z axis direction even if the groove shapes are rectangular. Note that, to alleviate occurrence of brightness and darkness due to interference, it is preferable to provide groove structures 122 in random sizes or shapes and provide random pitches between groove structures 122.

Here, assume that groove structures 122 shown in FIG. 3 have a cross-sectional shape shown in FIG. 4.

However, to convert diffusely-reflected lights into a planar light at high conversion efficiency, the beams preferably spread as little as possible, in the thickness direction of light guiding plate 130, that is, in the X axis direction. However, in reality, the diffusely-reflected lights also spread in the X axis direction. The degree the diffusely-reflected lights spread in the X axis direction changes depending on the angle of incidence of a light (hereinafter simply "angle of incidence") in the X-Y plane of diffusing plate reflecting surface 121.

Figure 9:
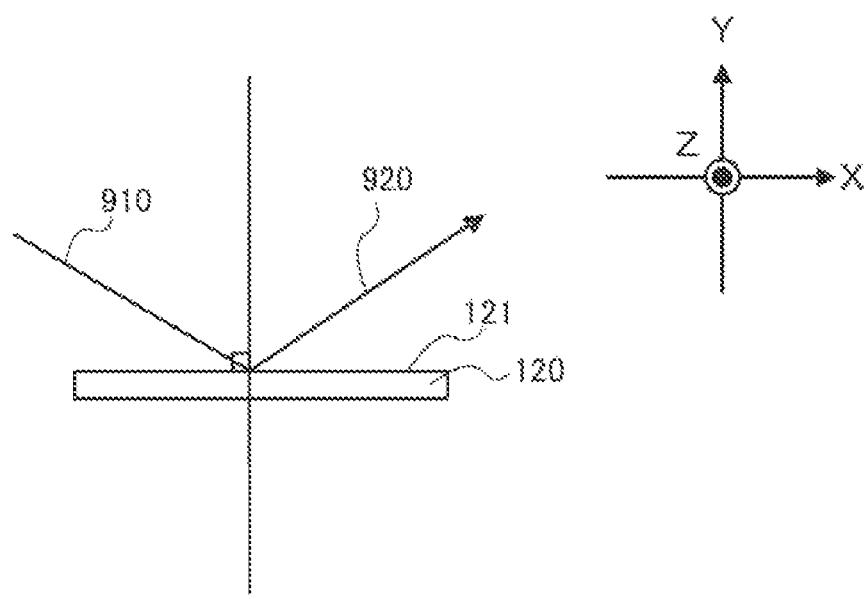
FIG. 9 is a plan view showing an ideal emission direction according to Embodiment 1.

FIG. 9 is a plan view showing the ideal emission direction in the X-Y plane of diffusing plate reflecting surface 121. Further, FIG. 10 is a perspective view showing the ideal emission direction in diffusing plate reflecting surface 121.

Figure 10:
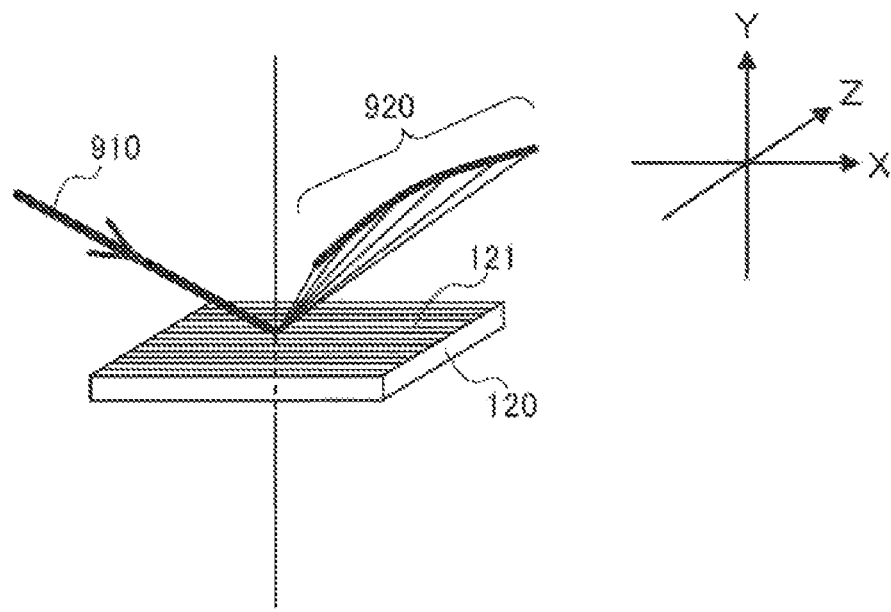
FIG. 10 is a perspective view showing an ideal emission direction according to Embodiment 1.

As shown in FIG. 9 and FIG. 10, ideally, in all directions spreading in an arcuate pattern in the Z axis direction, emission directions 920 of diffusely-reflected lights form uniform angles equal to the angle of incident direction 910 with respect to diffusing plate reflecting surface 121, and are spread little on the X-Y plane.

However, in reality, emission directions 920 are distributed in a sector shape. Then, when the angle of incidence is higher, the curvature of this sector shape becomes greater, and the degree of diffusion of lights in the emission directions on the X-Y plane increases.

Figure 11:
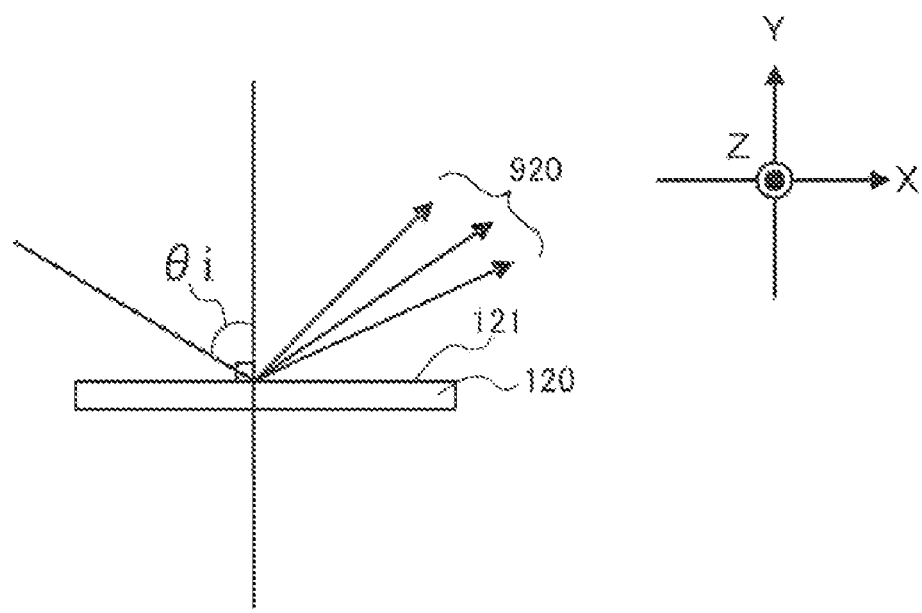
FIG. 11 is a plan view showing an actual emission direction according to Embodiment 1.
Figure 12:
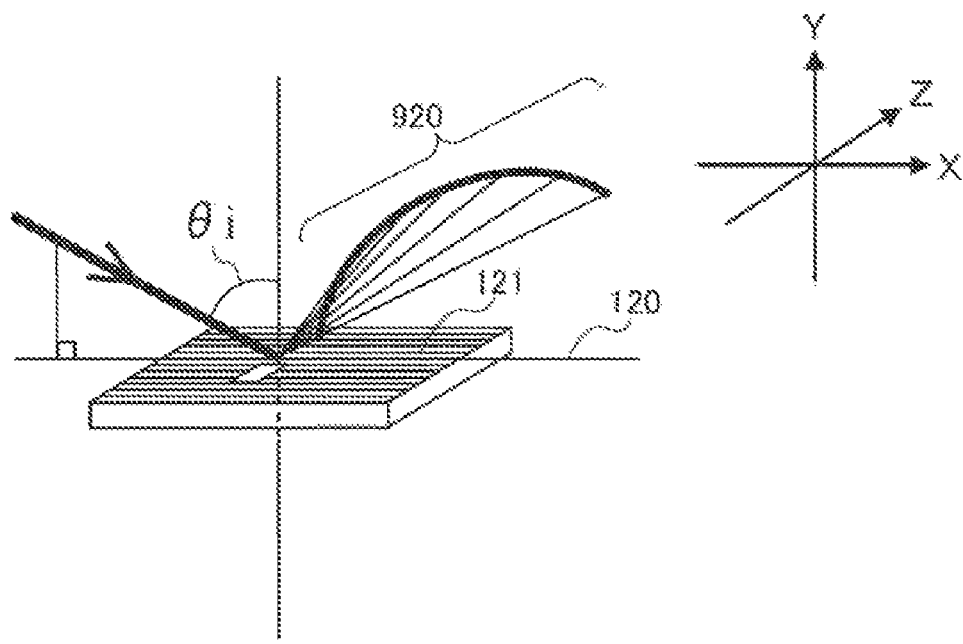
FIG. 12 is a perspective view showing an actual emission direction according to Embodiment 1.

FIG. 11 shows emission directions in the X-Y plane of actual diffusing plate reflecting surface 121. Further, FIG. 12 is a perspective view showing actual emission directions in diffusing plate reflecting surface 121. As shown in FIG. 11 and FIG. 12, emission directions 920 of diffusely-reflected lights spread on the X-Y plane. This is because Y axis components of beam components to be diffused in the Z axis direction become less than beam components to be regularly reflected without diffusing, and emitted at the same angle of reflection as the angle of incidence. This is because the reflecting surface that causes diffusion is inclined with respect to the X-Y plane in the X axis direction.

Further, the width of diffusion of emission directions 920 is wider when the angle of incidence is smaller.

Figure 13:
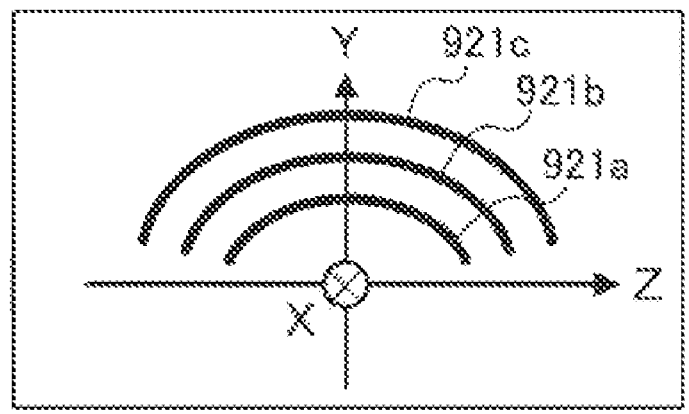
FIG. 13 is a plan view showing a cross-sectional shape of diffusely-reflected lights in the Y-Z plane according to Embodiment 1.

FIG. 13 shows examples of cross-sectional shapes for a plurality of angles of incidence when diffusely-reflected lights are cut in the Y-Z plane. In FIG. 13, cross-sectional shape 921$a$ matches the maximum angle of incidence $\theta i$, and cross-sectional shapes 921$b$ and 921$c$ in this order match smaller angles of incidence $\theta i$.

Figure 14:
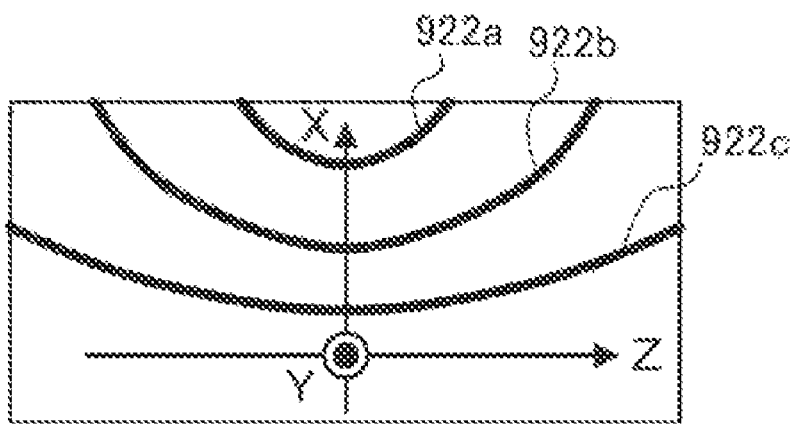
FIG. 14 is a plan view showing a cross-sectional shape of diffusely-reflected lights in the X-Z plane according to Embodiment 1.

FIG. 14 shows examples of cross-sectional shapes for a plurality of angles of incidence when diffusely-reflected lights are cut in the X-Z plane. In FIG. 13, cross-sectional shape 922$a$ matches the maximum angle of incidence $\theta i$, and cross-sectional shapes 922b and 922c in this order match smaller angles of incidence θi.

As shown in FIG. 13 and FIG. 14, cross-sectional shapes 921 and 922 become larger when the angle of incidence θi is higher, and wider in the Z axis direction. This is because, when the angle of incidence θi is higher, the Y axis components of beams further become larger.

As shown in FIG. 11 to FIG. 14, when angles of incidence θi are higher, reflected lights are radiated while not only being diffused little in the Z axis direction but also being diffused significantly on the whole in the X axis direction. Therefore, it is difficult to configure planar light source apparatus 100 such that all of these reflected lights are incident on first end surface 132 of light guiding plate 130, and convert the reflected lights into a planar light at high conversion efficiency. Further, the angle of reflection is correlated with the degree of diffusion in the Z axis direction, and therefore this may be a cause of unevenness in a planar light.

For this reason, planar light source apparatus 100 according to the present embodiment employs a configuration making an angle of incidence θi substantially small based on the relationship with first end surface 132 of light guiding plate 130.

Figure 15:
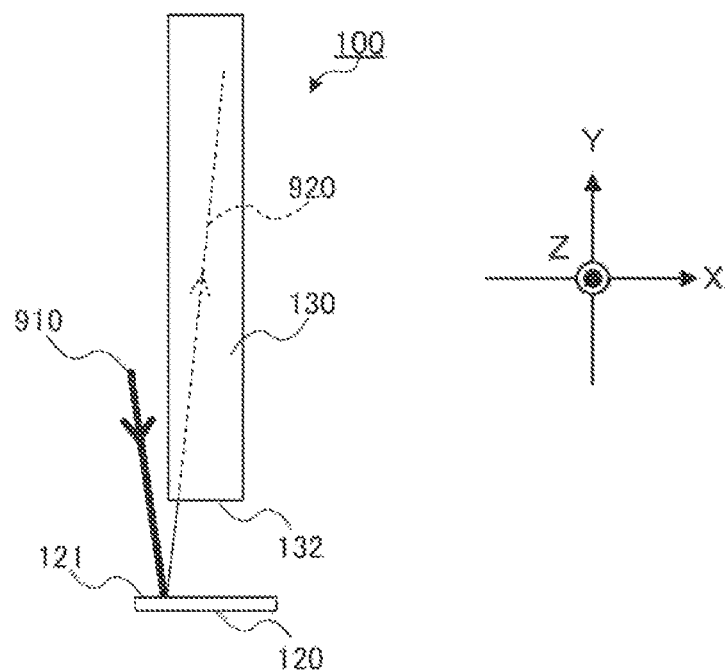
FIG. 15 is a side view of a planar light source apparatus according to Embodiment 1.

FIG. 15 is a side view showing planar light source apparatus 100 shown in FIG. 3 from the Z axis direction.

As shown in FIG. 15, planar light source apparatus 100 is configured such that diffusing plate reflecting surface 121 of reflection-type diffusing plate 120 is parallel to first end surface 132 of light guiding plate 130. Further, planar light source apparatus 100 is configured such that incident direction 910 of a laser light incident on diffusing plate reflecting surface 121 is parallel to the Y axis direction as much as possible, and emission directions 920 of diffusely-reflected lights are oriented toward the inside of light guiding plate 130 through first end surface 132 of light guiding plate 130. According to this configuration, it is possible to make an angle of incidence θi of a laser light incident on diffusing plate reflecting surface 121 substantially small, based on the relationship with first end surface 132 of light guiding plate 130.

Note that diffusing plate reflecting surface 121 does not always need to be parallel to first end surface 132 of light guiding plate 130, and may be inclined with respect to light guiding plate 130 in the X-Y plane.

Figure 16:
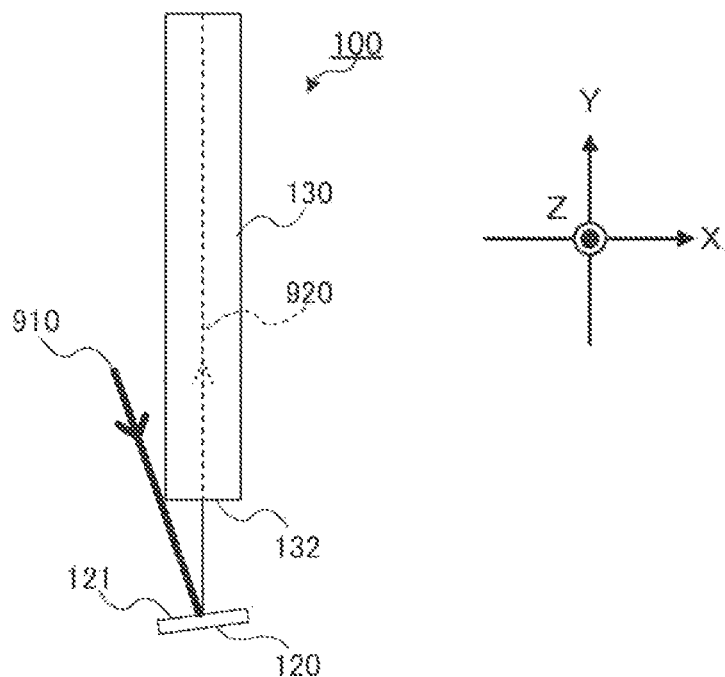
FIG. 16 is a side view of a planar light source apparatus in case where a diffusing plate reflecting surface is inclined according to Embodiment 1.

FIG. 16 is a side view of a planar light source apparatus in case where diffusing plate reflecting surface 121 is inclined, and corresponds to FIG. 15.

As shown in FIG. 16, in case where diffusing plate reflecting surface 121 is inclined toward the back side of light guiding plate 130, the normal direction of diffusing plate reflecting surface 121 is also inclined toward the back side of light guiding plate 130. Consequently, the degree of freedom in the area of diffusing plate reflecting surface 121 to allow incidence of a laser light, incident direction 910 and emission directions 920 increases. By this means, it becomes easy to, for example, make both incident direction 910 and emission directions 920 of a laser light parallel to the Y axis direction as much as possible, and, consequently, make the apparatus thinner. Particularly, as shown in FIG. 16, emission directions 920 are easily coordinated in the Y axis direction. In this case, even in case where there are X axis direction components in the direction in which the diffusely-reflected lights are diffused, it is possible to make the diffusely-reflected lights reach the depths of light guiding plate 130 (i.e. the surface facing first end surface 132) without intersecting emission surface 131 of light guiding plate 130. That is, this is advantageous to make light guiding plate 130 thinner and larger.

Further, light guiding plate 130 may have a flat shape with a wedge cross-section.

Figure 17:
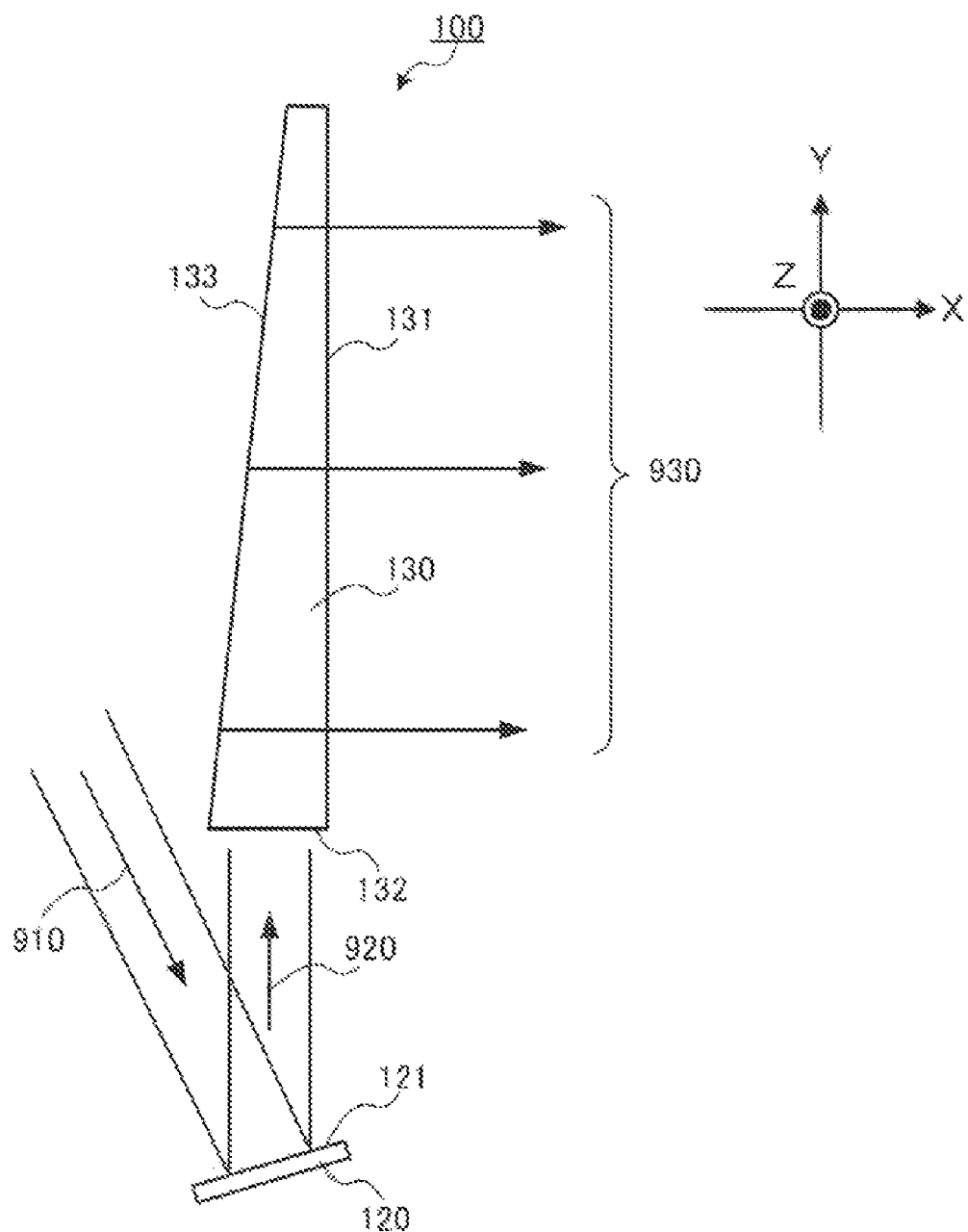
FIG. 17 is a side view of a planar light source apparatus in case where a light guiding plate having a wedge cross-section is used according to Embodiment 1.

FIG. 17 is a side view of a planar light source apparatus in case where a light guiding plate with a wedge cross-section is used, and corresponds to FIG. 16.

As shown in FIG. 17, in case where back surface 133 of light guiding plate 130 is inclined toward first end surface 132, for example, diffuse reflected lights of reflection-type diffusing plate 120 are made parallel lights that have a predetermined width in the X axis direction, on the X-Y plane, and emission directions 920 of the diffusely-reflected lights are coordinated in the Y axis direction. To make the diffusely-reflected lights parallel lights on the X-Y plane that have a predetermined width in the X axis direction, for example, a laser light only needs to be widened in to the X axis direction in a state where it is maintained parallel by an aspheric lens before it is incident on diffusing plate reflecting surface 121. Instead of this, it is possible to insert and realize the optical system between reflection-type diffusing plate 120 and first end surface 132. Further, to make emission directions 920 match in the Y axis direction, diffusing plate reflecting surface 121 only needs to be inclined toward incident direction 910 of a laser light.

By this means, lights propagate a shorter distance inside light guiding plate 130, so that it is possible to convert the diffusely-reflected lights into planar light 930 at high conversion efficiency.

However, the width of a light incident on first end surface 132 in the Z axis direction needs to virtually match with the length of the width direction (i.e. Z axis direction) of first end surface 132 when the incident light passes first end surface 132. Hence, the distance that a laser light propagates until it is incident on light guiding plate 130 after it is incident on reflection-type diffusing plate 120, needs to be made the distance or more in which reflected lights are diffused in the same width as the width of light guiding plate 130.

Next, an example of a configuration of a liquid crystal display apparatus that uses planar light source apparatus 100 according to the present embodiment as a light source, will be explained.

The liquid crystal display apparatus that uses planar light source apparatus 100 arranges a liquid display element and an optical filter (neither shown), on, for example, the observer side of light guiding plate 130 of planar light source apparatus 100. The liquid crystal display element includes a deflecting plate, at least two substrates, a liquid crystal layer sandwiched between these two substrates and a color filter layer provided in at least part of these substrates.

To be more specific, the liquid crystal display element includes a first substrate, a liquid crystal layer and a second substrate. The first substrate includes an active element such as a TFT (thin film transistor) element, a pixel electrode and an to oriented film, on the surface on the second substrate side of a transparent substrate. The second substrate includes a color filter, a counter electrode and an oriented film, on the surface on the first substrate side of the transparent substrate. The oriented film of the first substrate and the oriented film of the second substrate are arranged to face each other, intervals between the liquid crystal layer and these oriented film are secured by spacers, and liquid crystal is filled in the liquid crystal layer and sealed by the sealing agent. Outside the first substrate and the second substrate, deflecting plates are arranged.

The deflecting plate of the first substrate of the liquid crystal display element, and emission surface 131 of light guiding plate 130 of planar light source apparatus 100 are arranged to face each other.

According to this liquid crystal display apparatus, for example, pixels to which the voltage is applied in the liquid crystal layer allow an incident light from planar light source apparatus 100 to reach the observer side, and the other pixels do not allow an incident light from planar light source apparatus 100 to reach the observer side.

As described above, planar light source apparatus 100 can have a planar light of a wide and uniform distribution of light intensity, from a laser light which is a spot light. Consequently, according to the liquid crystal display apparatus using planar light source apparatus 100, it is possible to perform uniform and quality image display at high brightness in the entire screen.

As explained above, planar light source apparatus 100 of the present embodiment radiates a laser light from laser light source 110, in an arcuate pattern by reflected diffusion to have linear lights, so that it is possible to have a planar light of a wide and uniform distribution of light intensity, from a laser light which is a spot light. Moreover, using reflection-type diffusing plate 120 which is an optical component with a simple configuration including groove structures 122 in the reflecting surface, it is possible to have this planar light. Further, by this means, it is possible to provide at low cost, for example, a planar light source apparatus that emits a wide and quality planar light, and a liquid crystal display apparatus with a quality large screen.

Hereinafter, applications of planar light source apparatus 100 according to Embodiment 1 will be explained.

(Application 1 of Embodiment 1)

Figure 18A:
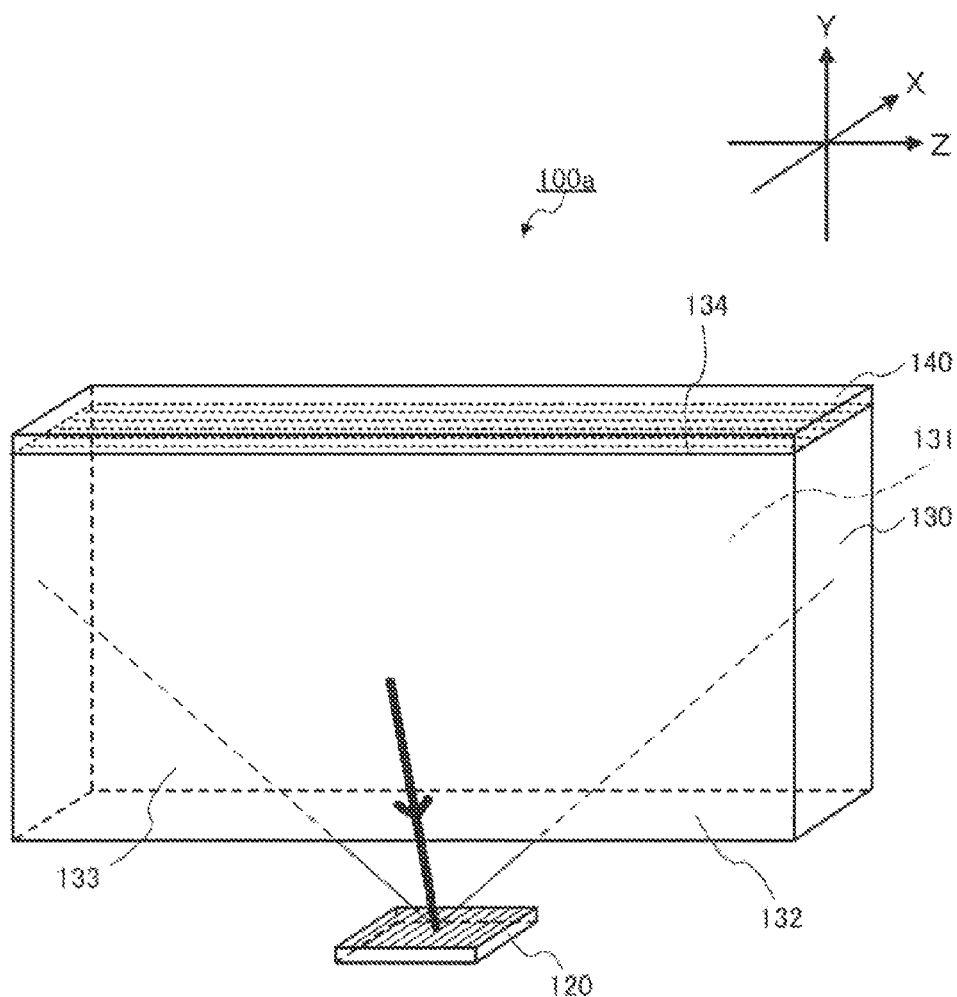
FIG. 18A is a perspective view showing a configuration of a planar light source apparatus according to Application 1 of Embodiment 1.

FIG. 18A is a perspective view showing a configuration of a planar light source apparatus according to Application 1 of Embodiment 1, and corresponds to FIG. 3. As shown in FIG. 18A, in addition to the configuration shown in FIG. 3, this planar light source apparatus 100a has second reflecting plate 140 as a reflecting member, in end surface 134 (hereinafter "second end surface") facing first end surface 132 of light guiding plate 130.

Figure 18B:
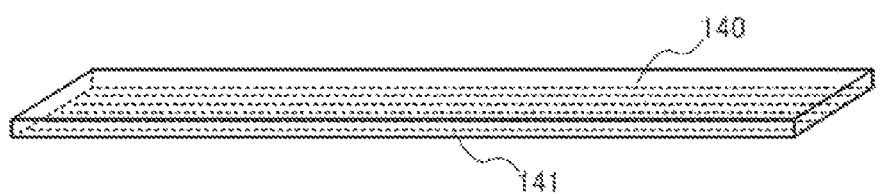
FIG. 18B is a perspective view showing only a configuration of a second reflecting plate shown in FIG. 18A.

FIG. 18B is a perspective view showing only a configuration of second reflecting plate 140 shown in FIG. 18A. As shown in FIG. 18B, in the surface on the light guiding plate 130 side of second reflecting plate 140, a plurality of fine groove structures 141 are formed extending in parallel to the Z axis direction. For example, the shapes of groove structures 122 shown in FIG. 4 are applicable to these groove structures 141. In this case, second reflecting plate 140 radiates a light from light guiding plate 130 in an arcuate pattern such that the light is widened in the X axis direction by reflected diffusion.

This planar light source apparatus 100a can further diffuse, in the X axis direction, the diffusely-reflected lights having diffused and propagated inside light guiding plate 130 in the Z axis direction and reached second end surface 134. By this means, the laser light diffused in the Z axis direction is further diffused in the X axis direction, and is collected from emission surface 131 of light guiding plate 130. Further, the degree of diffusion in the traveling direction of a light propagating inside increases, so that it is possible to have a planar light of a more uniform distribution of light intensity.

Note that, instead of second reflecting plate 140 having groove structures 141, it is equally possible to use various reflecting plates and reflecting mirrors to diffuse reflected lights. In this regard, the same applies to each reflecting plate explained below.

Figure 19:
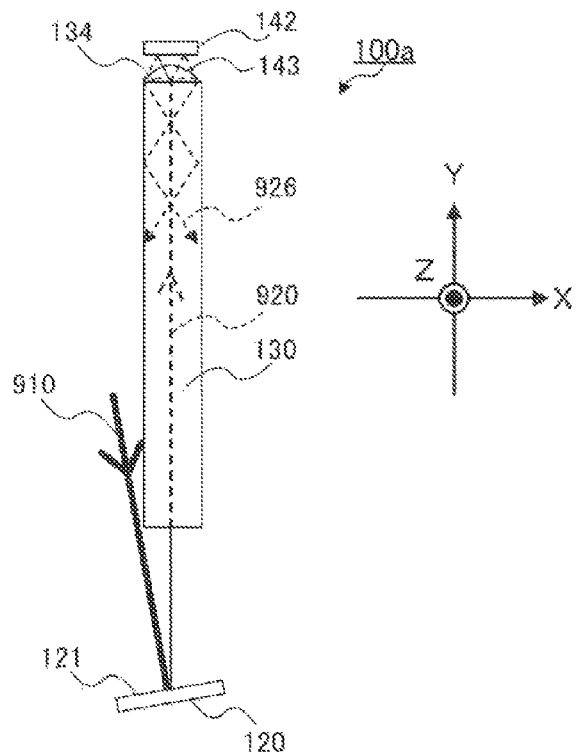
FIG. 19 is a side view of a planar light source apparatus using a reflecting mirror according to Application 1 of Embodiment 1.

FIG. 19 is a side view of a light source apparatus in case where a reflecting mirror plate is used, and corresponds to FIG. 16 and FIG. 18.

As shown in FIG. 19, this planar light source apparatus 100a includes reflecting mirror 142 and cylindrical lens 143 instead of second reflecting plate 140 shown in FIG. 18. Reflecting mirror 142 is arranged to face second end surface 134 of light guiding plate 130. Cylindrical lens 143 is arranged between second end surface 134 and reflecting mirror 142, and narrows down a laser light emitted from second end surface 134 in the X axis direction and allows the light to be incident on reflecting mirror 142. According to this configuration, emission directions 926 of a laser light having been emitted from reflecting mirror 142 and propagated inside light guiding plate 130 can be diffused in the X axis direction. Note that, by making the distance between cylindrical lens 143 and reflecting mirror 142 half of the focal distance of cylindrical lens 143 or less, it is possible to increase the angle of focus in the X axis direction with respect to second end surface 134.

Note that a cylindrical Fresnel lens may be used instead of cylindrical lens 143. By contrast with this, original second reflecting plate 140 may be used instead of reflecting mirror 142, and a cylindrical Fresnel lens may be used instead of cylindrical lens 143. By so doing, the collimating effect of the cylindrical Fresnel lens allows diffusely-reflected lights incident on second reflecting plate 140 to be incident from the direction orthogonal to the direction in which groove structures 141 of second reflecting plate 140 are formed.

Note that, similar to the following embodiments, in case where diffusely-reflected lights are incident on the reflection-type diffusing plate, from a direction which is not orthogonal to the direction in which groove structures of the reflection-type diffusing plate are formed, it is possible to correct the diffusely-reflected lights by arranging the Fresnel lens for collimating the diffusely-reflected lights, before the reflection-type diffusing plate. In case where a laser light is incident from a direction which is not orthogonal to the direction in which groove structures are formed, there are cases where unevenness in brightness is produced, so that it is possible to remove unevenness in brightness and make brightness uniform by arranging the Fresnel lens in this way.

Figure 20:
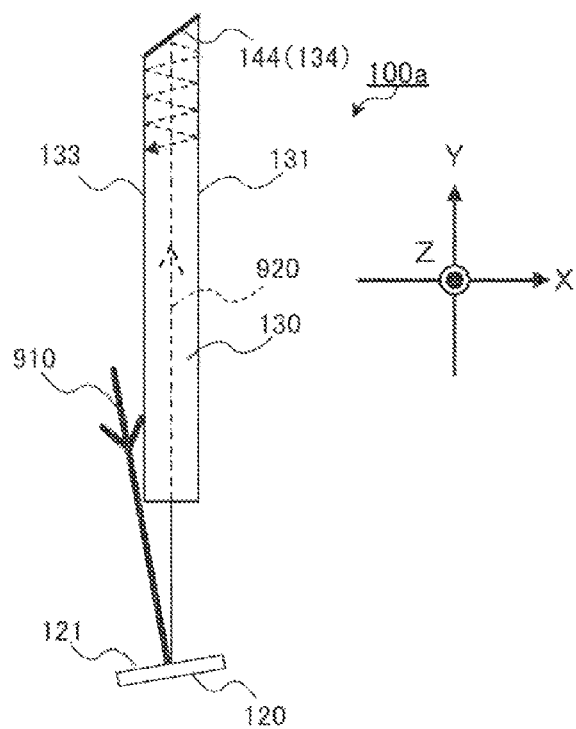
FIG. 20 is a side view of a planar light source apparatus using a mirror-coating surface according to Application 1 of Embodiment 1.

FIG. 20 is a side view of a planar light source apparatus in case where a mirror coating surface inclined at an angle is used, and corresponds to FIG. 16 and FIG. 18.

As shown in FIG. 20, planar light source apparatus 100a has mirror coating part 144 inclined at an angle, instead of second reflecting plate 140 shown in FIG. 18. This mirror coating part 144 is formed on second end surface 134 by applying mirror coating to second end surface 134 that is inclined at an angle, to provide X axis direction components in the normal direction. According to this configuration, mirror coating part 144 reflects the laser light emitted from diffusing plate reflecting plane 121, and deflects the laser light in the X axis direction. That is, the laser light propagates inside light guiding plate 130 repeating reflecting between emission surface 131 and back surface 133 of light guiding plate 130, and reaches entire emission surface 131 and entire back surface 133, so that it is possible to collect the laser light from entire emission surface 131.

Further, instead of second reflecting plate 140, it is possible to use the reflection-type diffusing plate in which grooves are carved in the X axis direction, not in the Z axis direction. In this case, a laser light is further diffused in the Z axis direction, so that it is possible to improve the uniformity of a laser light in the Z axis direction.

(Application 2 of Embodiment 1)

Figure 21A:
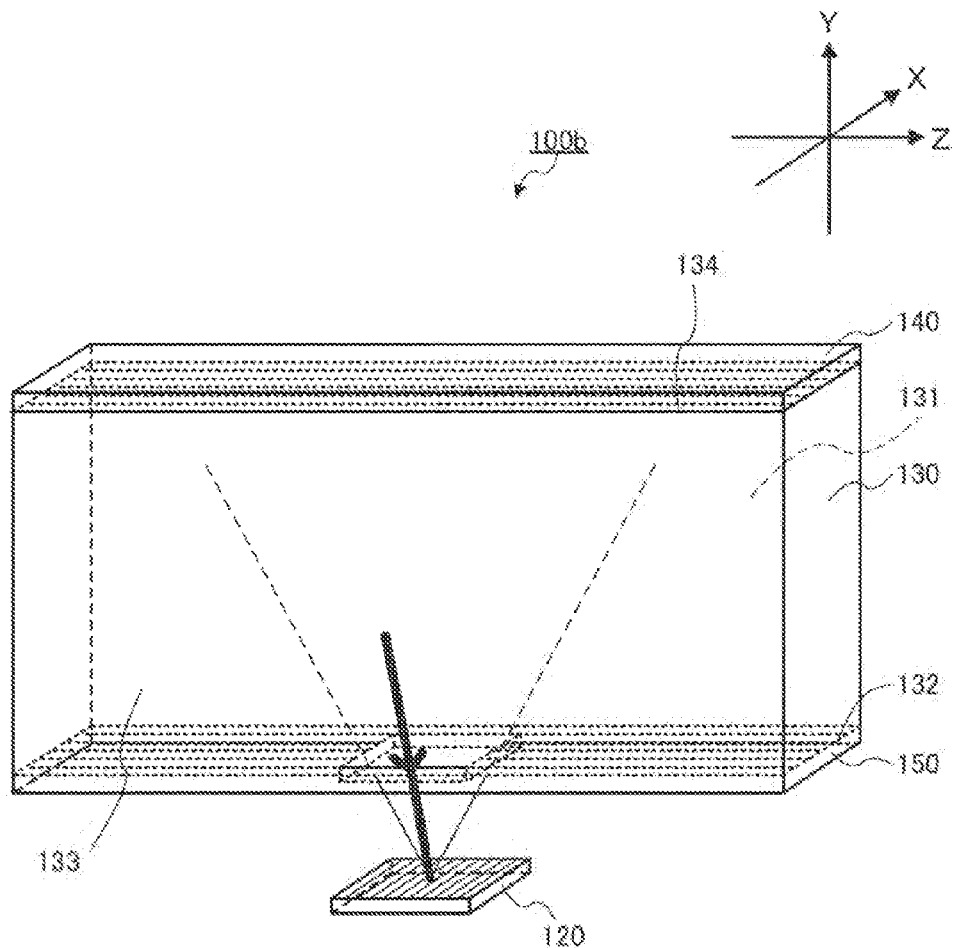
FIG. 21A is a perspective view showing a configuration of a planar light source apparatus according to Application 2 of Embodiment 1.

FIG. 21A is a perspective view showing a configuration of a planar light source apparatus according to Application 2 of Embodiment 1, and corresponds to FIG. 18A. As shown in FIG. 21A, in addition to the configuration shown in FIG. 18A, planar light source apparatus 100b has first reflecting plate 150 as a reflecting member, on first end surface 132 of light guiding plate 130.

Figure 21B:
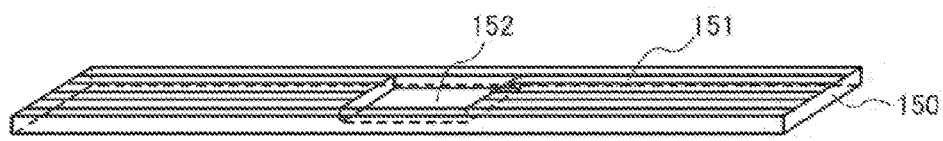
FIG. 21B is a perspective view showing only a configuration of a first reflecting plate shown in FIG. 21A.

FIG. 21B is a perspective view showing only a configuration of first reflecting plate 150 shown in FIG. 21A. As shown in FIG. 21B, opening 152 is formed in an area of first reflecting plate 150 where diffusely-reflected lights from reflection-type diffusing plate 120 pass. Further, in the surface on the light guiding plate 130 side of first reflecting plate 150, a plurality of fine groove structures 151 are formed extending in parallel to the Z axis direction. For example, the shapes of groove structures 122 shown in FIG. 4 are applicable to these groove structures 151. In this case, first reflecting plate 150 radiates a light from light guiding plate 130, in an arcuate pattern such that the light is widened in the X axis direction by reflected diffusion.

This planar light source apparatus 100b can further diffuse, in the X axis direction, the light having diffused back and forth inside light guiding plate 130 and returned to first end surface 132, without blocking optical paths of diffusely-reflected lights when the diffusely-reflected lights are incident on light guiding plate 130, and have a planar light of a more uniform distribution of light intensity. Further, with the configuration shown in FIG. 18A, lights that cannot be collected from emission surface 131, among lights reflected on and returned from second end surface 134 are not utilized. With the configuration shown in FIG. 21, lights that cannot be collected from this emission surface 131 are reutilized, so that it is possible to increase the brightness of a planar light collected from emission surface 131. As a means for reutilizing these lights, instead of first reflecting plate 150, a reflecting member such as a mirror and a reflecting plate with an opening can also be used.

(Application 3 of Embodiment 1)

Figure 22A:
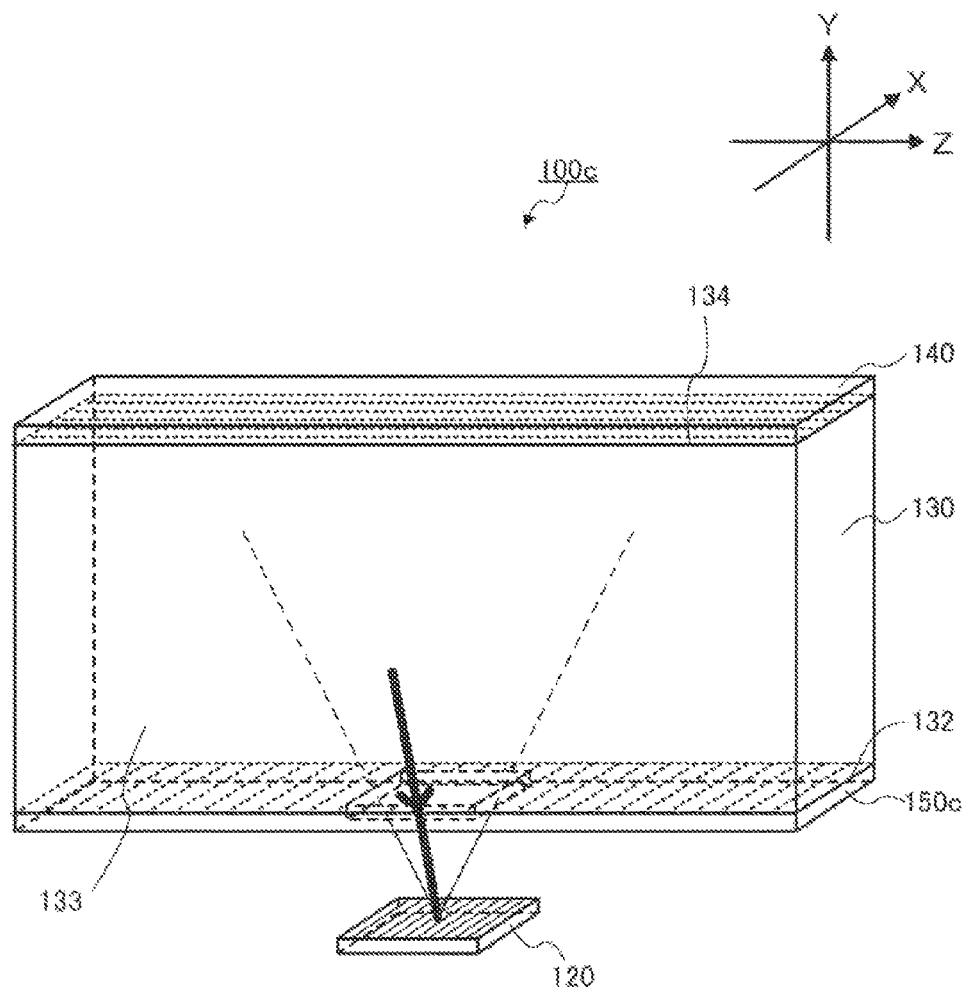
FIG. 22A is a perspective view showing a configuration of a planar light source apparatus according to Application 3 of Embodiment 1.

FIG. 22A is a perspective view showing a configuration of a planar light source apparatus according to Application 3 of Embodiment 1, and corresponds to FIG. 21A. As shown in FIG. 22A, this planar light source apparatus 100c has another first reflecting plate 150c, instead of first reflecting plate 150 of FIG. 21A.

Figure 22B:
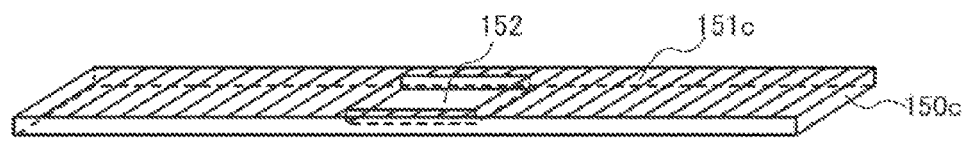
FIG. 22B is a perspective view showing only a configuration of the first reflecting plate shown in FIG. 22A.

FIG. 22B is a perspective view showing only a configuration of first reflecting plate 150c shown in FIG. 22A. As shown in FIG. 22B, in the surface on the light guiding plate 130 side of first reflecting plate 150c, a plurality of fine groove structures 151c are formed extending in parallel to the X axis direction. For example, the shapes of groove structures 122 shown in FIG. 4 are applicable to these groove structures 151c. In this case, first reflecting plate 150c radiates a light from light guiding plate 130, in an arcuate pattern such that the light is widened in the Z axis direction by reflected diffusion.

This planar light source apparatus 100c can further diffuse, in the Z axis direction, the light having diffused back and forth inside light guiding plate 130 and returned to first end surface 132, without blocking optical paths of diffusely-reflected lights when these diffusely-reflected lights are incident on light guiding plate 130. By this means, it is possible to have a planar light of a more uniform distribution of light intensity.

(Application 4 of Embodiment 1)

Figure 23A:
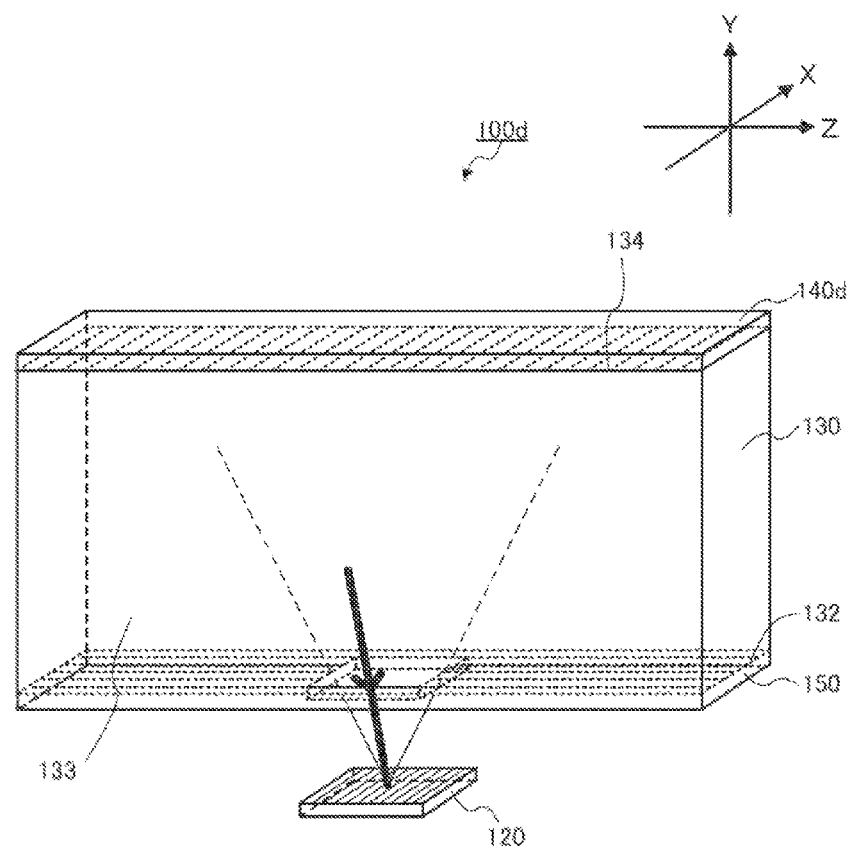
FIG. 23A is a perspective view showing a configuration of a planar light source apparatus according to Application 4 of Embodiment 1.

FIG. 23A is a perspective view showing a configuration of a planar light source apparatus according to Application 4 of Embodiment 1, and corresponds to FIG. 21A. As shown in FIG. 23A, planar light source apparatus 100d has another second reflecting plate 140d, instead of second reflecting plate 140 of FIG. 21A.

Figure 23B:
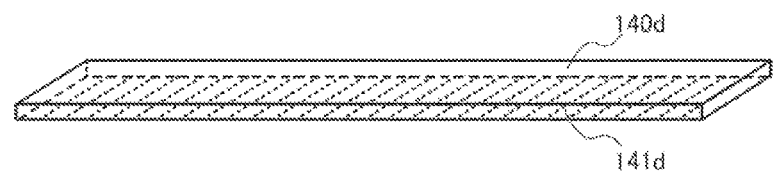
FIG. 23B is a perspective view showing only a configuration of a second reflecting plate shown in FIG. 23A.

FIG. 23B is a perspective view showing only a configuration of second reflecting plate 140d shown in FIG. 23A. As shown in FIG. 23B, in the surface on the light guiding plate 130 side of second reflecting plate 140d, a plurality of line groove structures 141d are formed extending in parallel to the X axis direction. For example, the shapes of groove structures 122 shown in FIG. 4 are applicable to these groove structures 141d. In this case, second reflecting plate 140d radiates a light from light guiding plate 130, in an arcuate pattern such that the light is widened in the Z axis direction by reflected diffusion.

This planar light source apparatus 100d can diffuse again, in the Z axis direction, diffuse reflected lights having diffused and propagated inside light guiding plate 130, and reached second end surface 134, without blocking optical paths of diffusely-reflected lights when the diffusely-reflected lights are incident on light guiding plate 130. Then, planar light source apparatus 100d can further diffuse, in the X axis direction, lights having diffused sufficiently in the Z axis direction and returned to first end surface 132. By this means, it is possible to have a planar light of a more uniform distribution of light intensity. Further, by using another first reflecting plate 150c instead of first reflecting plate 150, it is possible to further make a planar light uniform in the Z axis direction.

Note that, in case where groove structures of reflection-type diffusing plate 120, second reflecting plate 140 and first reflecting plate 150 (hereinafter appropriately "reflection-type diffusing member") explained in Embodiment 1 and each application, are formed at equal intervals, generally, the beam densities of diffusely-reflected lights by these groove structures vary.

Figure 24:
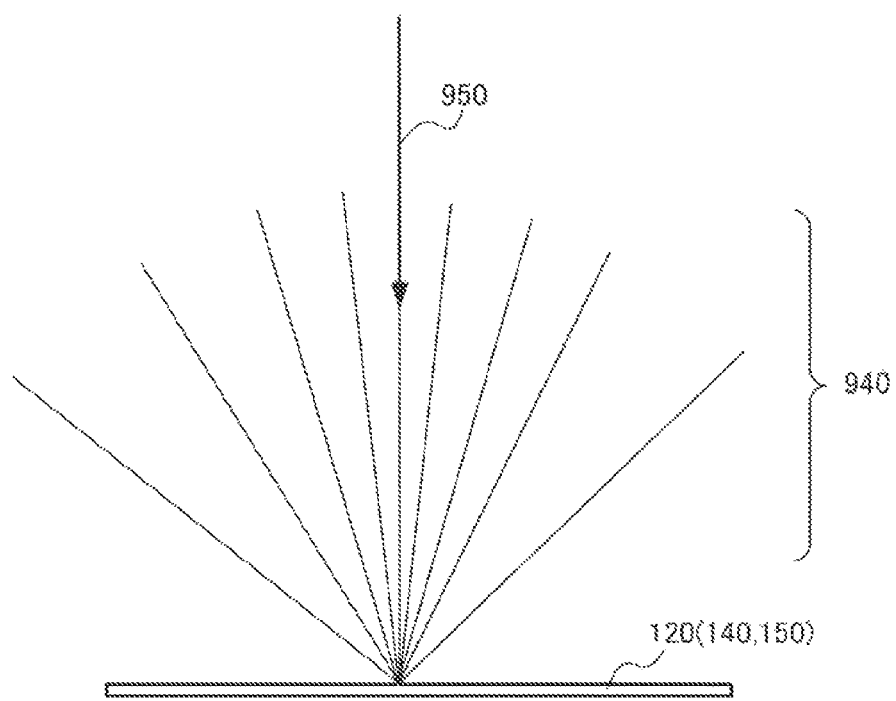
FIG. 24 shows an example of how beam densities of diffusely-reflected lights vary according to Embodiment 1.

FIG. 24 shows an example of how the beam densities generally vary. In FIG. 24, the variability of linear group 940 drawn in a radial pattern represents the variability of reflected lights with respect to incident light 950 incident on reflection-type diffusing member 120 (140 and 150). Further, assume that a plurality of groove structures (not shown) extending in the direction of the depths of the drawings are formed at equal intervals.

As shown in FIG. 24, in case where the groove structures are formed at equal intervals, the beam densities (i.e. the density of straight line group 940) of reflected lights with respect to incident light 950 generally become the highest in the normal direction of reflection-type diffusing member 120 (140 and 150), and become lower farther apart from the normal direction. That is, unevenness in brightness is produced in reflected lights radiated in an arcuate pattern.

As a means for removing this unevenness in brightness, it is effective to vary the intervals to arrange groove structures formed in reflection-type diffusing member 120 (140 and 150).

Figure 25:
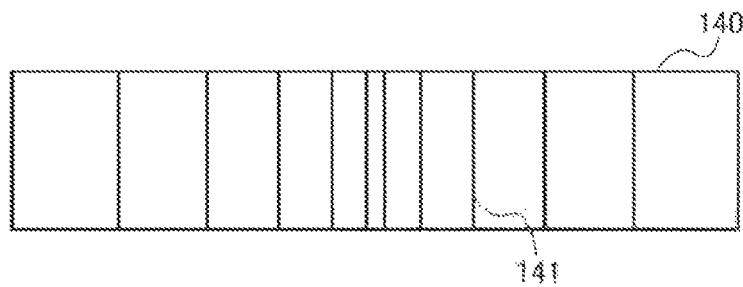
FIG. 25 is a plan view of a second reflecting plate in case where groove structures extending in the Z axis direction vary according to Embodiment 1.

FIG. 25 is a plan view showing second reflecting plate 140 shown in FIG. 18B from the light guiding plate 130 side in case where intervals to arrange a plurality of groove structures 141 extending in the X axis direction vary. The intervals to arrange groove structures 141 are more varied such that a light is more diffused in portions in which the beam density is more dense, and a light is less diffused in portions in which the beam density is less dense. By this means, it is possible to make the beam densities of reflected lights more uniform in the Z axis direction.

Figure 26:
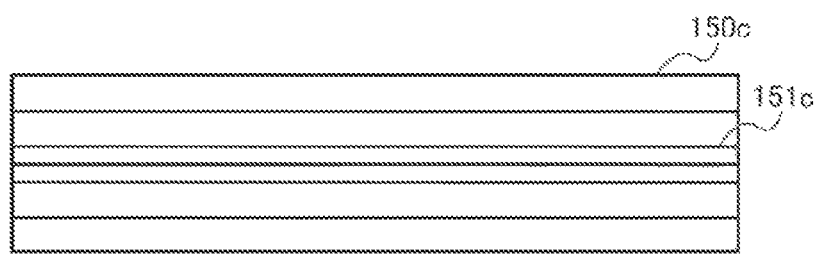
FIG. 26 is a plan view of a second reflecting plate in case where groove structures extending in the X axis direction vary according to Embodiment 1.

FIG. 26 is a plan view showing first reflecting plate 150c shown in FIG. 22B from the light guiding plate 130 side in case where intervals to arrange a plurality of groove structures 151c extending in the Z axis direction vary (where opening 152 is not shown). The intervals to arrange groove structures 151 are more varied such that a light is more diffused in portions in which the beam density is more dense and light is less diffused in portions in which the beam density is less dense. By this means, it is possible to make the beam densities of reflected lights more uniform in the X axis direction.

Varying intervals to arrange groove structures as a means for removing unevenness in brightness is effective, and the same applies to each reflecting plate explained in other parts. That is, in case where reflected lights vary in a pattern (including structures other than groove structures) other than the pattern shown in FIG. 24, it is possible to cancel this variability with the same method. This method is naturally applicable to the above-described embodiments, and is also applicable to the following embodiments.

(Embodiment 2)

Hereinafter, a planar light that makes a device such that the distance from a reflection-type diffusing plate to an incident surface of a light guiding plate for diffusely-reflected lights is long, will be explained as Embodiment 2 of the present invention.

Figure 27:
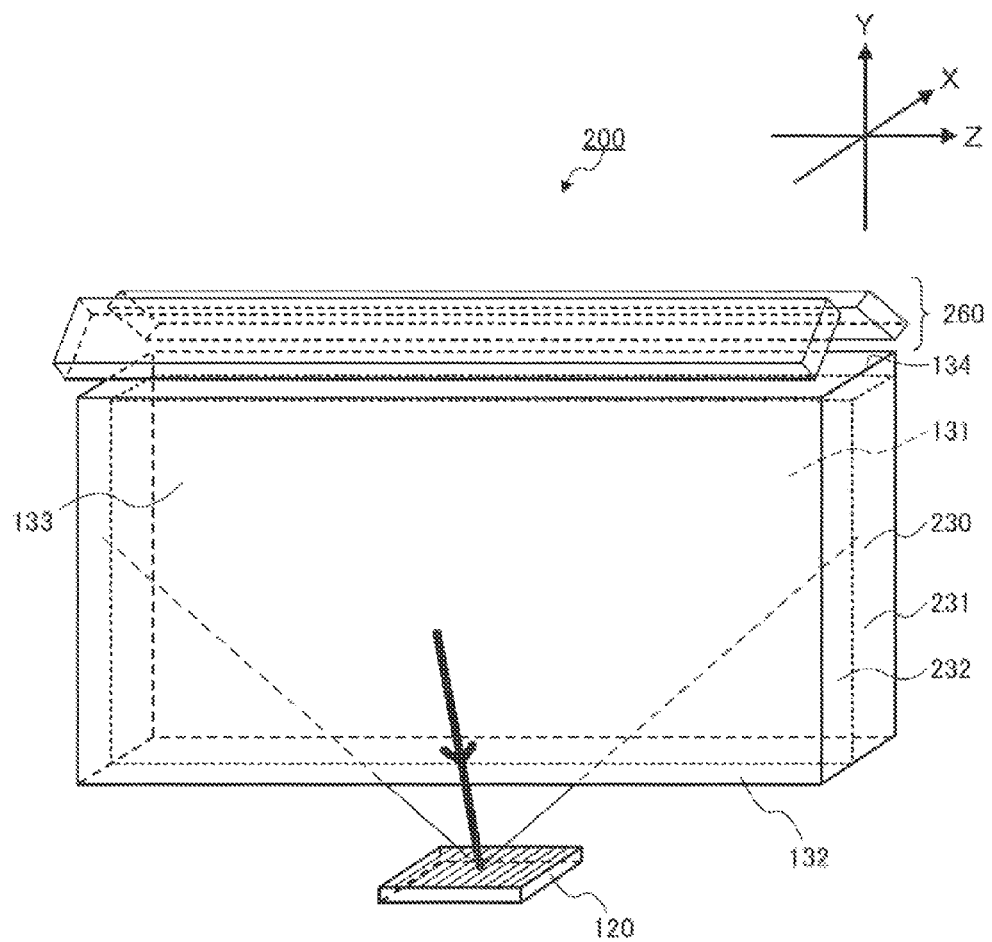
FIG. 27 is a perspective view showing a configuration of a planar light source apparatus according to Embodiment 2 of the present invention.

FIG. 27 is a perspective view showing a configuration of planar light source apparatus 200 according to Embodiment 2 of the present invention, and corresponds to FIG. 3 of Embodiment 1.

As shown in FIG. 27, planar light source apparatus 200 according to the present embodiment has light guiding plate 230 employing a different configuration from light guiding plate 130 shown in FIG. 3, and light deflecting part 260.

Light guiding plate 230 has solid part 231 and hollow part 232 inside on the back surface 133 side. Solid part 231 has a size virtually matching with emission surface 131, and corresponds to light guiding plate 130 according to Embodiment 1. Further, hollow part 232 is provided between solid part 231 and back surface 133 of light guiding plate 230, openings are each provided in first end surface 132 below which reflection-type diffusing plate 120 is arranged, and in second end surface 134 on the opposite side of first end surface 132.

Reflection-type diffusing plate 120 radiates an incident laser light in an arcuate pattern such that the incident laser light is widened in the Z axis direction, by reflected diffusion, and allows the laser light to be incident on light deflecting part 260 through hollow part 232 of light guiding plate 230.

Light deflecting part 260 includes a pair of reflecting mirrors arranged on the second end surface 134 side of light guiding plate 230, and returns a light emitted from the above opening on the second end surface 134 side and allows the light to be incident on light guiding plate 230. To be more specific, light deflecting part 260 deflects the light incident from reflection-type diffusing part 120 through hollow part 232, and allows the lights to be incident on second end surface 134 on the emission surface 131 side of light guiding plate 230.

Figure 28:
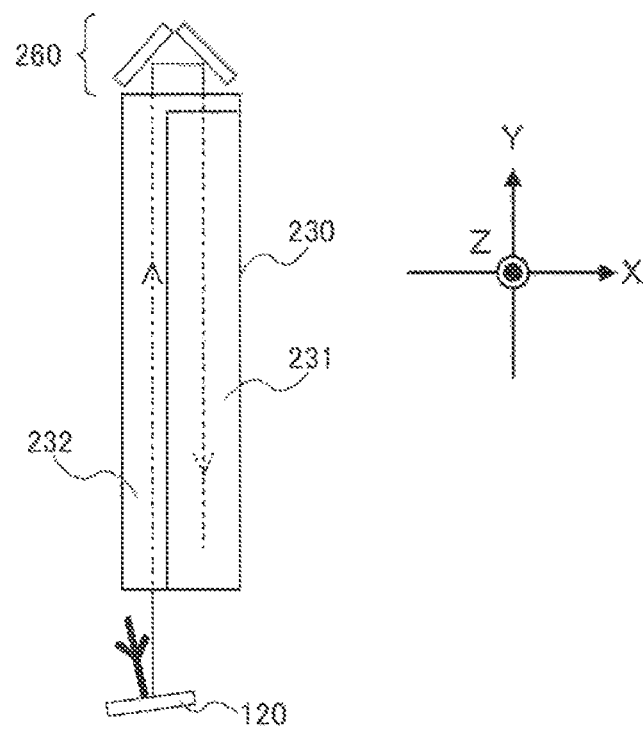
FIG. 28 is a side view of a planar light source apparatus according to Embodiment 2.

FIG. 28 is a side view showing planar light source apparatus 200 shown in FIG. 27 from the Z axis direction.

As shown in FIG. 28, diffusely-reflected lights from reflection-type diffusing plate 120 pass hollow part 232, and then are returned by light deflecting part 260 and are incident on light guiding plate 230. Compared to FIG. 16 of Embodiment 1, planar light source apparatus 200 according to the present embodiment allows the light to propagate a longer distance until it is incident on light guiding plate 230 after it is emitted from reflection-type diffusing plate 120.

Thus, planar light source apparatus 200 of the present embodiment can allow the light to propagate a long distance until it is incident on light guiding plate 230 after it is emitted from reflection-type diffusing plate 120, so that it is possible to easily earn a distance to diffuse a light. Further, although there is a possibility that diffusely-reflected lights are diffused unnecessarily if the light propagates a long distance until it is incident on light guiding plate 230, with the present embodiment, by utilizing hollow part 232 inside light guiding plate 230, it is possible to prevent unnecessary diffusion.

Note that, in case where the beam width can be secured in the X axis direction, it is possible to make the portion removing hollow part 232 of light guiding plate 230 a wedge shape like light guiding plate 130 shown in FIG. 17 of Embodiment 1.

Hereinafter, applications of planar light source apparatus 200 according to Embodiment 2 will be explained.

(Application 1 of Embodiment 2)

Figure 29:
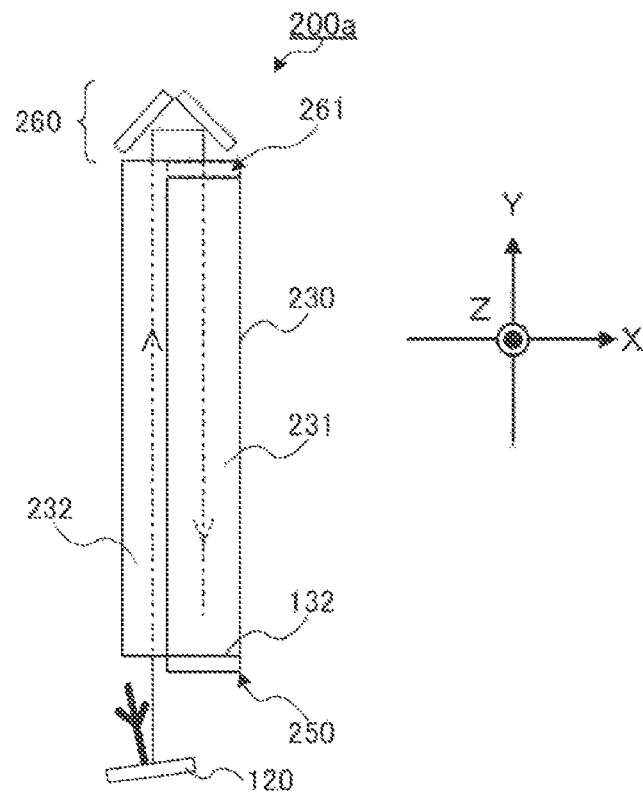
FIG. 29 is a side view of a planar light source apparatus according to Application 1 of Embodiment 2.

FIG. 29 is a side view showing a planar light source apparatus according to Application 1 of Embodiment 2 from the Z axis direction. As shown in FIG. 29, with this planar light source apparatus 200a, cylindrical Fresnel lens 261 is arranged as a collimator, on the optical paths for diffusely-reflected lights to reach light guiding plate 230 from light deflecting part 260, and first reflecting plate 250 employing a configuration without, for example, opening 152 in first reflecting plate 150 shown in FIG. 21B of Embodiment 1, is arranged on the first end surface 132 side of light guiding plate 230. Also in this case, it is possible to vary intervals between grooves as described above. In this regard, the same applies to Applications 2 and 3 of Embodiment 2 (described later).

Cylindrical Fresnel lens 261 collimates a light having been incident from light deflecting part 260 and diffused toward the Z axis direction, as parallel lights vertical to the Z axis, and allows the parallel lights to be incident on light guiding plate 230. Note that there are cases where lights reflected on the lateral surfaces of light guiding plate 230 do not become parallel lights. In this regard, the same applies to the following applications.

This planar light source apparatus 200a can convert a laser light into parallel lights widened to the same width as the width of light guiding plate 230 and allow the lights to be incident on light guiding plate 230, and can further allow the lights to propagate back and forth inside light guiding plate 230. By this means, it is possible to, for example, diffuse a light widely in the Z axis direction by reflection-type diffusing plate 120, and collimate the light in a state where the beam densities of diffusely-reflected lights in the Z axis direction are made more uniform. That is, it is possible to make the beam densities of diffusely-reflected lights more uniform in the Z axis direction at a stage before the lights are incident on light guiding plate 230. Further, similar to first reflecting plate 150 of FIG. 21B, by providing first reflecting plate 250, it is possible to radiate a light from light guiding plate 230, in an arcuate pattern such that the light is widened in the X axis direction by reflected diffusion.

(Application 2 of Embodiment 2)

Figure 30:
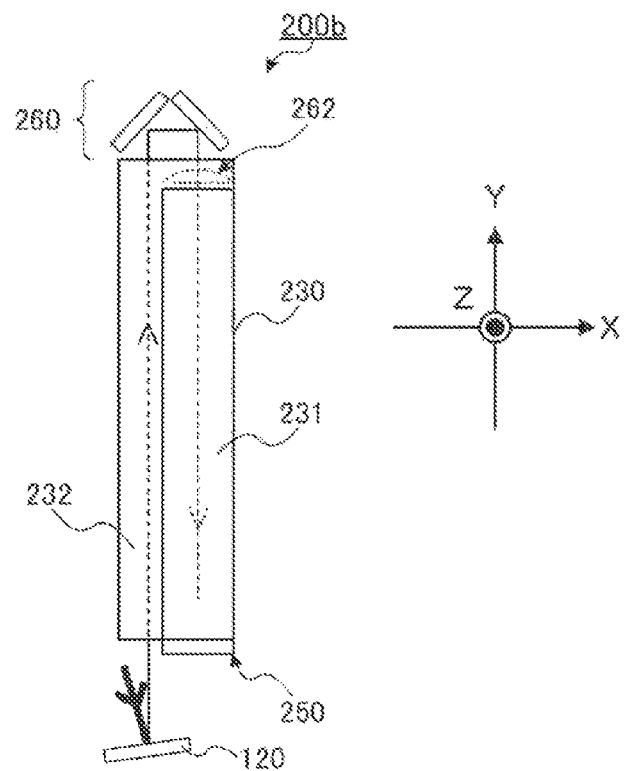
FIG. 30 is a side view of a planar light source apparatus according to Application 2 of Embodiment 2.

FIG. 30 is a side view showing a planar light source apparatus according to Application 2 of Embodiment 2 from the Z axis direction, and corresponds to FIG. 29. As shown in FIG. 30, with planar light source apparatus 200b, instead of cylindrical Fresnel lens 261 of FIG. 29, aspheric lens 262 is arranged as a focus lens, on the optical paths for diffusely-reflected lights to reach light guiding plate 230 from light deflecting part 260.

Aspheric lens 262 narrows down a light having been incident from light deflecting part 260 and allows the light to be incident on light guiding plate 230.

This planar light source apparatus 200b can easily reflect diffusely-reflected lights back and forth between the main surfaces of light guiding plate 230. By this means, it is possible to diffuse a light widely at a stage after lights are incident on light guiding plate 230, and make the beam density of a planar light uniform.

Note that, as first reflecting plate 250, a reflecting mirror, a reflecting plate or a reflection-type diffusing plate in which grooves are provided in the Z axis direction, can be used. In this regard, the same applies to the following embodiments and applications. Further, instead of aspheric lens 262, a cylindrical lens can be used.

(Application 3 of Embodiment 2)

Figure 31:
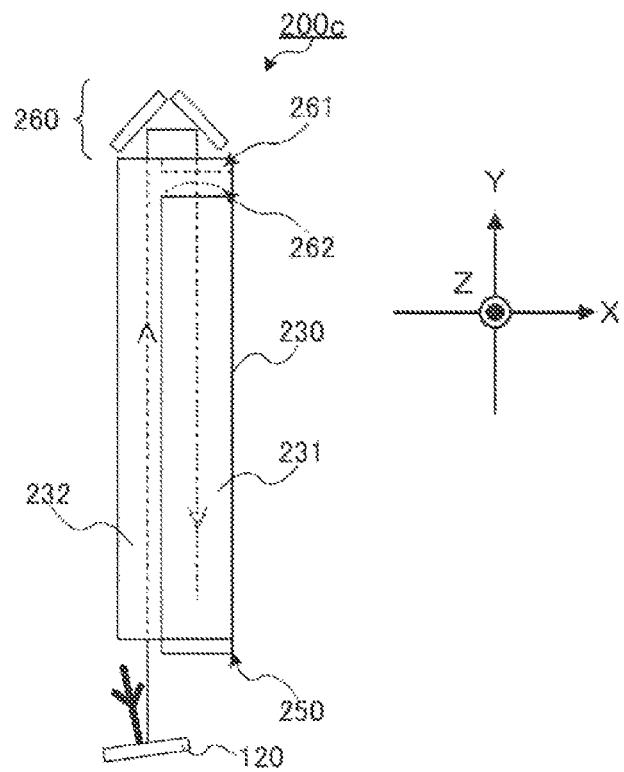
FIG. 31 is a side view of a planar light source apparatus according to Application 3 of Embodiment 2.

FIG. 31 is a side view showing a planar light source apparatus according to Application 3 of Embodiment 2 from the Z axis direction, and corresponds to FIG. 29 and FIG. 30. As shown in FIG. 31, with planar light source apparatus 200c, cylindrical Fresnel lens 261 shown in FIG. 29 and aspheric lens 262 shown in FIG. 30 are arranged on the optical paths for diffusely-reflected lights to reach light guiding plate 230 from light deflecting part 260.

This planar light source apparatus 200c can further make the beam density of a planar light uniform.

(Embodiment 3)

A planar light source apparatus that makes a device such that a laser light is incident on a diffusing plate reflecting surface of a reflecting-type diffusing plate at a small angle of incidence, will be explained as Embodiment 3 of the present invention.

Figure 32:
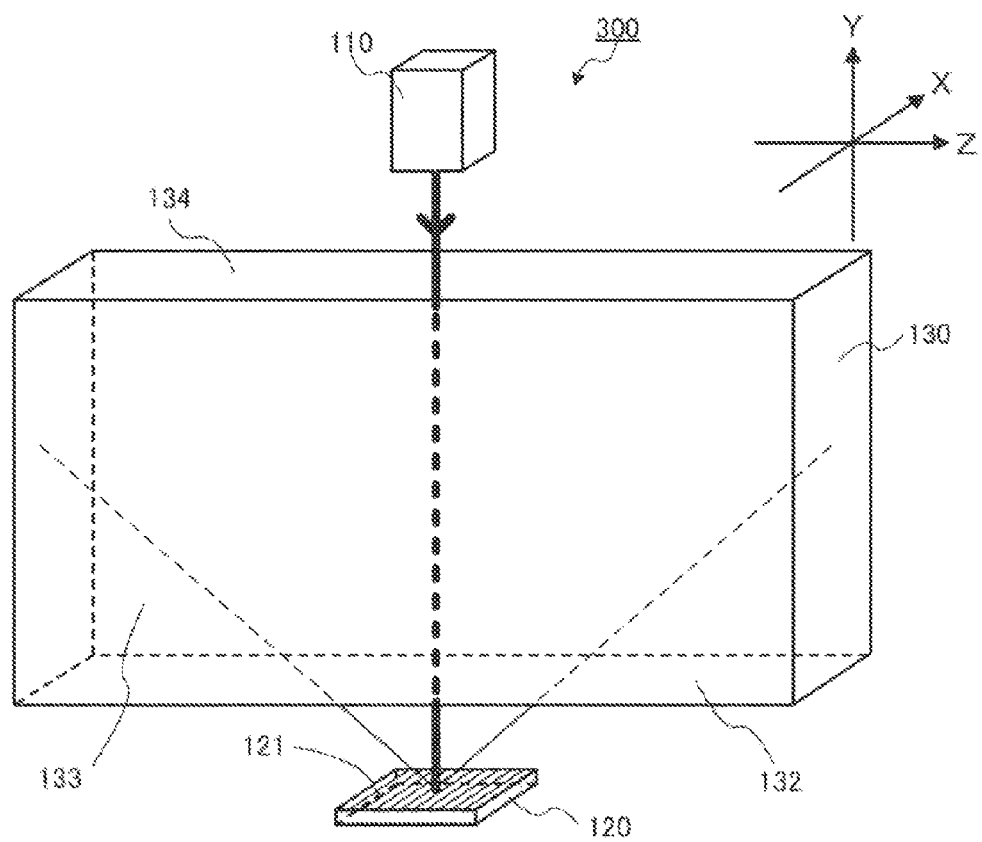
FIG. 32 is a perspective view showing a configuration of a planar light source apparatus according to Embodiment 3 of the present invention.

FIG. 32 is a perspective view showing a configuration of a planar light source apparatus according to Embodiment 3 of the present invention.

As shown in FIG. 32, planar light source apparatus 300 positions and orients laser light source 110 such that a laser light is incident on diffusing plate reflection surface 121 of reflection-type diffusing plate 120 passing inside light guiding plate 130.

Figure 33:
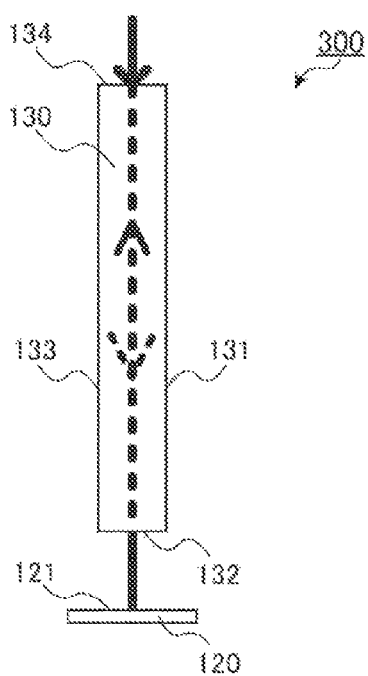
FIG. 33 is a side view of a planar light source apparatus according to Embodiment 3.

FIG. 33 is a side view showing planar light source apparatus 300 shown in FIG. 32 from the Z axis direction.

As shown in FIG. 33, planar light source apparatus 300 allows a laser light emitted from laser light source 110 to propagate from second end surface 134 to first end surface 132 in parallel to the Y axis without crossing emission surface 131 or back surface 133 of light guiding plate 130.

Thus, planar light source apparatus 300 according to the present embodiment can allow a laser light to be incident on diffusing plate reflecting surface 121 of reflection-type diffusing plate 120 at a small angle of incidence. By this means, it is possible to avoid the phenomenon explained using FIG. 11 and FIG. 12 caused by diffusing the diffusely-reflected lights that are widely diffused in the X axis direction and radiated on the whole, that is, the phenomenon where light conversion efficiency decreases or the phenomenon where a planar light becomes uneven.

Hereinafter, applications of planar light source apparatus 300 according to Embodiment 3 will be explained.

(Application 1 of Embodiment 3)

Figure 34A:
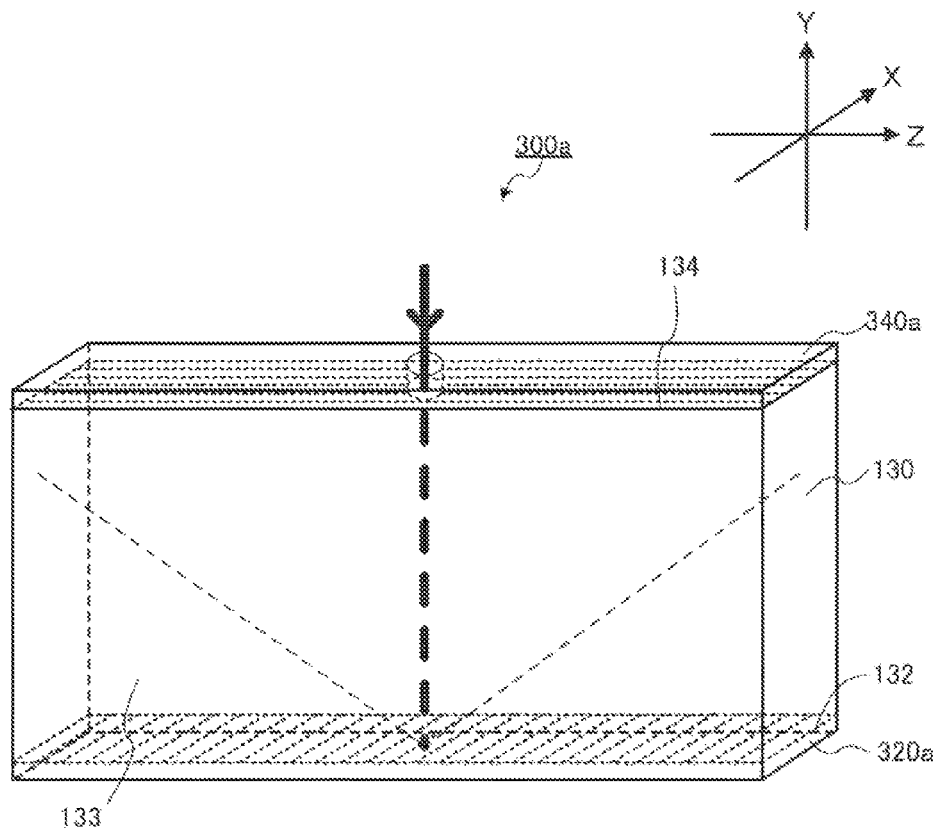
FIG. 34A is a perspective view showing a configuration of a planar light source apparatus according to Application 1 of Embodiment 3.

FIG. 34A is a perspective view showing a configuration of a planar light source apparatus according to Application 1 of Embodiment 3, and corresponds to FIG. 32. As shown in FIG. 34A, instead of reflection-type diffusing plate 120 shown in FIG. 32, light planar source apparatus 300a has reflection-type diffusing plate 320a in first end surface 132 of light guiding plate 130. Further, planar light source apparatus 300a has second reflecting plate 340a as a reflecting member, in second end surface 134 of light guiding plate 130.

Figure 34B:
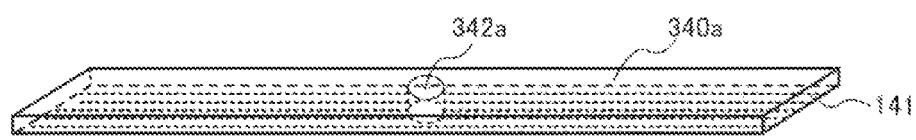
FIG. 34B is a perspective view showing only a configuration of a second reflecting plate shown in FIG. 34A.

FIG. 34B is a perspective view showing only a configuration of second reflecting plate 340a shown in FIG. 34a, and corresponds to FIG. 18B of Embodiment 1. As shown in FIG. 34B, second reflecting plate 340a employs the same configuration as second reflecting plate 140 shown in FIG. 18B except that opening 342a is formed in the area where a laser light passes.

Figure 34C:
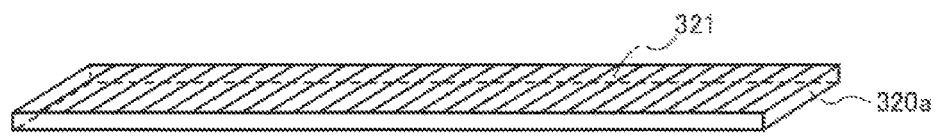
FIG. 34C is a perspective view showing only a configuration of a reflection-type diffusing plate shown in FIG. 34A.

FIG. 34C is a perspective view showing only a configuration of reflection-type diffusing plate 320a shown in FIG. 34A, and corresponds to FIG. 22B of Embodiment 1. As shown in FIG. 34C, reflection-type diffusing plate 320a employs the same configuration as first reflecting plate 150c shown in FIG. 22B except that opening 152 is not provided and the surface on the light guiding plate 130 side is made diffusing plate reflecting surface 321.

With this reflection-type diffusing plate 320a, it is possible to integrally provide reflection-type diffusing plate 320a such that reflection-type diffusing plate 320a also has the function of the first reflecting plate of Embodiment 1, and simplify a configuration and make the apparatus smaller, thereby realizing lower cost. Further, it is possible to diffuse the diffusely-reflected lights in the Z axis direction without blocking the optical path of a laser light.

(Application 2 of Embodiment 3)

Figure 35A:
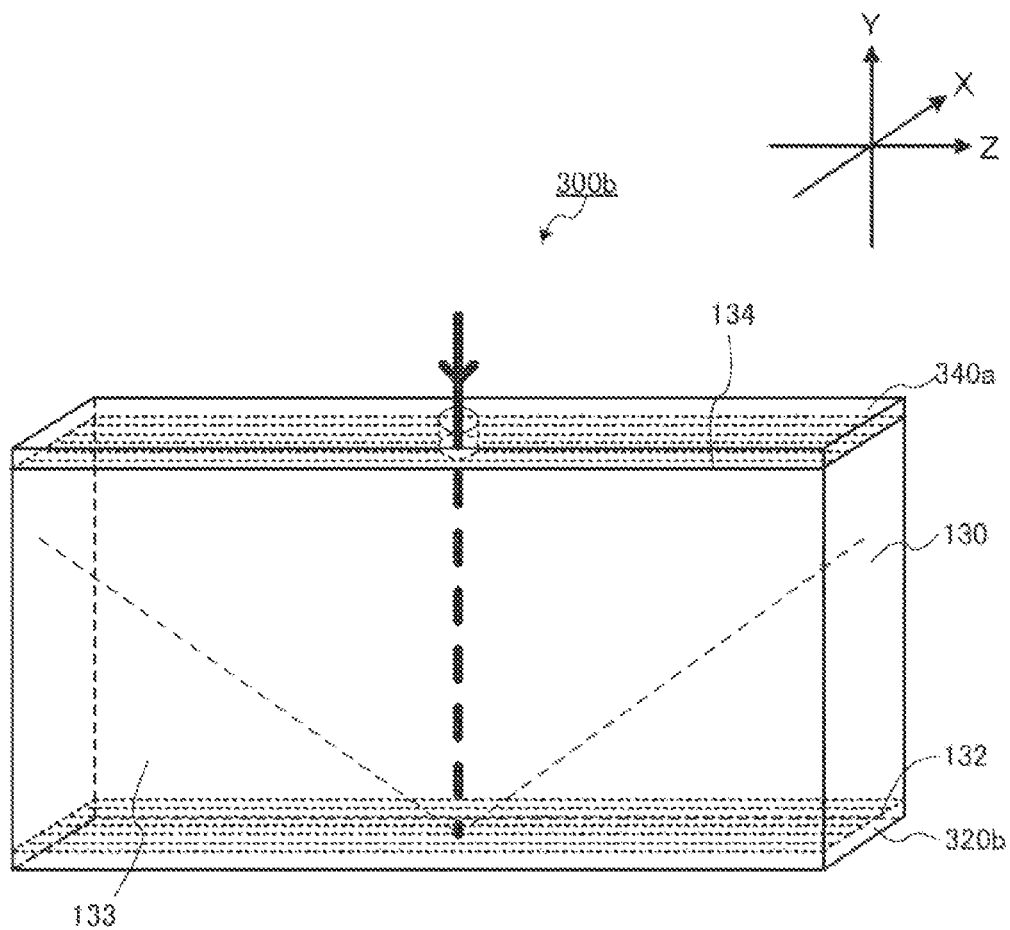
FIG. 35A is a perspective view showing a configuration of a planar light source apparatus according to Application 2 of Embodiment 3.

FIG. 35A is a perspective view showing a configuration of a planar light source apparatus according to Application 2 of Embodiment 3, and corresponds to FIG. 34A. As shown in FIG. 35A, instead of reflection-type diffusing plate 320a shown in FIG. 34A, planar light source apparatus 300b has reflection-type diffusing plate 320b employing a different configuration from reflection-type diffusing plate 320a.

Figure 35B:
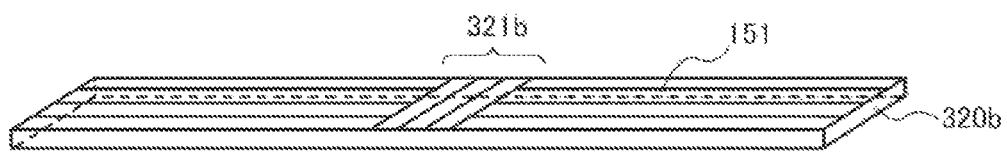
FIG. 35B is a perspective view showing only a configuration of a reflection-type diffusing plate shown in FIG. 35A.

FIG. 35B is a perspective view showing only a configuration of reflection-type diffusing plate 320b shown in FIG. 35A, and corresponds to FIG. 34C and FIG. 21B of Embodiment 1. As shown in FIG. 35B, reflection-type diffusing plate 320b employs the same configuration as reflection-type diffusing plate 150 shown in FIG. 21B except that opening 152 is not provided, and diffusing plate reflecting surface 321b is provided in an area of the surface on the light guiding plate 130 side on which a laser light is radiated.

This planar light source apparatus 300b can further diffuse the diffusely-reflected lights in the X axis direction without blocking diffusion of the diffusely-reflected lights in the Z axis direction.

(Application 3 of Embodiment 3)

Figure 36A:
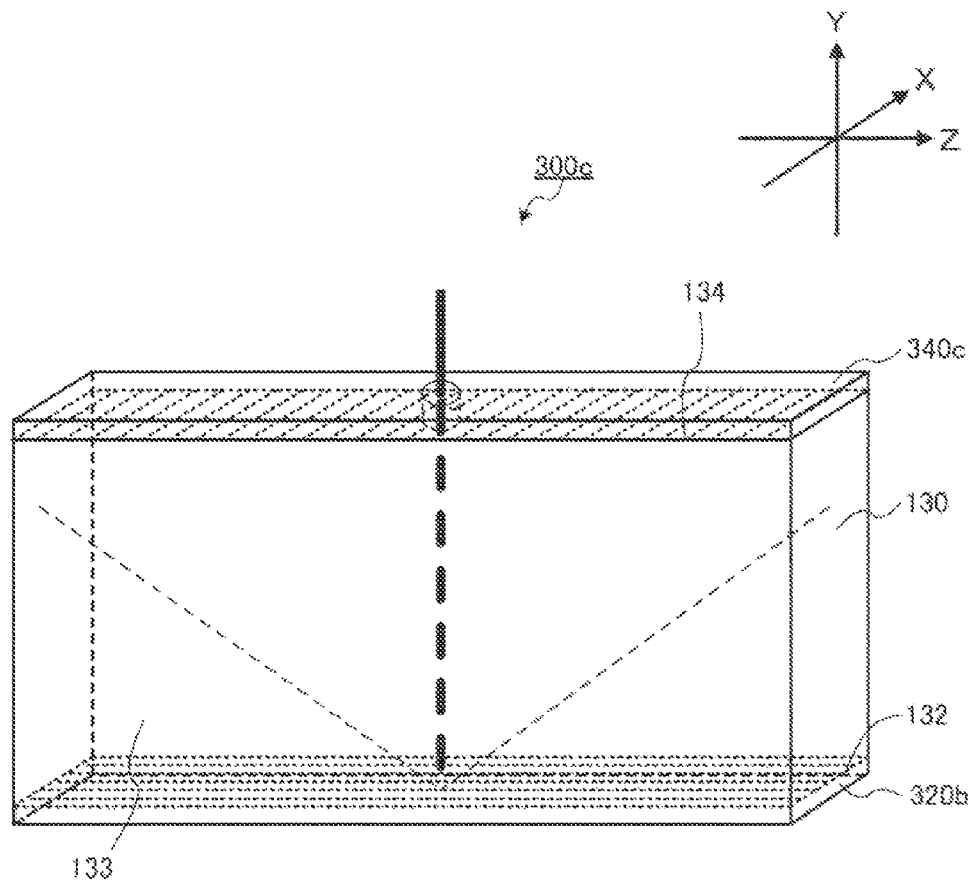
FIG. 36A is a perspective view showing a configuration of a planar light source apparatus according to Application 3 of Embodiment 3.

FIG. 36A is a perspective view showing a configuration of a planar light source apparatus according to Application 3 of Embodiment 3, and corresponds to FIG. 35A. As shown in FIG. 36A, instead of second reflecting plate 340a shown in FIG. 35A, planar light source apparatus 300c includes second reflecting plate 340c employing a different configuration from second reflecting plate 340a.

Figure 36B:
FIG. 36B is a perspective view showing only a configuration of a second reflecting plate shown in FIG. 36A.

FIG. 36B is a perspective view showing only a configuration of second reflecting plate 340c shown in FIG. 36A, and corresponds to FIG. 34B and FIG. 23B of Embodiment 1. As shown in FIG. 36B, second reflecting plate 340c employs the same configuration as reflection-type diffusing plate 140d shown in FIG. 23B except that opening 342c is formed in the area where a laser light passes.

This planar light source apparatus 300c can further diffuse the diffusely-reflected lights in the Z axis direction. Further, with each application of Embodiment 3, it is possible to vary the intervals between grooves of the reflection-type diffusing plate as described above.

Note that, although cases have been explained with the above-explained embodiments where a laser light incident on reflection-type diffusing plate 120 is one white laser light, the type of a laser light and the way a laser light is incident on reflection-type diffusing plate 120 are not limited to this.

Hereinafter, modified examples of how a laser light is incident on reflection will be explained.

Figure 37:
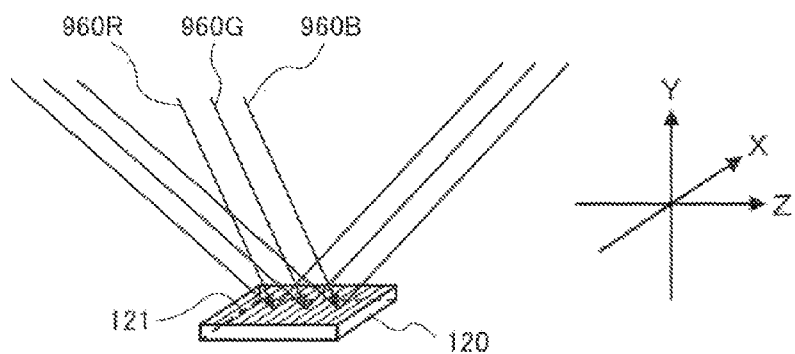
FIG. 37 shows a first modified example of how laser lights are incident on a reflection-type diffusing plate according to Embodiment 1.

FIG. 37 illustrates a first modified example of how a laser is light is incident on reflection-type diffusing plate 120. With this modified example, as shown in FIG. 37, laser lights 960R, 960G and 960B of RGB (red, green and blue) are aligned in the Z axis direction to be incident individually on reflection-type diffusing plate 120. Note that the positions on which laser lights 960R, 960G and 960B are incident are preferably in a range such that the positions can be virtually regarded as one place. Further, laser lights 960R, 960G and 960B may be aligned in the X axis direction instead of the Z axis direction. Further, in case where laser lights 960R, 960G and 960B have difficulty propagating in parallel to each other at short intervals, laser lights 960 may be incident on diffusing plate reflecting surface 121 at different angles of incidence per color, and the spots to reflect laser lights 960R, 960G and 960B may be adjusted. By this means, a special apparatus for allowing mixed propagation of a laser light of each color needs not to be provided, so that it is possible to make the apparatus smaller, thereby realizing lower cost.

Figure 38:
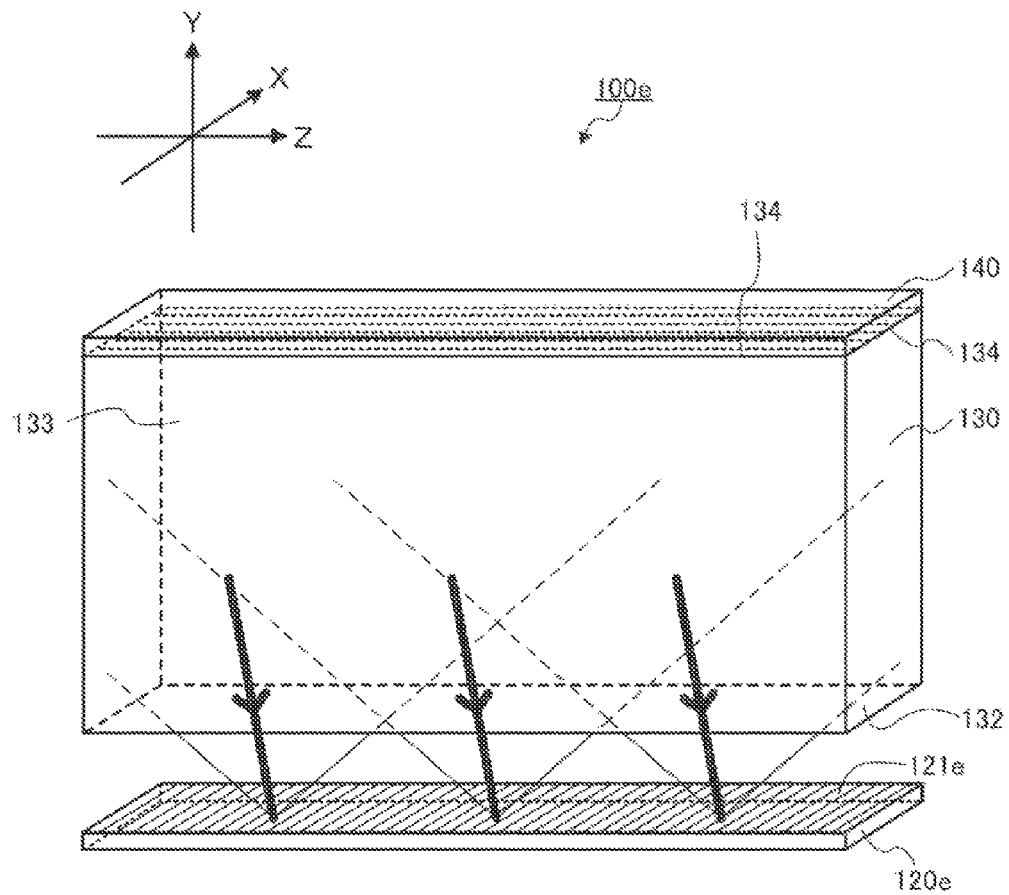
FIG. 38 shows a second modified example of how laser lights are incident on a reflection-type diffusing plate according to Embodiment 1.

FIG. 38 shows a second modified example of how a laser light is incident on reflection-type diffusing plate 120, and corresponds to FIG. 18A of Embodiment 1.

As shown in FIG. 38, planar light source apparatus 100e according to this modified example has reflection-type diffusing plate 120e having virtually the same size as first end surface 132 of light guiding plate 130. Further, although not shown, planar light source apparatus 100e has a beam splitter for splitting in a plurality of directions a white laser light outputted from laser light source 110. Furthermore, although not shown, planar light source apparatus 100e has an optical system that allows a plurality of laser lights obtained by splitting the white light by the beam splitter, to be incident on different positions of diffusing plate reflecting surface 121e of reflection-type diffusing plate 102.

This planar light source apparatus 100e can widen the in width of diffusion of diffusely-reflected lights, make brightness of the diffusely-reflected lights vary less and have a more uniform planar light.

Note that, in case where an opening matching an area where diffusely-reflected lights pass, or an area where a laser light passes is provided in the reflection-type diffusing member, a plurality of openings may be provided, or an opening area of the opening may be widened appropriately.

Further, another modified example of how a laser light is incident on reflection-type diffusing plate 120, for example, a laser light may be led by an optical fiber to the vicinity of diffusing plate reflecting surface 121 of reflection-type diffusing plate 120. In this case, the optical fiber is flexible and small, so that it is possible to make smaller the optical system for leading a laser light to diffusing plate reflecting surface 121. Further, by using the optical fiber in this way, it is possible to easily decrease an angle of incidence θi of a laser light incident on diffusing plate reflecting surface 121. Furthermore, laser light source 110 and its driving circuit may be separately accommodated in another housing with Embodiment 1 and Embodiment 2, so that it is possible to shorten the distance between reflection-type diffusing plate 120 and first end surface 132 of light guiding plate 130 and further miniaturize the apparatus.

In addition, by linear vibrating or rotary vibrating the above reflection-type diffusing member (i.e. reflection-type diffusing plate 120 and reflecting plates 140 and 150), it is possible to reduce speckle noise of a planar light (or a light emitted from the liquid crystal panel) to be emitted. This is because speckle contrast is decreased by changing the speckle pattern of a laser light over time. Particularly, it is effective to periodically or non-periodically move the reflection-type diffusing member (reflection-type diffusing plate 120) on which a laser light is incident first without changing the direction of its grooves.

(Embodiment 4)

Figure 39A:
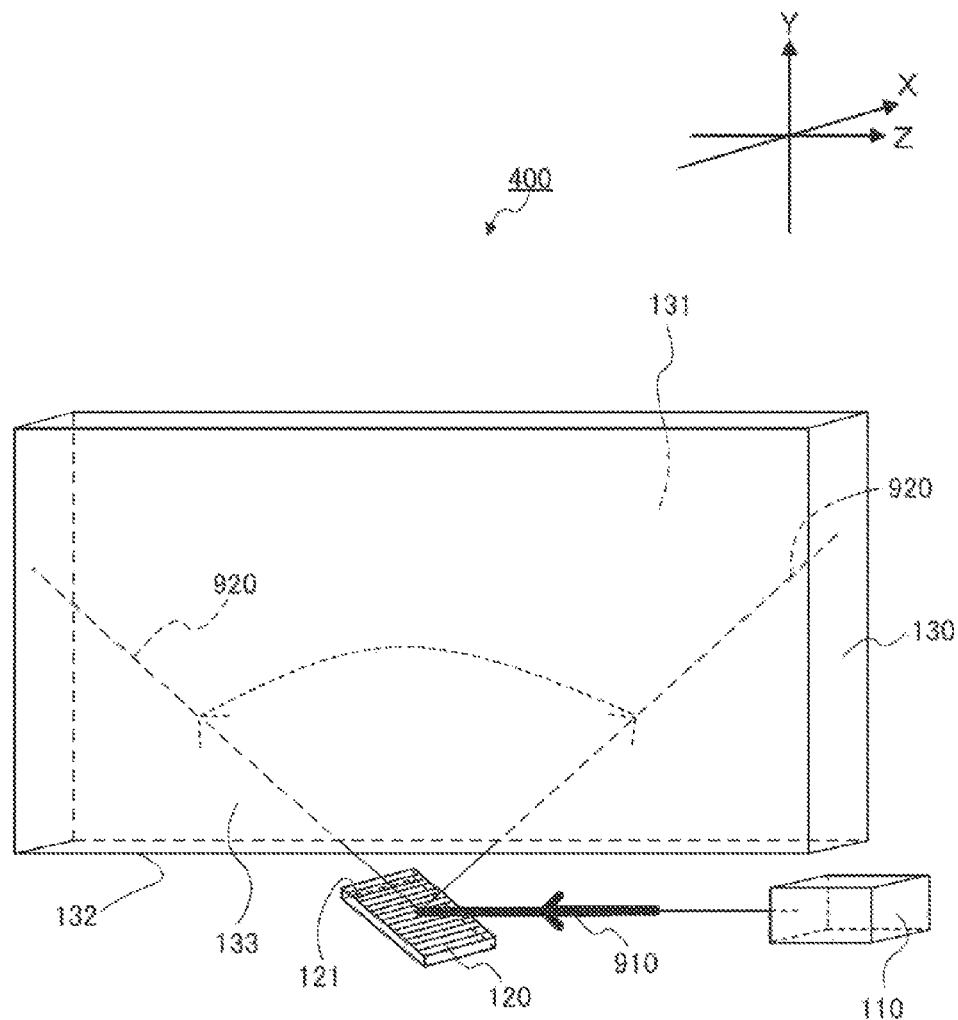
FIG. 39A is a perspective view showing a configuration of a planar light source apparatus according to Embodiment 4 of the present invention.
Figure 39B:
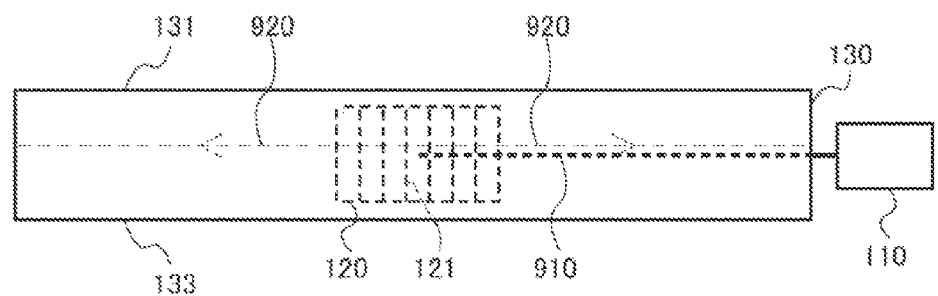
FIG. 39B is a schematic diagram showing the planar light source apparatus of FIG. 39A from above.

FIG. 39A is a perspective view showing a configuration of a planar light source apparatus according to Embodiment 4 of the present invention, and corresponds to FIG. 3 of Embodiment 1. Further, FIG. 39B is a schematic view showing the planar light source apparatus of FIG. 39A from above.

As shown in FIG. 39, planar light source apparatus 400 according to the present embodiment differs from Embodiment 1 in that laser light source 110 is arranged below light guiding plate 130, reflection-type diffusing plate 120 is arranged below light guiding plate 130 and diffusing plate reflecting surface 122 is arranged inclining at an angle with respect to first end surface 132 of light guiding plate 130 in the X axis direction. Further, the present embodiment differs from Embodiment 1 in that laser light source 110 is positioned and oriented such that a laser light to be emitted is incident on diffusing plate reflecting surface 121 of reflection-type diffusing plate 120 from the direction orthogonal to the groove structures of diffusing plate reflecting surface 121 when the laser light is reflected and diffused for the first time on reflection-type diffusing plate 120. Note that laser light source 110 may be positioned and oriented differently as long as a laser light can be made finally incident on diffusing plate reflecting surface 121 of reflection-type diffusing plate 120 from the direction orthogonal to the groove structures of diffusing plate reflecting surface 121. Hereinafter, in each drawing, laser light source 110 will not be shown appropriately.

According to this configuration providing diffusing plate reflecting surface 121 at an angle, it is possible to have diffusely-reflected lights by radiating a laser light from laser light source 110 in an arcuate pattern.

Next, the detailed configuration of reflection-type diffusing plate 120 of the present embodiment and the principle of diffusion of reflected lights will be explained.

Figure 40A:
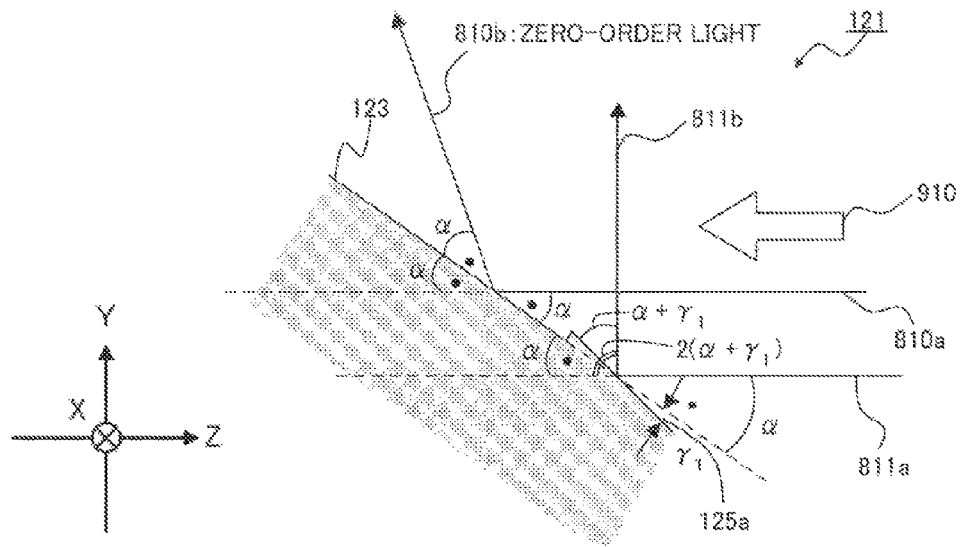
FIG. 40A is a magnified cross-sectional view of an example of a reflection-type diffusing plate according to Embodiment 4.

FIG. 40A illustrates the principle of diffusion of reflected lights in reflection-type diffusing plate 120, and is a magnified cross-sectional view magnifying a partial cross-section when an example of reflection-type diffusing plate 120 is cut in the Y-Z plane.

As shown in FIG. 40A, diffusing plate reflecting surface 121 has flat portions 123 (i.e. reference plane) inclined $-\alpha$ degrees in the X axis direction with respect to the Z axis, and inclined surface 125a inclined $-\gamma_1$ degrees in the X axis direction with respect to these flat portions 123. If incident direction 910 of a laser light from the laser light source is the negative direction of the Z axis, reflected light 810b (hereinafter "zero-order light") of laser light 810a that is incident on flat portion 123 forming an angle of $\alpha$ degrees with flat portion 123, forms an angle of $2\alpha$ degrees in the clockwise direction with respect to the Z axis. By contrast with this, reflected light 811b of laser light 811a that is incident on inclined surface 125a forming an angle of "$\alpha+\gamma_1$" degrees with inclined surface 125a, forms an angle of "$2(\alpha+\gamma_1)$" degrees in the clockwise direction with respect to the Z axis. As a result, reflected light 811b in inclined surface 125a inclined $-\gamma_1$ degrees in the X axis direction with respect to flat portion 123 is diffused $2\gamma_1$, degrees with respect to zero-order light 810b.

Figure 40B:
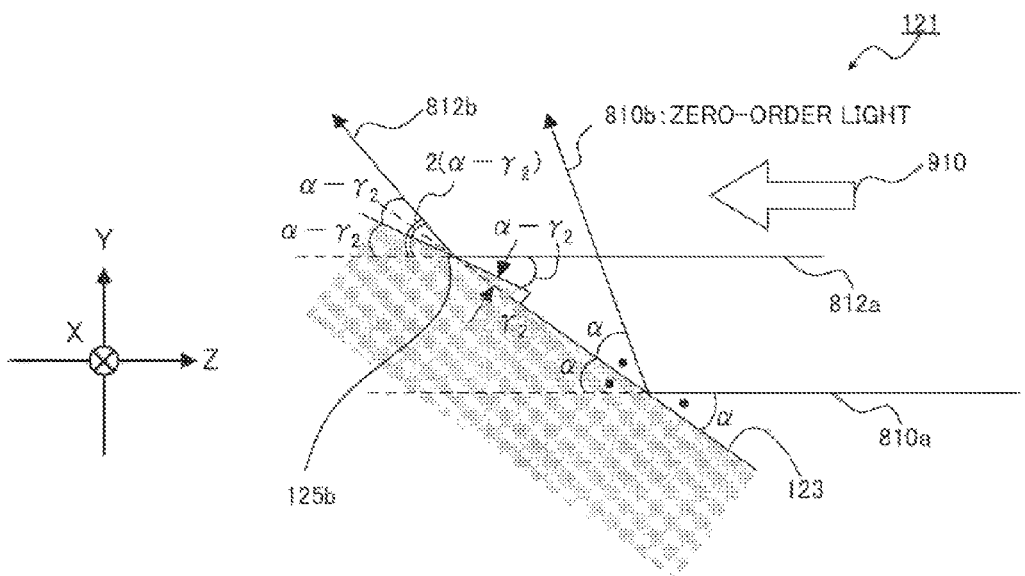
FIG. 40B is a magnified cross-sectional view of another example of a reflection-type diffusing plate according to Embodiment 4.

FIG. 40B also illustrates the principle of reflection-type diffusing plate 120, and is a magnified cross-sectional magnifying a partial cross-section when another example of reflection-type diffusing plate 120 is cut in the Y-Z plane.

Also in this case, assuming that the same applies as in FIG. 40A, reflected light 812b in inclined surface 125b inclined $\gamma_2$ degrees in the X axis direction with respect to flat portions 123 (i.e. reference plane) is diffused $2\gamma_2$ degrees with respect to zero-order light 810b.

Figure 41A:
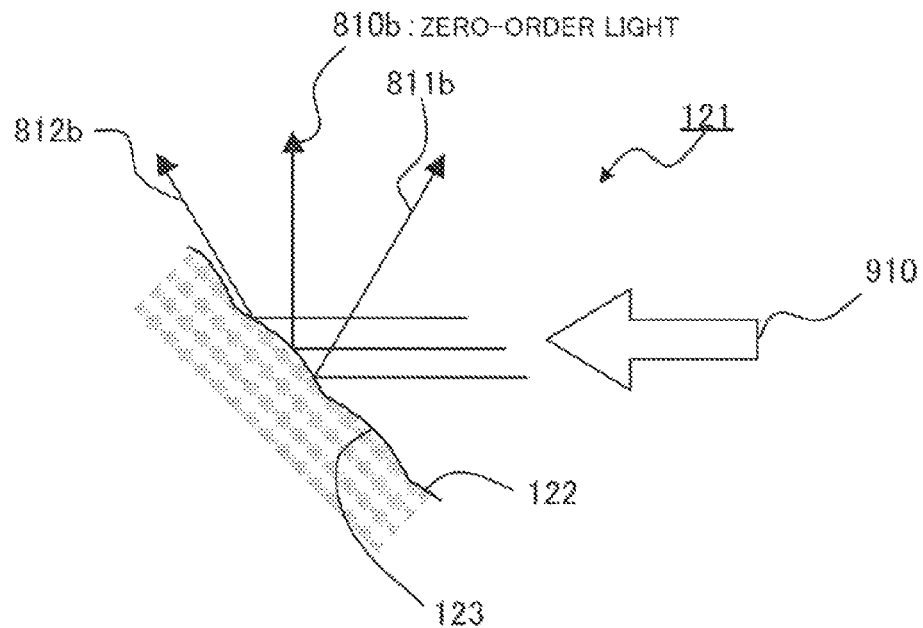
FIG. 41A is a magnified cross-sectional view of another example of a reflection-type diffusing plate according to Embodiment 4.

FIG. 41A is a magnified cross-sectional view magnifying a partial cross-section when another example of reflection-type diffusing plate 120 is cut in the Y-Z plane.

In reflection-type diffusing plate 120 shown in FIG. 41A, a plurality of groove structures 122 with a cross-section of a denting reverse triangle having two inclined surfaces inclined $-\gamma$ degrees and $\gamma$ degrees in the X axis direction with respect to flat portions 123 (i.e. reference plane). Flat portions 123 are formed between adjacent groove structures 122. According to this configuration, in a macro view, reflection-type diffusing plate 120 serves as a reflection-type diffusing plate that diffuses reflected lights $\pm 2\gamma$ degrees with respect to zero-order light 810b as shown in FIG. 41B.

Figure 42A:
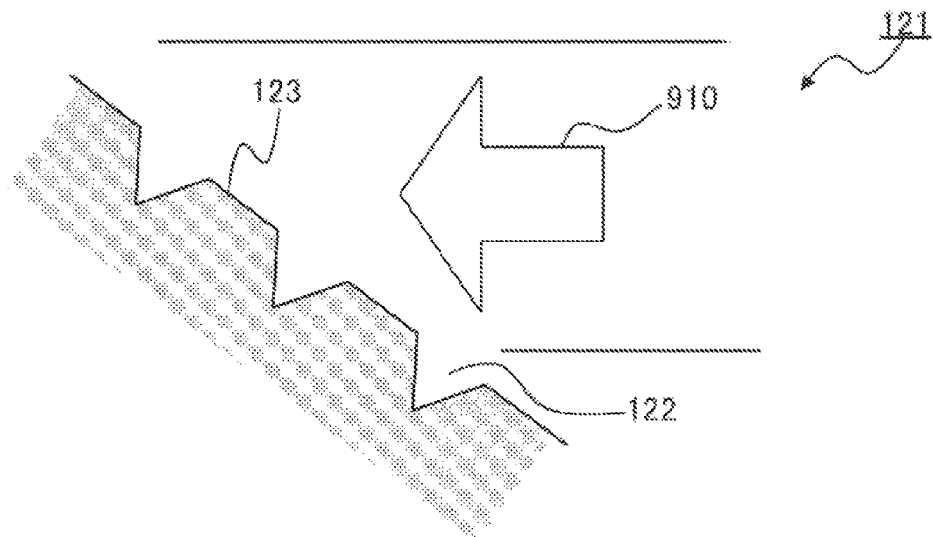
FIG. 42A is a main part cross-sectional view showing a first example of groove structures provided in a reflection-type diffusing plate according to Embodiment 4.
Figure 42B:
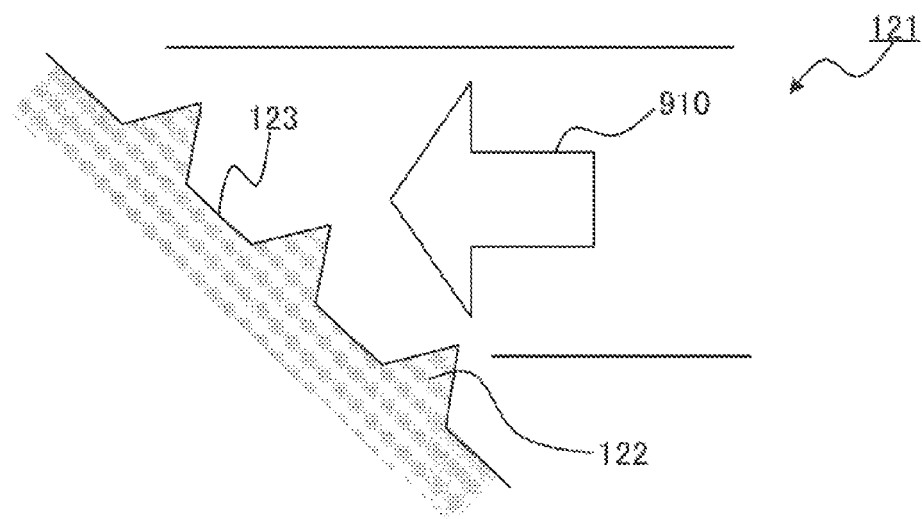
FIG. 42B is a main part cross-sectional view showing a second example of groove structures provided in a reflection-type diffusing plate according to Embodiment 4.

FIG. 42A is a main part cross-sectional view showing a first example of groove structures provided in reflection-type to diffusing plate 120, and corresponds to FIG. 41A and FIG. 5 of Embodiment 1. FIG. 42B is a main part cross-sectional view showing a second example of groove structures provided in reflection-type diffusing plate 120, and corresponds to FIG. 42A and FIG. 4 of Embodiment 1. The groove structures provided in reflection-type diffusing plate 120 may be made groove structures 122 with a cross-sectional shape of a denting reverse triangle as shown in FIG. 42A, or groove structures 122 with a cross-sectional shape of a projecting triangle as shown in FIG. 42B.

Figure 41B:
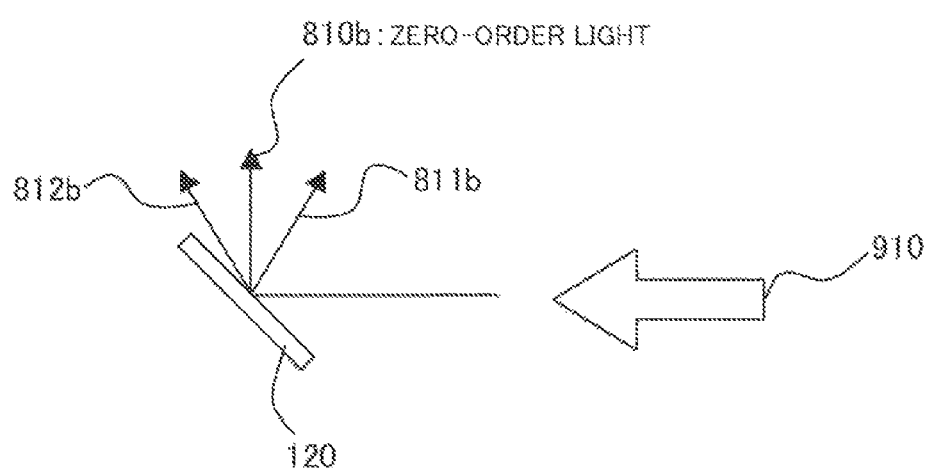
FIG. 41B is a macro view of a reflection-type diffusing plate of FIG. 41A.

Actually, an incident light has an angle of divergence, the inclination of the triangle has a certain range of an angle, and further multireflection occurs in concave parts (i.e. grooves), convex parts (i.e. projections) and the flat portions, so that the laser light having been incident on diffusing plate reflecting surface 121 of reflection-type diffusing plate 120 is not only diffused only in three directions as shown in FIG. 41B, but also diffused at various angles in, for example, an arcuate pattern.

Similar to Embodiment 1, above-described groove structures 122 may be formed by, for example, making diffusing plate reflecting surface 121 a metal plate to which mirror finishing is applied, and by applying hairline finishing to this surface.

Reflection-type diffusing plate 120 employing the above configurations shown in FIG. 40A, FIG. 40B and FIG. 41 can radiate an incident laser light in an arcuate pattern by reflected diffusion, and converts the laser light into wide and uniform diffusely-reflected lights.

Note that, for example, diffusion of diffuse reflected light 811b from diffusing plate reflecting surface 121, at an angle crossing the Z axis in FIG. 40A is not preferable from the perspectives of the arrangement and the efficiency of the optical system such as laser light source 110, light guiding plate 130 and so on. Accordingly, inclined surface 125a for diffusing the reflected lights in a more rightward direction compared to zero-order light 810b in the Y-Z plane preferably satisfies following equation 1.

$$2(\alpha+\gamma_1)<180 \qquad (1)$$

Further, reflection of reflected light 812b from diffusing plate reflecting surface 121, at a smaller angle with respect to the Z axis than the inclination of flat portions 123 (i.e. $-\alpha$ degrees) is not preferable from the perspectives of the restriction and efficiency of diffusion angles and the arrangement of the optical system. Accordingly, inclined surface 125b for diffusing reflected lights in a more leftward direction compared to zero-order light 810b in the Y-Z plane preferably satisfies following equation (2).

$$2(\alpha-\gamma_2)>\alpha \qquad (2)$$

Actually, although it depends on the intervals between grooves, the depths of dents and the heights of grooves, inclined surfaces 125a and 125b of diffusing plate reflecting surface 121 preferably satisfy above equation 1 and equation 2, respectively. For example, a case is assumed where inclined surfaces 125a and 125b inclined $\gamma_1$ degrees in the clockwise direction and $\gamma_2$ degrees in the counterclockwise direction, respectively with respect to diffusing plate reflecting surface 121, are formed in diffusing plate reflecting surface 121 arranged $-\alpha$ degrees in the X axis direction with respect to the Z axis, and the incident laser light is incident on diffusing plate reflecting surface 121 once and is emitted. In this case, as long as above equation 1 and equation 2 are satisfied, diffusing plate reflecting surface 121 emits zero-order light 810b $-\alpha$ degrees with respect to the Z axis, and emits diffusely-reflected lights $-2\gamma_2$ to $2\gamma_1$ degrees with respect to the zero-order light. That is, the diffusion angle is "$2\gamma_1+2\gamma_2$" degrees.

As described above, in case where an incident laser light is a parallel light, theoretically a laser light is diffused only in three directions (see FIG. 41B), and therefore beam densities of diffusely-reflected lights vary. Accordingly, it is preferable to make beam densities of diffusely-reflected lights uniform by providing a certain angle of divergence to the incident laser light actively.

In addition, to further make the variability of beam densities of diffusely-reflected lights more uniform, it is also possible to, for example, arrange a plurality of groove structures 122 of different inclinations, provide more fine concavities and convexities in the surfaces of groove structures 122 or arrange grove structures having curved surfaces. In case where, for example, the target maximum diffusion angle in a rightward direction compared to zero-order light 810b is made $2\gamma_1$ as a measure, inclining angles of inclined surfaces 125a with respect to is flat portions 123 may include a plurality of angles between 0 degrees to $\gamma_1$ degrees while satisfying above equation 1. Similarly, in case where the target maximum diffusion angle in a leftward direction compared to zero-order light 810b is made $2\gamma_2$, inclining angles of inclined surfaces 125a with respect to flat portions 123 may include a plurality of angles between 0 degrees and $\gamma_2$ degrees while satisfying above equation 2. Further, there are cases where it is more convenient to emit diffusely-reflected lights symmetrically with respect to zero-order light 810b, and therefore $\gamma_1$ and $\gamma_2$ only need to be made equal in these cases. By this means, it is possible to radiate diffusely-reflected lights having diffuse angles of $\pm 2\gamma$ degrees at maximum with respect to zero-order light 810b, in an arcuate pattern in a state where beam densities vary little.

Figure 43:
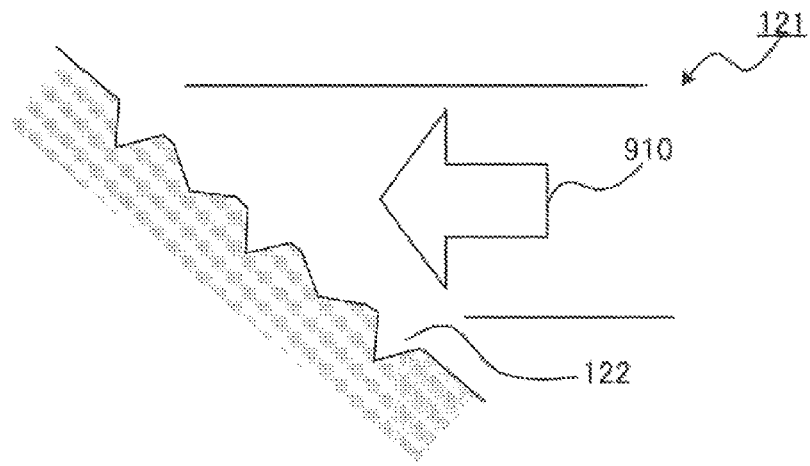
FIG. 43 is a main part cross-sectional view showing a third example of groove structures provided in a reflection-type diffusing plate according to Embodiment 4.

FIG. 43 is a main part cross-sectional view showing a third example of groove structures provided in reflection-type diffusing plate 120, and corresponds to FIG. 42A and FIG. 6 of Embodiment 1. Groove structures 122 of diffusing plate reflecting surface 121 shown in FIG. 43 include a plurality of concave parts having different vertex angles of triangular cross-sections.

Figure 44:
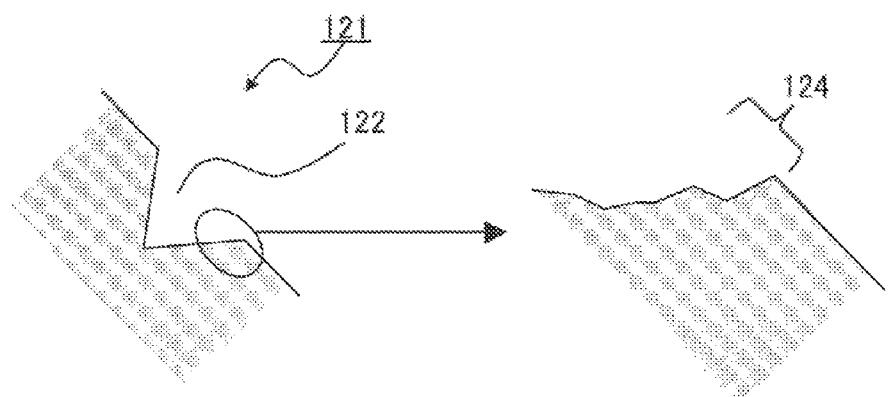
FIG. 44 is a main part cross-sectional view showing a fourth example of groove structures provided in a reflection-type diffusing plate according to Embodiment 4.

FIG. 44 is a main part cross-sectional view and a partial magnified view showing a fourth example of groove structures provided in reflection-type diffusing plate 120. Groove structures 122 of diffusing plate reflecting surface 121 shown in FIG. 44 include fine concavities and convexities 124 in their surfaces.

Figure 45:
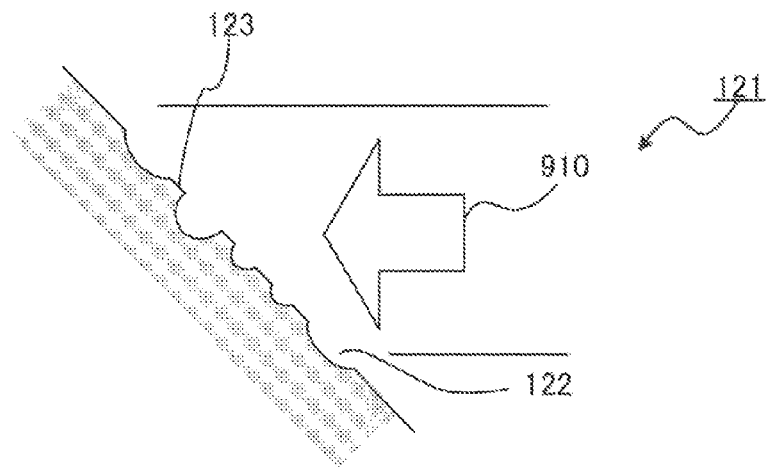
FIG. 45 is a main part cross-sectional view showing a fifth example of groove structures provided in a reflection-type diffusing plate according to Embodiment 4.

FIG. 45 is a main part cross-sectional view showing a fifth example of groove structures provided in reflection-type diffusing plate 120, and corresponds to FIG. 42A and FIG. 8 of Embodiment 1. Groove structures 122 of diffusing plate reflecting surface 121 shown in FIG. 45 have a plurality of arcuate cross-sections of different sizes.

Groove structures 122 shown in FIG. 43 to FIG. 45 are adopted, so that it is possible to deflect a laser light in more directions and further make the variability of beam densities of diffusely-reflected lights more uniform compared to the case where groove structures 122 shown in FIG. 40A, FIG. 40B and FIG. 41 are adopted. Note that groove structures 122 shown in FIG. 43 to FIG. 45 may adopt projecting structures or dented structures with respect to flat portions 123 similar to the case of groove structures 122 shown in FIG. 40A, FIG. 40B and FIG. 41.

Note, in any of above groove structures 122, flat portions 123 of diffusing plate reflecting surface 121 are portions to simply reflect a laser light without diffusing a laser light, and therefore the number of flat portions 123 is preferably as little as possible. To be more specific, the proportion of flat portions 123 with respect to the beam diameter of a laser light in the direction orthogonal to incident direction 910 of the laser light, that is, in the Y axis direction, is preferably, for example, 20 percent or less when the diffusion efficiency is taken into account.

Further, similar to Embodiment 1, Y axis direction components of pitches (i.e. arrangement intervals) between groove structures 122 are preferably half of the beam diameter or less. Furthermore, even if groove structures 122 have random sizes or random shapes, they only need to be uniform statistically in a range of the beam diameter in the Y axis direction. Particularly with the present embodiment, this can alleviate a demand for the accuracy of the position of a laser light incident on reflection-type diffusing plate 120 in the Y axis direction.

Further, as explained in Embodiment 1, when the width of grooves becomes closer to the order of nanometers, a laser light strongly shows the effect of diffraction. Furthermore, even if the groove shapes are rectangular, a laser light widens leftward and rightward with respect to zero-order light 810b in the Y-Z plane.

Still further, the variability of beam densities of diffusely-reflected lights in reflection-type diffusing light 120 is made uniform in order to emit a uniform planar light from emission surface 131 of light guiding plate 130. Hence, there are cases where, depending on light propagation characteristics of light guiding plate 130, by varying beam densities of diffusely-reflected lights of reflection-type diffusing plate 120 in a predetermined distribution without making the beam densities uniform, it is possible to emit a uniform planar light from the emission surface of light guiding plate 130 as a result.

Figure 46:
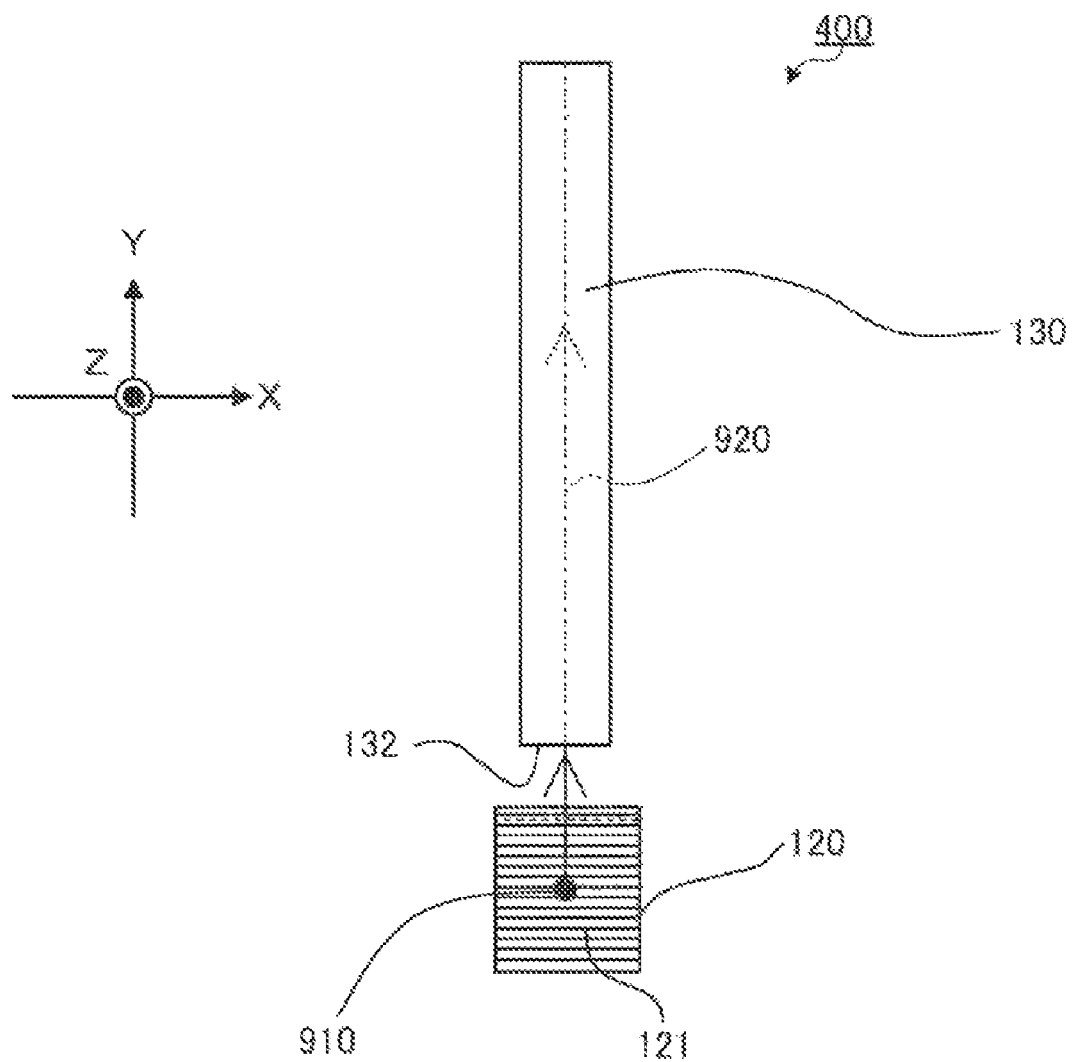
FIG. 46 is a side view of the planar light source apparatus shown in FIG. 39.

FIG. 46 is a side view showing planar light source apparatus 400 shown in FIG. 39 from the Z axis direction, and corresponds to FIG. 16 of Embodiment 1.

As shown in FIG. 46, planar light source apparatus 400 is formed such that groove structures 122 of reflection-type diffusing plate 120 are parallel to first end surface 132 of light guiding plate 130. Further, planar light source apparatus 400 is formed such that incident direction 910 of a laser light incident on diffusing plate reflecting surface 121 is parallel to the Z axis direction, and emission directions 920 of diffusely-reflected lights are oriented toward the inside of light guiding plate 130 through first end surface 132 of light guiding plate 130.

Further, similar to Embodiment 1, light guiding plate 130 may have a flat shape having a wedge cross-section.

Figure 47:
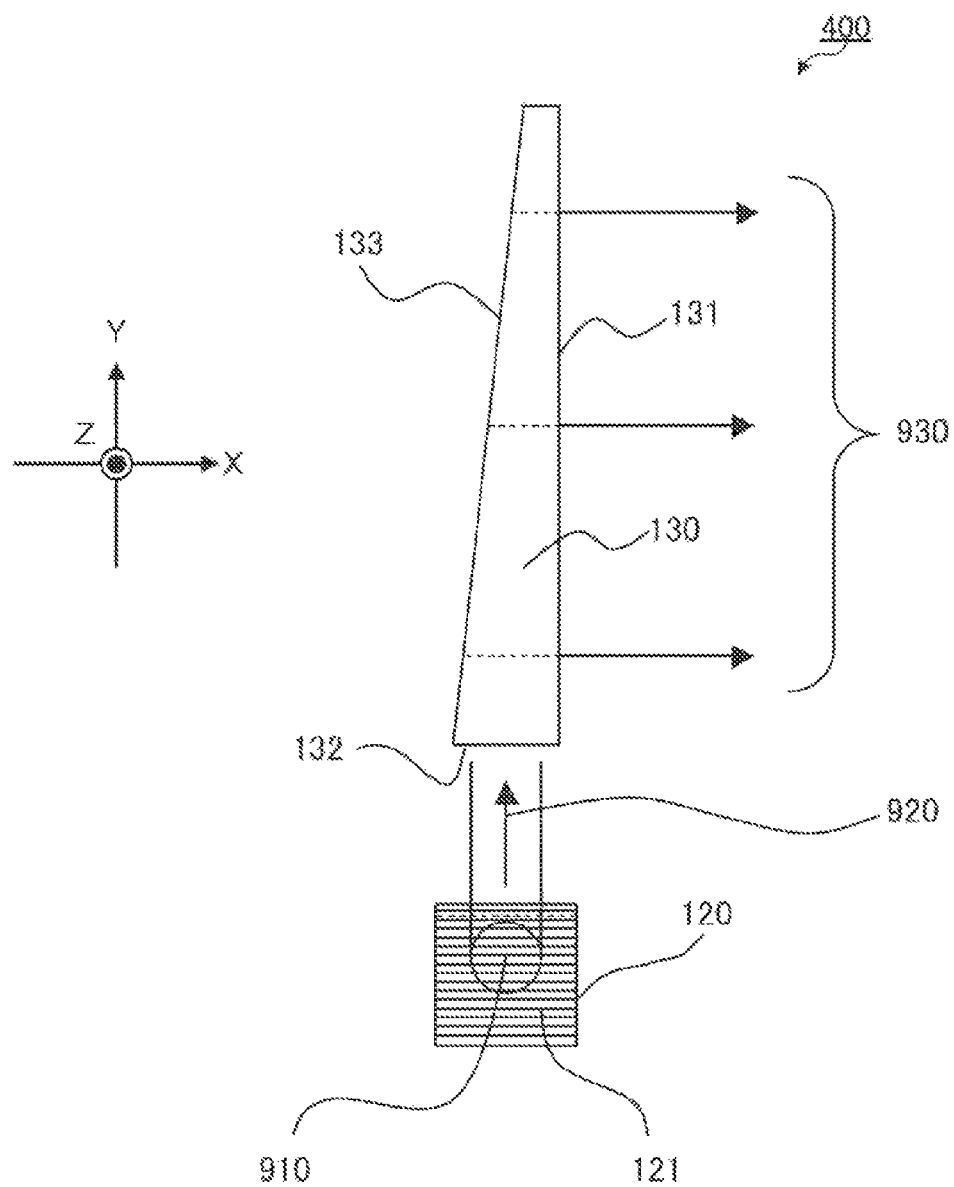
FIG. 47 is a side view of a planar light source apparatus in case where a light guiding plate having a wedge cross-section is used according to Embodiment 4.

FIG. 47 is a side view of a planar light source apparatus in case where a light guiding plate having a wedge cross-section is used, and corresponds to FIG. 46 and FIG. 17 of Embodiment 1.

As shown in FIG. 47, in case where back surface 133 of light guiding plate 130 is inclined toward first end surface 132, for example, diffusely-reflected lights of reflection-type diffusing plate 120 are made parallel lights that have a predetermined width in the X axis direction on the X-Y plane, and emission directions 920 of the diffusely-reflected lights are coordinated in the Y axis direction. By this means, the light propagates a shorter distance inside light guiding plate 130, so that it is possible to convert diffuse reflected lights into planar light 930 at high conversion efficiency.

Note that, similar to Embodiment 1, planar light source apparatus 400 according to the present embodiment can also be used as the light source for liquid crystal display apparatuses.

Thus, planar light source apparatus 400 according to the present embodiment has linear lights by radiating a laser light from laser source 110 in an arcuate pattern by reflected diffusion, and, consequently, can have a planar light of a wide and uniform distribution of light intensity, from a laser light which is a spot light. Moreover, using reflection-type diffusing plate 120 that is an optical component with a simple configuration having groove is structures 122 in the reflecting surface, it is possible to have this planar light. Further, reflection-type diffusing plate 120 employs a configuration including a margin around the position on which a laser light is incident, so that it is possible to arrange the optical system easily. Accordingly, it is possible to provide, for example, a planar light source apparatus that emits a wide and quality planar light and a liquid crystal display apparatus with a quality large screen, at low cost.

Hereinafter, applications of planar light source apparatus 400 according to Embodiment 4 will be explained.

(Application 1 of Embodiment 4)

Figure 48A:
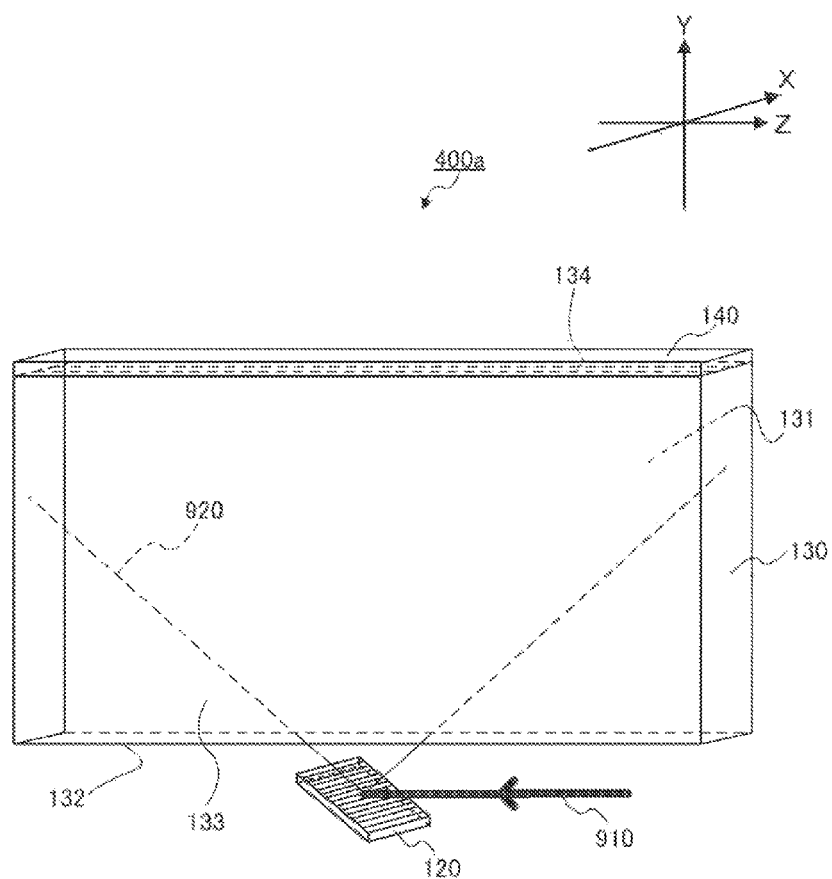
FIG. 48A is a perspective view showing a configuration of a planar light source apparatus according to Application 1 of Embodiment 4.

FIG. 48A is a perspective view showing a configuration of a planar light source apparatus according to Application 1 of Embodiment 4, and corresponds to FIG. 39 and FIG. 18A of Embodiment 1. As shown in FIG. 48A, in addition to the configuration shown in FIG. 39, this planar light source apparatus 400a has second reflecting plate 140 as a reflecting member, in second end surface 134 of light guiding plate 130.

Figure 48B:
FIG. 48B is a perspective view showing only a configuration of a second reflecting plate shown in FIG. 48A.

FIG. 48B is a perspective view showing only a configuration of second reflecting plate 140 shown in FIG. 48A, and corresponds to FIG. 18B of Embodiment 1. As shown in FIG. 48B, in the surface on the light guiding plate 130 side of second reflecting plate 140, a plurality of fine groove structures 141 are formed extending in parallel to the Z axis direction. For example, the shapes of groove structures 122 shown in FIG. 44 are applicable to these groove structures 141. In this case, second reflecting plate 140 radiates a light from light guiding plate 130, in an arcuate shape such that the light is widened in the X axis direction by reflected diffusion.

This planar light source apparatus 400a can further diffuse, in the X axis direction, the diffusely-reflected lights having diffused and propagated inside light guiding plate 130 in to the Z axis direction, and reached second end surface 134. By this means, the laser light diffused in the Z axis direction is further diffused in the X axis direction, and is collected from emission surface 131 of light guiding plate 130. Further, the degree of diffusion in the traveling direction of a light propagating inside becomes higher, so that it is possible to have a planar light of a more uniform distribution of light intensity.

Note that, similar to Embodiment 1, instead of second reflecting plate 140 having groove structures 141, various reflecting plates or reflecting mirrors that can diffuse reflected lights may be used. The same applies to the following reflecting plates explained below.

Figure 49:
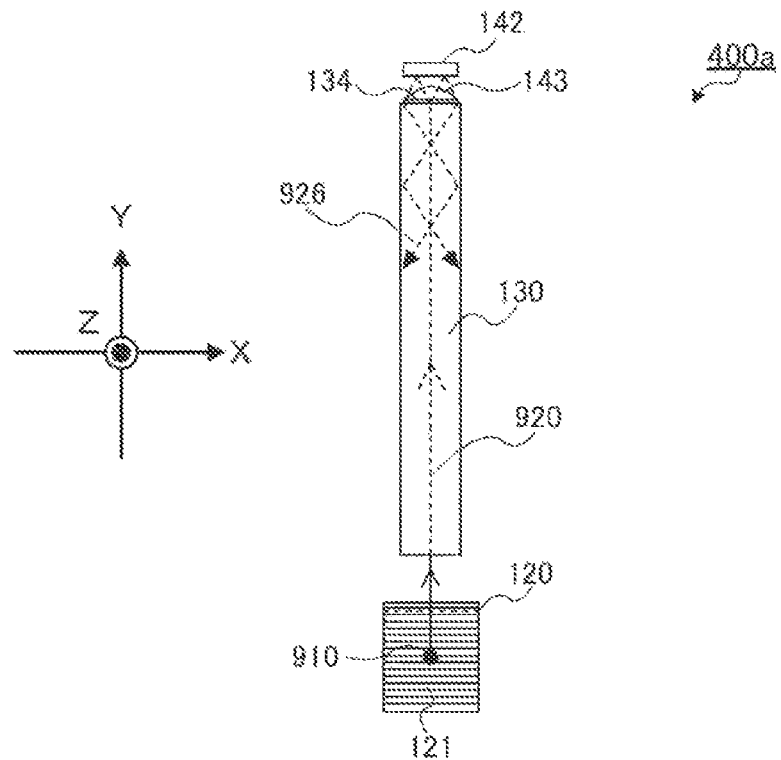
FIG. 49 is a side view of a planar light source apparatus using a reflecting mirror according to Application 1 of Embodiment 4.

FIG. 49 is a side view of a planar light source apparatus in case where a reflecting mirror is used, and corresponds to FIG. 46, FIG. 48 and FIG. 19 of Embodiment 1.

As shown in FIG. 49, this planar light source apparatus 400a has reflecting mirror 142 and cylindrical lens 143 instead of second reflecting plate 140 shown in FIG. 48. Reflecting mirror 142 is arranged to face second end surface 134 of light guiding plate 130. Cylindrical lens 143 is arranged between second end surface 134 and reflecting mirror 142, and narrows down a laser light emitted from second end surface 134, in the X axis direction and allows the laser light to be incident on reflecting mirror 142. According to this configuration, it is possible to spread emission direction 926 of the laser light emitted from reflecting mirror 142 and propagating inside light guiding plate 130, in the X axis direction. Note that, by making the distance between cylindrical lens 143 and reflecting mirror 142 half of the focal distance of cylindrical lens 143 or less, it is possible to increase the angle of focus in the X axis direction with respect to second end surface 134.

Further, as explained in Embodiment 1, it is possible to use the cylindrical lens and original second reflecting plate 140.

Figure 50:
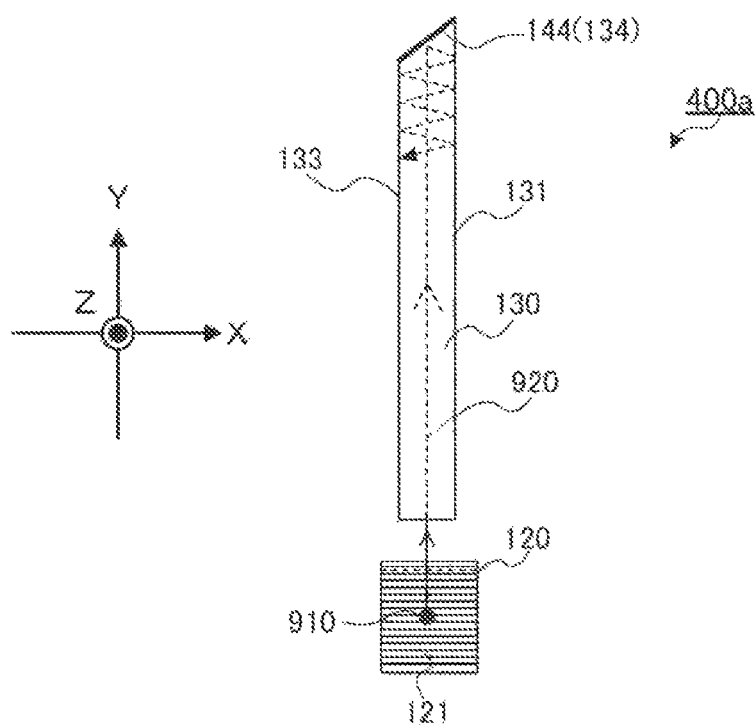
FIG. 50 is a side view of a planar light source apparatus using a mirror-coating surface according to Application 1 of Embodiment 4.

FIG. 50 is a side view of a planar light source apparatus in case where a mirror coating surface inclined at an angle is used, and corresponds to FIG. 46, FIG. 48 and FIG. 20 of Embodiment 1.

As shown in FIG. 50, this planar light source apparatus 400a has mirror coating part 144 inclined at an angle, instead of second reflecting plate 140 shown in FIG. 48. This mirror coating part 144 is formed on second end surface 134 by applying mirror coating to second end surface 134 inclined at an angle such that the X axis direction components are provided in the normal direction. According to this configuration, it is possible to reflect a laser light emitted from diffusing plate reflecting surface 121, on mirror coating part 144 and deflect the laser light in the X axis direction. That is, a laser light propagates inside light guiding plate 130 repeating reflecting between emission surface 131 and back surface 133 of light guiding plate 130, and reaches entire emission surface 131 and entire back surface 133, so that it is possible to collect the laser light from entire emission plane 131.

Note that, as explained in Embodiment 1, instead of second reflecting plate 140, it is possible to use a reflection-type diffusing plate in which grooves are carved in the X axis direction.

(Application 2 of Embodiment 4)

Figure 51A:
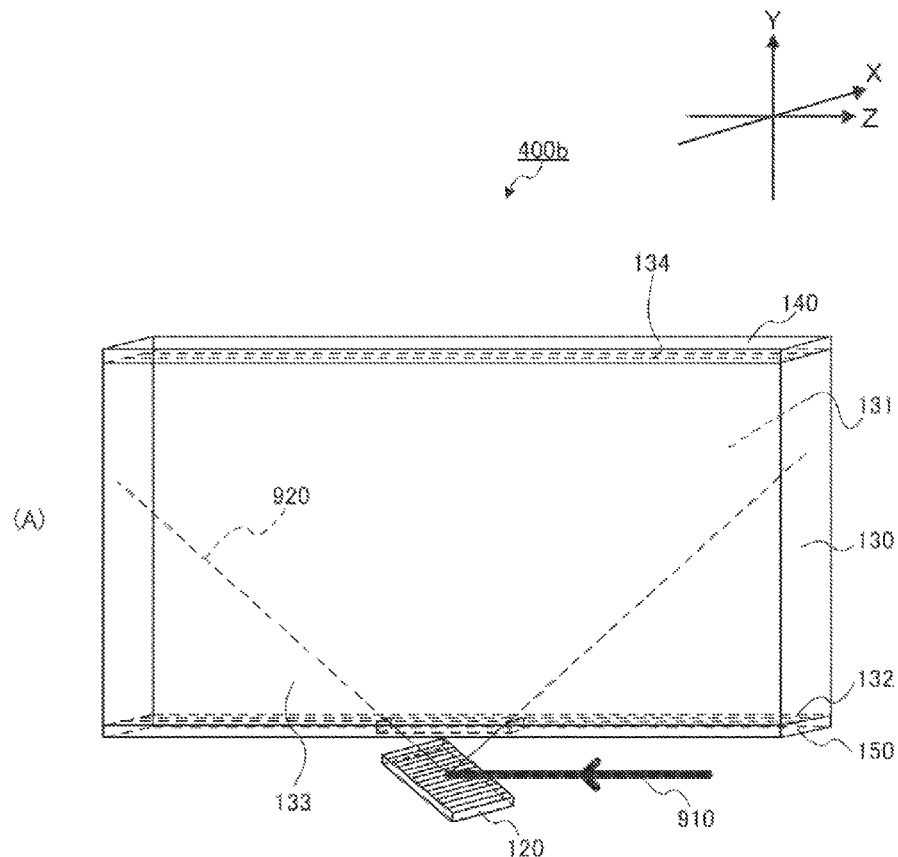
FIG. 51A is a perspective view showing a configuration of a planar light source apparatus according to Application 2 of Embodiment 4.

FIG. 51A is a perspective view showing a configuration of a planar light source apparatus according to Application 2 of Embodiment 4, and corresponds to FIG. 48 and FIG. 21A of Embodiment 1. As shown in FIG. 51A, in addition to the configuration shown in FIG. 48A, this planar light source apparatus 400b has first reflecting plate 150 as a reflecting member, in first end surface 132 of light guiding plate 130.

Figure 51B:
FIG. 51B is a perspective view showing only a configuration of a first reflecting plate shown in FIG. 51A.

FIG. 51B is a perspective view showing only a configuration of first reflecting plate 150 shown in FIG. 51A, and corresponds to FIG. 21B of Embodiment 1. As shown in FIG. 51B, in first reflecting plate 150, opening 152 is formed in an area where diffusely-reflected lights from reflection-type diffusing plate 120 pass. Further, in the surface on the light guiding plate 130 side of first reflecting plate 150, a plurality of fine groove structures 151 are formed extending in parallel to the Z axis direction. For example, the shapes of groove structures 122 shown in FIG. 44 are applicable to these groove structures 151. In this case, first reflecting plate 150 radiates a light from light guiding plate 130, in an arcuate pattern such that the light is widened in the X axis direction by reflected diffusion.

This planar light source apparatus 400b can further diffuse, in the X axis direction, a light having diffused back and forth inside light guiding plate 130 and returned to first end surface 132, without blocking optical paths of diffusely-reflected lights when the diffusely-reflected lights are incident on light guiding plate 130, and have a planar light of a more uniform distribution of light intensity. Further, with the configuration shown in FIG. 48A, lights that cannot be collected from emission plane 131 among lights having been reflected on second end surface 134 and returned are not utilized. With the configuration shown in FIG. 51A, lights that cannot be collected from this emission surface 131 are reutilized, so that it is possible to increase the brightness of a planar light collected from emission surface 131. As a means for reutilizing lights, instead of first reflecting plate 150, a reflecting member such as a mirror or a reflecting plate with an opening can also be used.

(Application 3 of Embodiment 4)

Figure 52A:
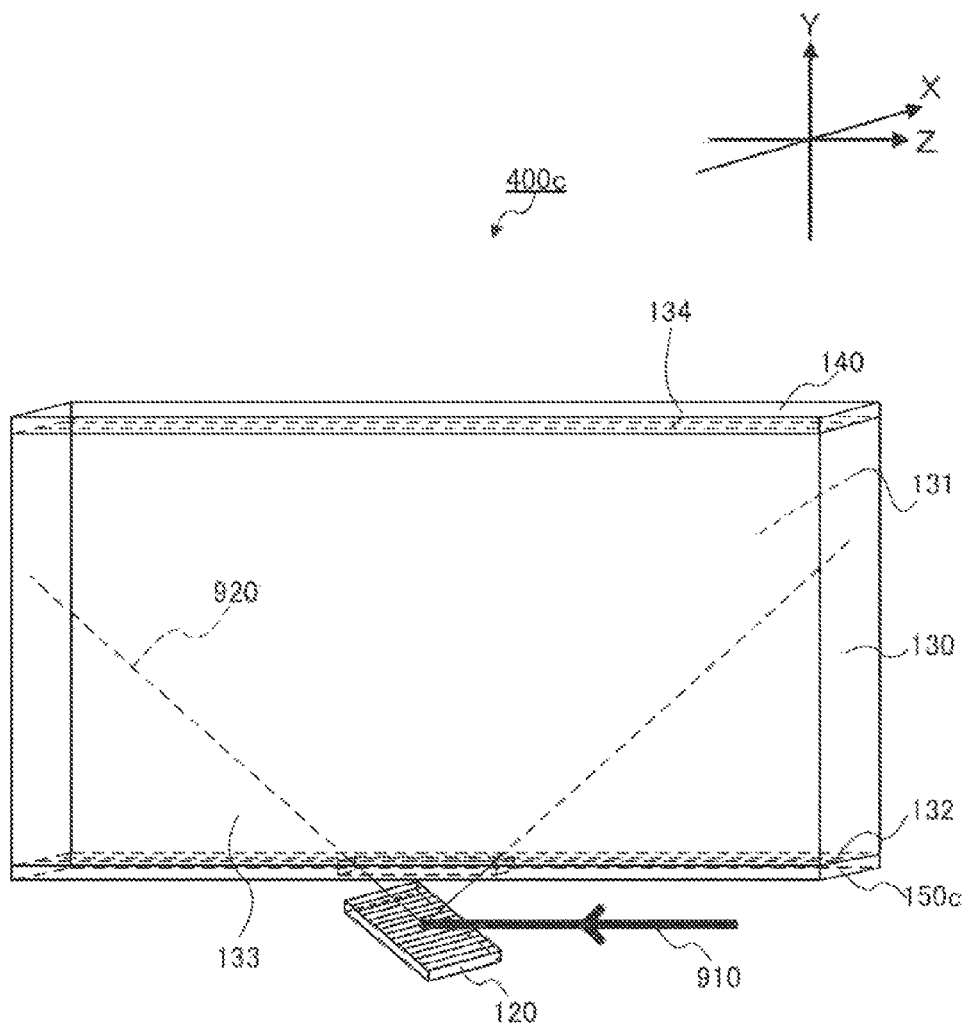
FIG. 52A is a perspective view showing a configuration of a planar light source apparatus according to Application 3 of Embodiment 4.

FIG. 52A is a perspective view showing a configuration of a planar light source apparatus according to Application 3 of Embodiment 4, and corresponds to FIG. 51A and FIG. 22A of Embodiment 1. As shown in FIG. 52A, this planar light source apparatus 400c has another first reflecting plate 150c instead of first reflecting plate 150 of FIG. 51A.

Figure 52B:
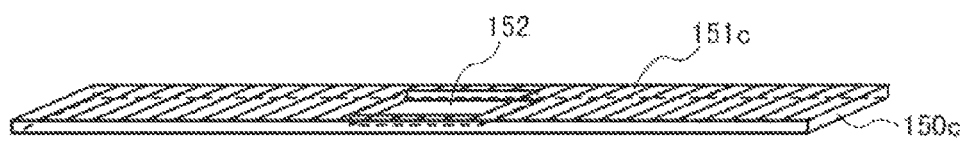
FIG. 52B is a perspective view showing only a configuration of a first reflecting plate shown in FIG. 52A.

FIG. 52B is a perspective view showing only a configuration of first reflecting plate 150c shown in FIG. 52A, and corresponds to FIG. 22B of Embodiment 1. As shown in FIG. 52B, in the surface on the light guiding plate 130 side of first reflecting plate 150c, a plurality of fine groove structures 151c are formed extending in parallel to the X axis direction. For example, the shapes of groove structures 122 shown in FIG. 44 are applicable to these groove structures 151c. In this case, first reflecting plate 150c radiates a light from light guiding plate 130, in an arcuate pattern such that the light is widened in the Z axis direction by reflected diffusion.

This planar light source apparatus 400c can further diffuse, in the Z axis direction, the light having diffused back and forth inside light guiding plate 130 and returned to first end to surface 132, without blocking optical paths of diffusely-reflected lights when the diffusely-reflected lights are incident on light guiding plate 130, and have a planar light of a more uniform distribution of light intensity.

(Application 4 of Embodiment 4)

Figure 53A:
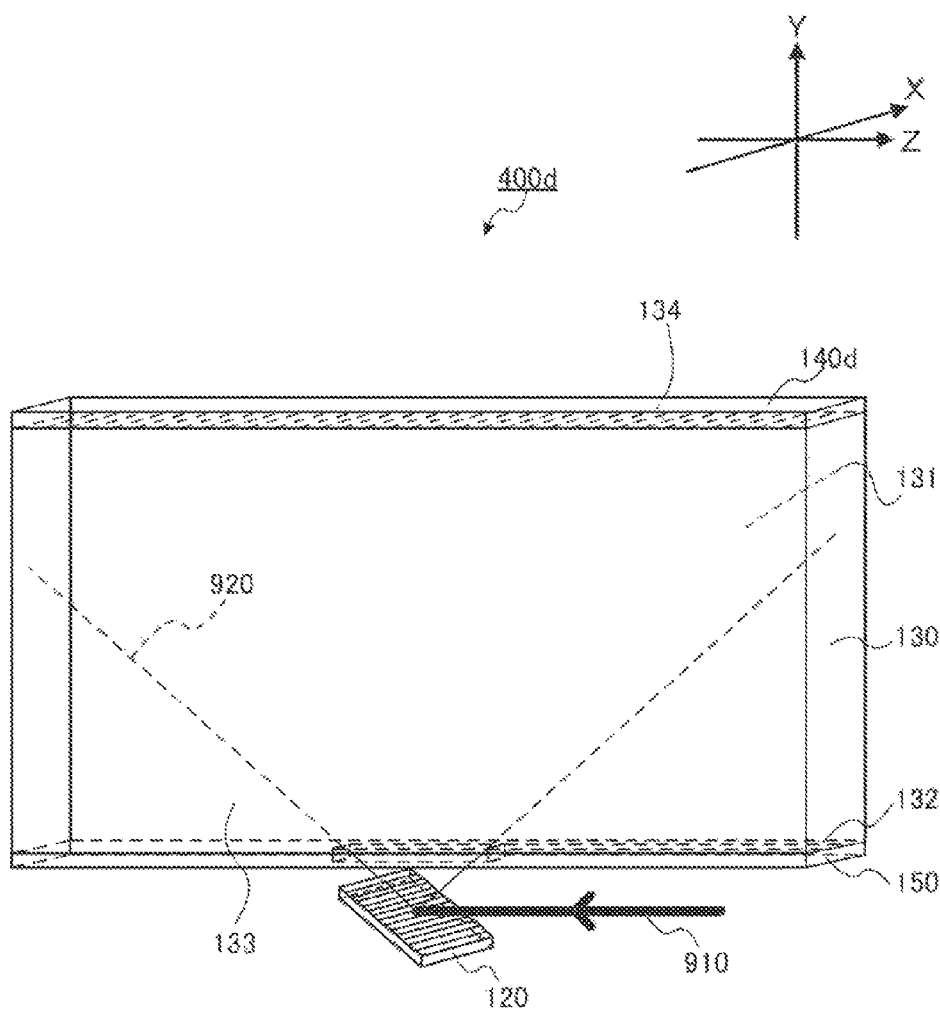
FIG. 53A is a perspective view showing a configuration of a planar light source apparatus according to Application 4 of Embodiment 4.

FIG. 53A is a perspective view showing a configuration of a planar light source apparatus according to Application 4 of Embodiment 4, and corresponds to FIG. 51A and FIG. 23A of Embodiment 1. As shown in FIG. 53A, instead of second reflecting plate 140 of FIG. 51A, planar light source apparatus 400d has another second reflecting plate 140d.

Figure 53B:
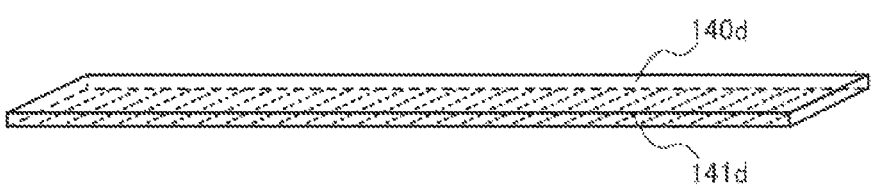
FIG. 53B is a perspective view showing only a configuration of a second reflecting plate shown in FIG. 53A.

FIG. 53B is a perspective view showing only a configuration of second reflecting plate 140d shown in FIG. 53A, and corresponds to FIG. 23B of Embodiment 1. As shown in FIG. 53B, in the surface on the light guiding plate 130 side of second reflecting plate 140d, a plurality of fine groove structures 141d are formed extending in parallel to the X axis direction. For example, the shapes of groove structures 122 shown in FIG. 44 are applicable to these groove structures 141d. In this case, second reflecting plate 140d radiates a light from light guiding plate 130, in an arcuate pattern such that the light is widened in the Z axis direction by reflected diffusion.

This planar light source apparatus 400d can further diffuse, in the Z axis direction, the diffusely-reflected lights having diffused and propagated inside light guiding plate 130, and reached second end surface 134, without blocking optical paths of the diffusely-reflected lights when the diffusely-reflected lights are incident on light guiding plate 130. Then, planar light source apparatus 400d can further diffuse, in the X axis direction, the lights having diffused sufficiently in the Z axis direction and returned to first end surface 132. By this means, it is possible to have a planar light of a more uniform distribution of light intensity. Further, by using another first reflecting plate 150c shown in FIG. 52A instead of first reflecting plate 150, it is possible to make the distribution of light intensity more uniform in the Z axis direction.

Note that, as explained using FIG. 24, beam densities of to diffusely-reflected lights vary in case where groove structures of the reflection-type diffusing member are formed at equal intervals. In case where a light is incident at an angle in the drawings: not vertically, the density of the light becomes lower farther apart from the zero-order light. As a means for removing such unevenness in brightness, it is effective to vary intervals to arrange groove structures formed in reflection-type diffusing member 120 (140 or 150) as shown in FIG. 25 and FIG. 26.

Further, by diffusing by reflection a light with reflection-type diffusing optical system 720 (to be more specific, see 720a, 720b and 720c of FIG. 54 to FIG. 56 described later) combining a plurality of reflection-type diffusing plates 120 before the light is incident on light guiding plate 130, it is possible to widen the width to spread a laser light, and allow the laser light to be incident on light guiding plate 130 in a state where the variability of beam densities is made uniform.

Figure 54:
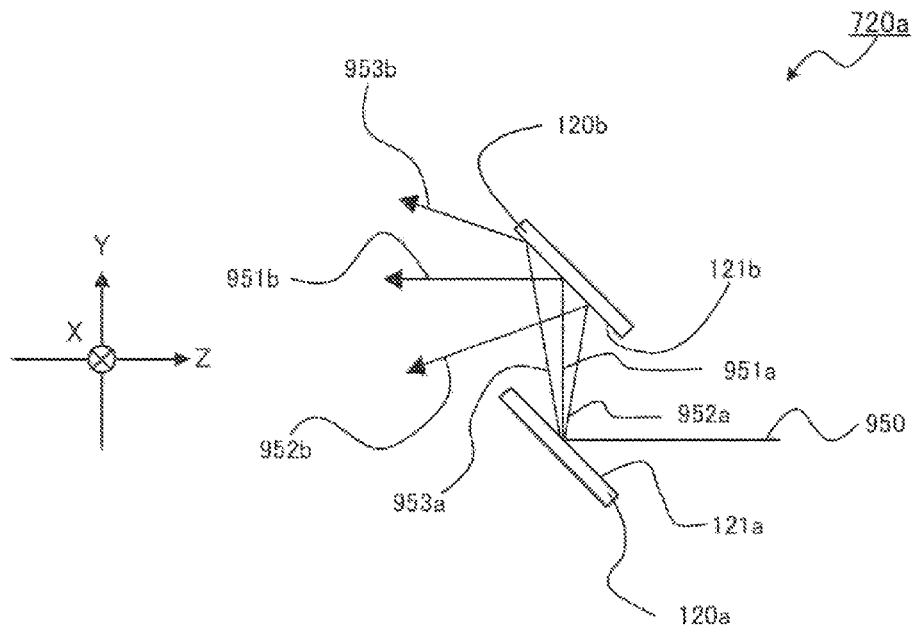
FIG. 54 is a schematic diagram showing an example of a reflection-type diffusing optical system according to Embodiment 4.

FIG. 54 is a schematic diagram showing an example of a reflection-type diffusing optical system combining two reflection-type diffusing plates 120.

As shown in FIG. 54, this reflection-type diffusing optical system 720a is formed with two reflection-type diffusing plates 120, that is, reflection-type diffusing plate 120a and reflection-type diffusing plate 120b, and has diffusing plate reflecting surface 121 in the surface on which incident light 950 incident in parallel to the Z axis is incident. A case is assumed here where, for example, in diffusing plate reflecting surface 121, inclined surfaces having inclining angles of ±γ degrees at maximum with respect to flat portions of diffusing plate reflecting surface 121 are formed, and an incident laser light is reflected on diffusing plate reflecting surface 121 once and is emitted. In this case, laser lights reflected and diffused on reflection-type diffusing plate 120a have diffusion angles of ±2γ degrees at maximum with respect to zero-order light 951a. Then, the laser lights reflected and diffused on reflection-type diffusing plate 120b have diffusion angles ±4γ degrees at maximum with respect to zero-order light 951b. Thus, every time a laser light is diffusely reflected on reflection-type diffusing plate 120 employing the to same configuration, the maximum diffusion angle of the laser light can be increased ±2γ degrees at a time. Note that, with the example of FIG. 54, groove structures 122 are formed in the X axis direction, and the laser light is diffused in the Y-Z plane.

Figure 55:
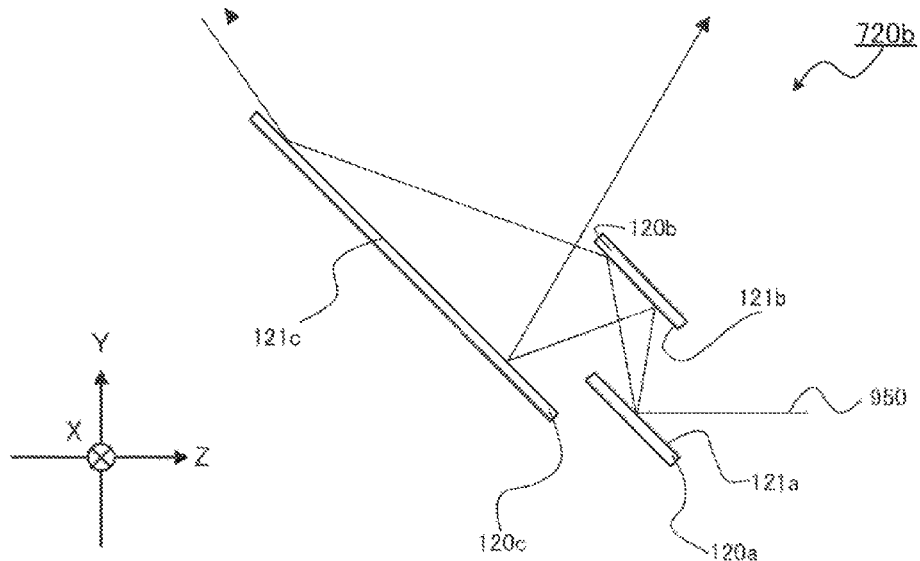
FIG. 55 is a schematic diagram showing another example of a reflection-type diffusing optical system according to Embodiment 4.

FIG. 55 is a schematic diagram showing an example of reflection-type diffusing optical system 720b combining three reflection-type diffusing plate 120. Note that, although not shown, four, five or more reflection-type diffusing plates 120 can be connected in the same way.

Figure 56:
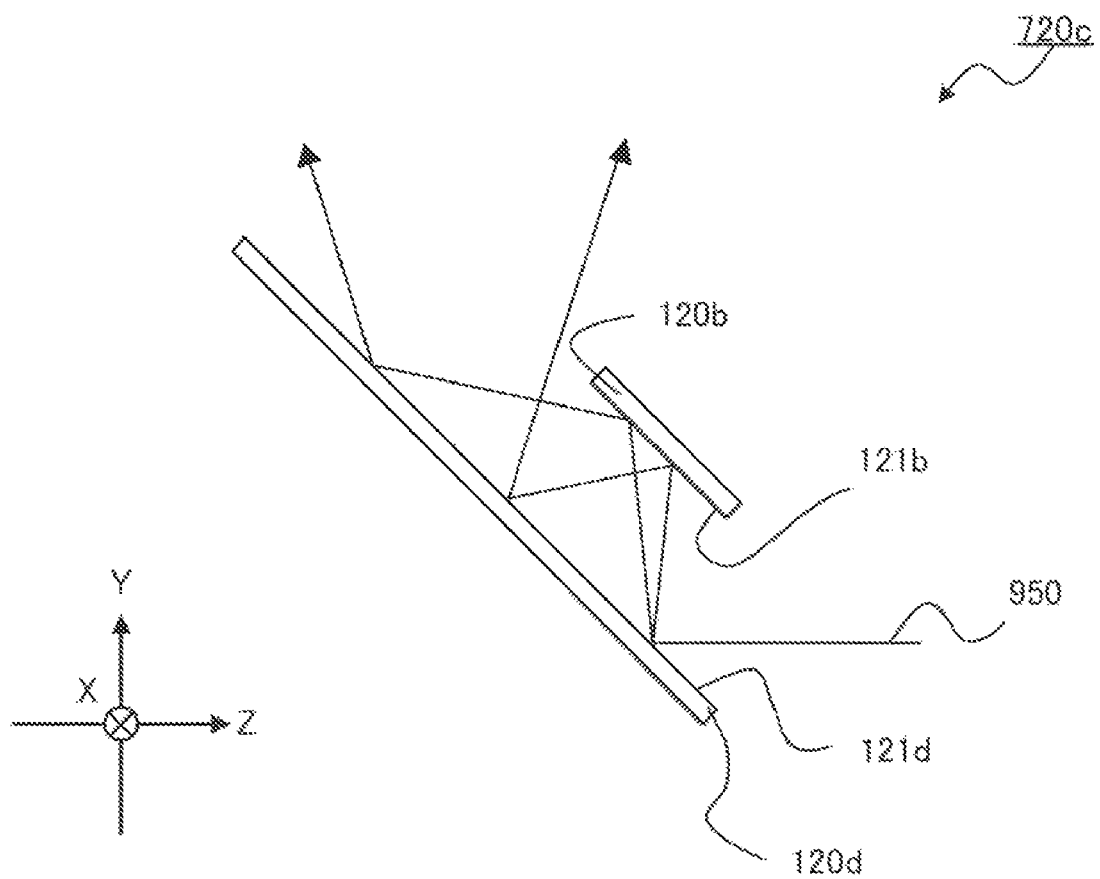
FIG. 56 is a schematic diagram showing another example of a reflection-type diffusing optical system according to Embodiment 4.

By contrast with this, depending on the angle of incidence of incident light 950 and the characteristics of a diffusion angle of reflection-type diffusing plate 120, it is possible to combine reflection-type diffusing plate 120a and reflection-type diffusing plate 120c of FIG. 55 as one reflection-type diffusing plate 120d as in reflection-type diffusing optical system 720c of FIG. 56.

Here, reflection-type diffusing plate 120 or diffusing plate reflecting surface 121 on which a laser light is incident after the third time can be replaced with, for example, a mirror, a mirror surface reflecting surface or a total reflecting surface. In this cage, while the maximum diffusion angle is not increased, only deflection of a light is performed. Further, in diffusing plate reflecting surface 121 on which a laser light is incident after the second time, it is possible to use the above method of making the variability of beam densities uniform.

Further, it is possible to not only use reflecting-type diffusing plates in which groove structures are formed in the same direction, but also use, for example, the combination of a reflection-type diffusing plate in which groove structures are formed in the X axis direction and a reflection-type diffusing plate in which groove structures are formed in the direction orthogonal to the X axis direction.

Above-described reflection-type diffusing optical system 720 can be used instead of reflection-type diffusing plate 120 in the above-explained embodiments. Further, the same applies to the following embodiment explained below. Furthermore, it is possible to collimate diffusion lights emitted from reflection-type diffusing optical system 720 by a Fresnel lens and so on, then narrow down the lights in the direction orthogonal to the directions in which lights are diffused, using a cylindrical lens or an aspheric lens, and allow the lights to be incident on light guiding plate 130.

(Embodiment 5)

Here, a planar light source apparatus that makes a device such that the distance from a reflection-type diffusing plate to a surface of a light guiding plate on which diffusely-reflected lights are incident is made longer, will be explained as Embodiment 5 of the present invention.

Figure 57:
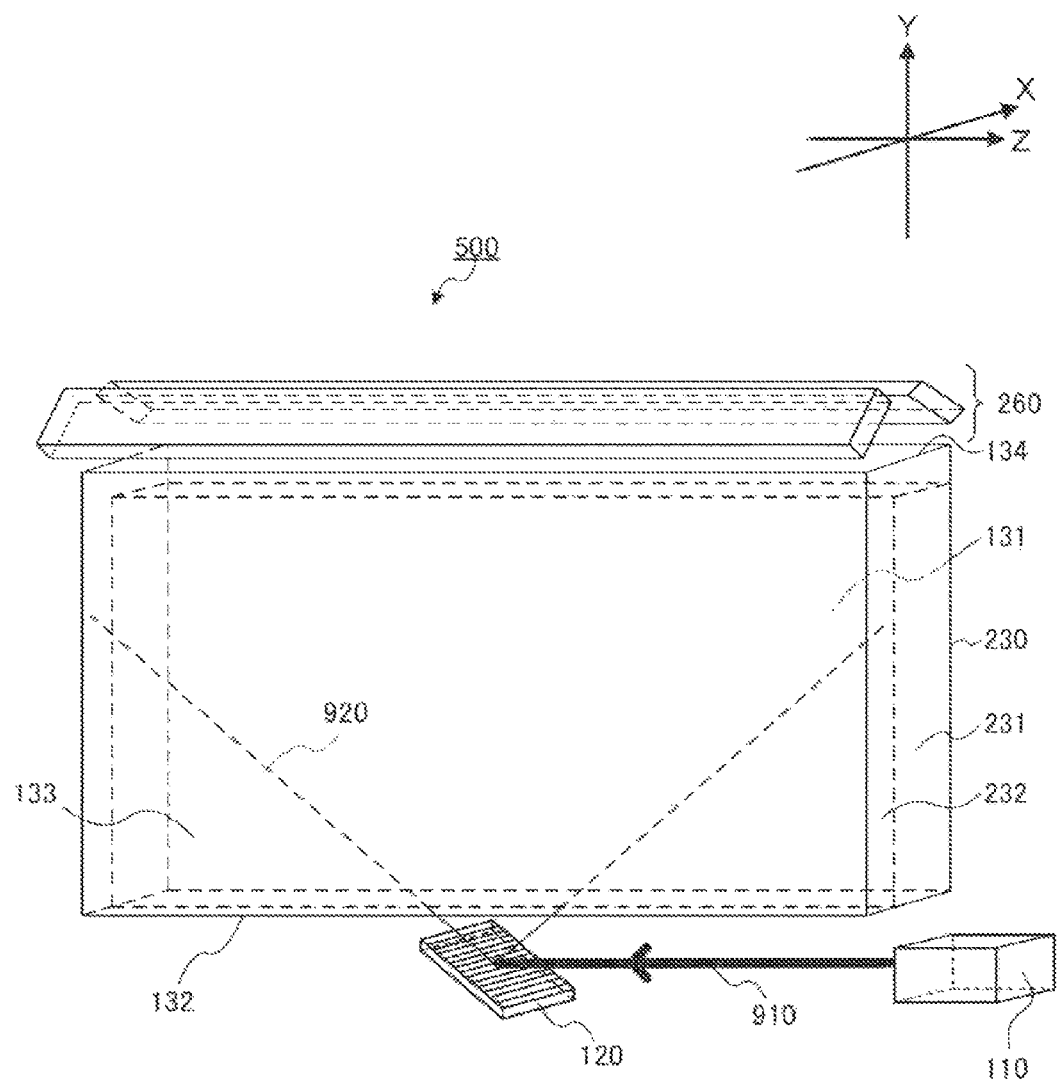
FIG. 57 is a perspective view showing a configuration of a planar light source apparatus according to Embodiment 5 of the present invention.

FIG. 57 is a perspective view showing a configuration of planar light source apparatus 500 according to Embodiment 5, and corresponds to FIG. 27 of Embodiment 2 and FIG. 39A of Embodiment 4.

As shown in FIG. 57, this planar light source apparatus 500 has light guiding plate 230 employing a different configuration from light guiding plate 130 shown in FIG. 39, and light deflecting part 260.

Light guiding plate 230 includes solid part 231 and hollow part 232 inside on the back surface 133 side. Solid part 231 has a size Virtually matching with emission surface 131, and matches light guiding plate 130 according to Embodiment 4. Further, hollow part 232 is provided between solid part 231 and back surface 133 of light guiding plate 230, and openings are each provided in first end surface 132 below which reflection-type diffusing plate 120 is arranged, and in second end surface 134 on the opposite side of first end surface 132.

Reflection-type diffusing plate 120 radiates an incident laser light in an arcuate pattern such that the laser light is widened in the Z axis direction by reflected diffusion, and allows the laser light to be incident on light deflecting part 260 through hollow part 232 of light guiding plate 230.

Light deflecting part 260 includes a pair of reflecting mirrors arranged on the second end surface 134 side of light guiding plate 230, and returns the light emitted from the above opening on the second end surface 134 side and allows the light to be incident on light guiding plate 230. To be more specific, light deflecting part 260 deflects lights incident from reflection-type diffusing plate 120 through hollow part 232, and allows the lights to be incident on second end surface 134 on the emission surface 131 side of light guiding plate 230.

Figure 58:
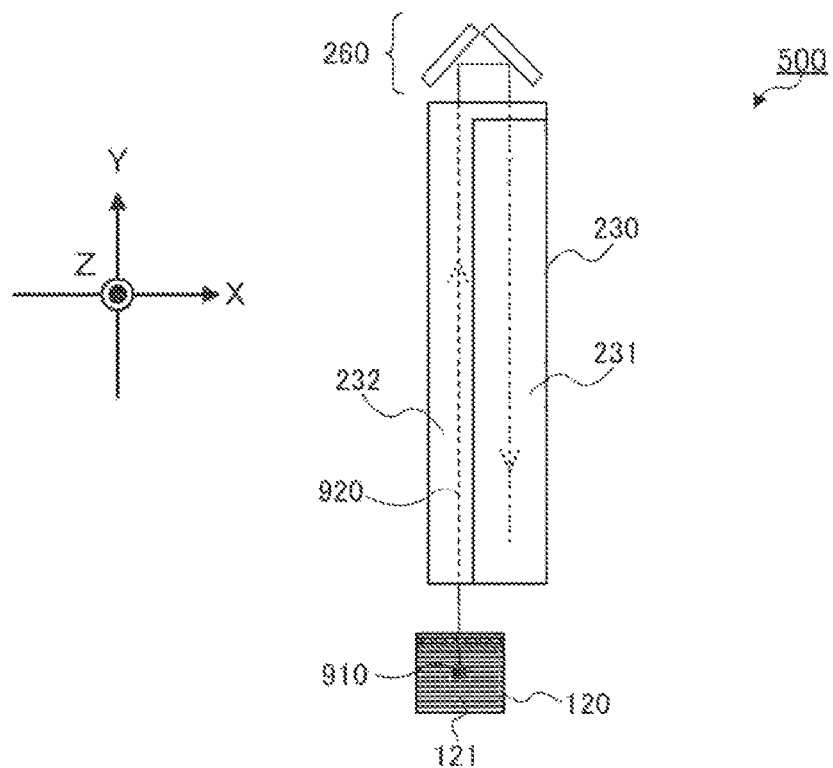
FIG. 58 is a side view of the planar light source apparatus shown in FIG. 57.

FIG. 58 is a side view showing planar light source apparatus 500 shown in FIG. 57 from the Z axis direction, and corresponds to FIG. 28 of Embodiment 2.

As shown in FIG. 58, diffusely-reflected lights from reflection-type diffusing plate 120 pass hollow part 232, and then are returned by light deflecting part 260 and are incident on light guiding plate 230. Compared to FIG. 46 of Embodiment 4, planar light source apparatus 500 according to the present embodiment allows lights to propagate a longer distance until they are incident on light guiding plate 230 after they are emitted from reflection-type diffusing plate 120.

Thus, planar light source apparatus 500 of the present embodiment can allows lights to propagate a longer distance until they are incident on light guiding plate 230 after they are emitted from reflection-type diffusing plate 120, and, consequently, easily earn the distance to diffuse a light. Further, if lights propagate a long distance until they are incident on light guiding plate 230, there is a possibility that diffusely-reflected lights are diffused unnecessarily. However, with the present embodiment, hollow part 232 inside light guiding plate 230 is utilized, so that it is possible to prevent lights from being diffused unnecessarily.

Note that, in case where the beam width can be secured in the X axis direction, it is equally possible to make the portion removing hollow part 232 of light guiding plate 230 a wedge shape like light guiding plate 130 shown in FIG. 47 of Embodiment 4.

Hereinafter, applications of planar light source apparatus 500 according to Embodiment 5 will be explained.

(Application 1 of Embodiment 5)

Figure 59:
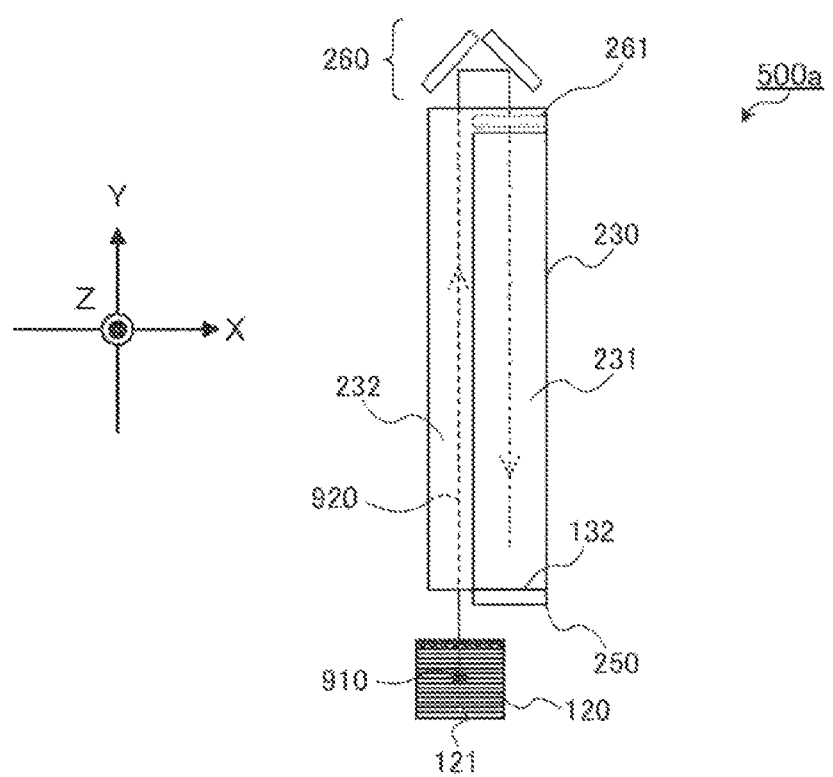
FIG. 59 is a side view of a planar light source apparatus according to Application 1 of Embodiment 5.

FIG. 59 is a side view showing a planar light source apparatus according to Application 1 of Embodiment 5 from the Z axis direction, and corresponds to FIG. 29 of Embodiment 2. As shown in FIG. 59, with this planar light source apparatus 500a, cylindrical Fresnel lens 261 is arranged as a collimator, on the optical paths for diffusely-reflected lights to reach light guiding to plate 230 from light deflecting part 260, and first reflecting plate 250 employing, for example, a configuration without opening 152 in first reflecting plate 150 shown in FIG. 51B of Embodiment 4, is arranged on the first end surface 132 side of light guiding plate 230. Also in this case, it is possible to vary intervals between grooves as described above. The same applies to Applications 2 and 3 of Embodiment 5 (described later).

Cylindrical Fresnel lens 261 collimates lights having been incident from light deflecting part 260 and having diffused in the Z axis direction, to be parallel lights vertical to the Z axis, and allows the parallel lights to be incident on light guiding plate 230. Note that there are cases where lights reflected on the lateral surfaces of light guiding plate 230 do not become parallel lights. The same applies to the following applications.

This planar light source apparatus 500a can convert a laser light into parallel lights widened to the same width as the width of light guiding plate 230 and allow the parallel lights to be incident on light guiding plate 230, and can further allow the lights to propagate back and forth inside light guiding plate 203. By this means, for example, a light is diffused widely in the Z axis direction by reflection-type diffusing plate 120, and diffusely-reflected lights can be collimated in a state where beam densities in the Z axis direction are made more uniform, so that it is possible to make beam densities more uniform in the Z axis direction at a stage before lights are incident on light guiding plate 230. Further, by providing first reflecting plate 250, it is possible to radiate a light from light guiding plate 230 in an arcuate pattern such that the light is widened in the X axis direction by reflected diffusion, similar to first reflecting plate 150 of FIG. 51B.

(Application 2 of Embodiment 5)

Figure 60:
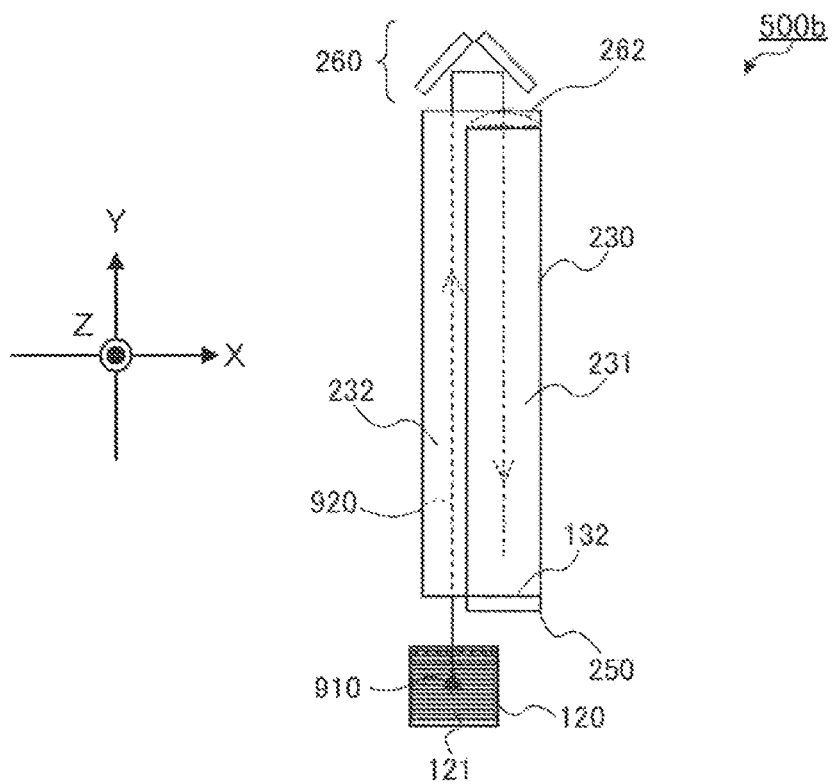
FIG. 60 is a side view of a planar light source apparatus according to Application 2 of Embodiment 5.

FIG. 60 is a side view showing a planar light source apparatus according to Application 2 of Embodiment 5 from the Z axis direction, and corresponds to FIG. 59 and FIG. 30 of Embodiment 2. As shown in FIG. 60, instead of cylindrical Fresnel lens 261, planar light source apparatus 500b arranges aspheric lens 262 as a focus lens on the optical path for diffusely-reflected lights to reach light guiding plate 230 from light deflecting part 260.

Aspheric lens 262 narrows down a light incident from light deflecting part 260, in the X axis direction and allows the light to be incident on light guiding plate 230.

This planar light source apparatus 500b can easily reflect the diffusely-reflected lights back and forth between the main surfaces of light guiding plate 230. By this means, it is possible to diffuse lights widely at a stage after lights are incident on light guiding plate 230, and make the beam density of a planar light uniform.

Note that, similar to Embodiment 2, a reflecting mirror, a reflecting plate or a reflection-type diffusing plate in which grooves are provided in the Z axis direction can also be used instead of first reflecting plate 250, and a cylindrical lens can also be used instead of aspheric lens 262.

(Application 3 of Embodiment 5)

Figure 61:
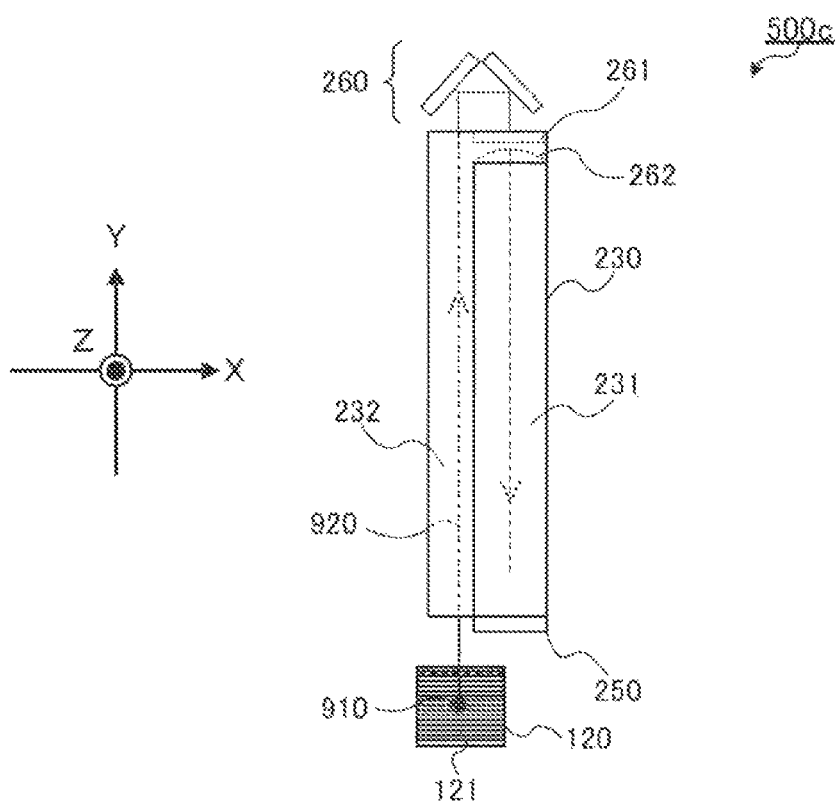
FIG. 61 is a side view of a planar light source apparatus according to Application 3 of Embodiment 5.

FIG. 61 is a side view showing a planar light source apparatus according to Application 3 of Embodiment 5 from the Z axis direction, and corresponds to FIG. 60 and FIG. 31 of Embodiment 2. As shown in FIG. 61, this planar light source apparatus 500c arranges cylindrical lens 261 shown in FIG. 59 and aspheric lens 262 shown in FIG. 60, on the optical paths for diffusely-reflected lights to reach light guiding plate 230 from light deflecting part 260.

This planar light source apparatus 500c can further make the beam density of a planar light uniform.

Note that, although cases have been explained with above-explained Embodiment 4 and Embodiment 5 as examples where a laser light incident on reflection-type diffusing plate 120 is one white laser light, the type of a laser light and the way a laser light is incident on reflection-type diffusing plate 120 are not limited to this.

Hereinafter, a modified example of how a laser light is incident on reflection-type diffusing plate 120 will be explained.

Figure 62:
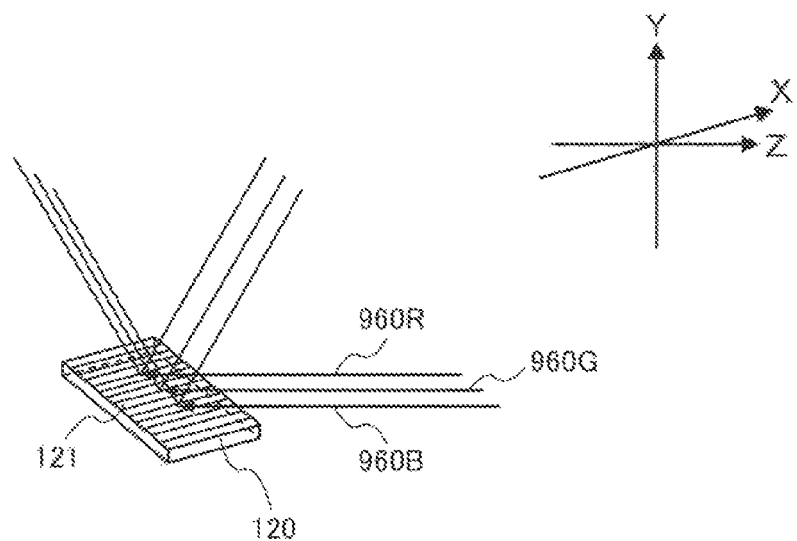
FIG. 62 illustrates a first modified example of how laser lights are incident on a reflection-type diffusing plate according to Embodiment 4.

FIG. 62 illustrates a first modified example of how a laser light is incident on reflection-type diffusing plate 120, and corresponds to FIG. 37 of Embodiment 1. With this modified example, as shown in FIG. 62, laser lights 960R, 960G and 960B of RGB are aligned in the Z axis direction, and are incident individually on reflection-type diffusing plate 120. Note that the positions on which laser lights 960R, 960G and 960B are incident are preferably in a range such that the positions can be virtually regarded as one place. Further, laser lights 960R, 960G and 960B may be aligned in the X axis direction instead of the Z axis direction. Further, in case where laser lights 960R, 960G and 960B have difficulty propagating in parallel to each other at short intervals, laser lights 960 may be incident on diffusing plate reflecting surface 121 at different angles of incidence per color, and the spots to reflect laser lights 960R, 960G and 960B may be adjusted. By this means, a special apparatus for allowing mixed propagation of a laser light of each color needs not to be provided, so that it is possible to miniaturize and provide the apparatus at lower cost.

Figure 63:
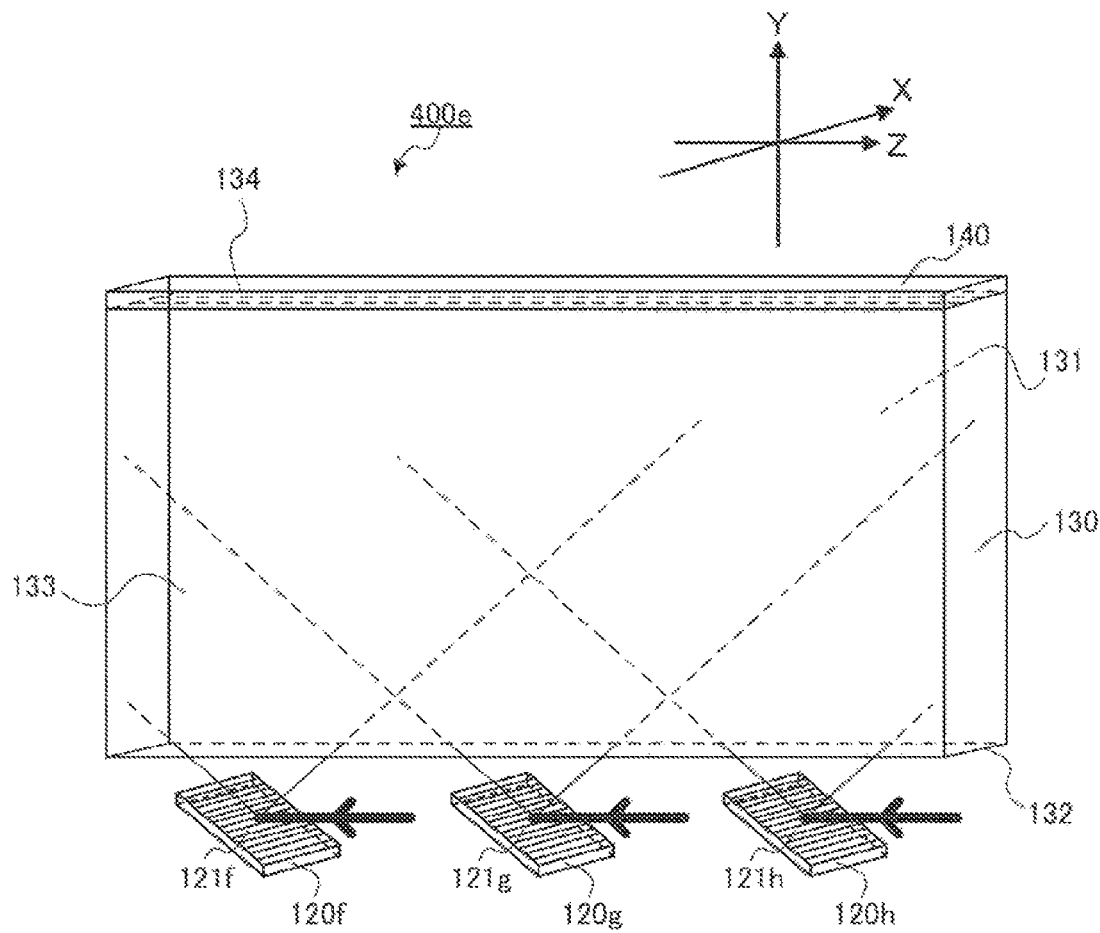
FIG. 63 illustrates a second modified example of how laser lights are incident on a reflection-type diffusing plate according to Embodiment 4.

FIG. 63 illustrates a second modified example of how a laser light is incident on reflection-type diffusing plate 120, and corresponds to FIG. 38 of Embodiment 1 and FIG. 48A of Embodiment 4.

As shown in FIG. 63, planar light source apparatus 400e according to this modified example has a plurality of (here "three") reflection-type diffusing plates 120f, 120g and 120h, on the first end surface 132 side of light guiding plate 130. Further, although not shown, planar light source apparatus 400e has a beam splitter for splitting in a plurality of directions a white laser light emitted from laser light source 110, and an optical system that allows a plurality of white laser lights resulting from the splitting, to be incident on different portions of diffusing plate reflecting surfaces 121f, 121g and 121h of reflection-type diffusing plates 120f, 120g and 120h.

This planar light source apparatus 400e can widen the width of diffusion of diffusely-reflected lights, make brightness of the diffusely-reflected lights vary less and have a more uniform planar light.

Note that, in case where an opening matching an area where diffusely-reflected lights pass, or an area where a laser light passes is provided in the reflection-type diffusing member 120 (140 or 150), a plurality of openings may be provided, or an opening area of the opening may be widened appropriately.

Further, as explained above, it is equally possible to lead a laser light through an optical fiber, replace reflection-type diffusing plates 120f, 120g and 120h with reflection-type diffusing optical system 720, and linear vibrate or rotary vibrate reflection-type diffusing member 120 (140 or 150).

Figure 64:
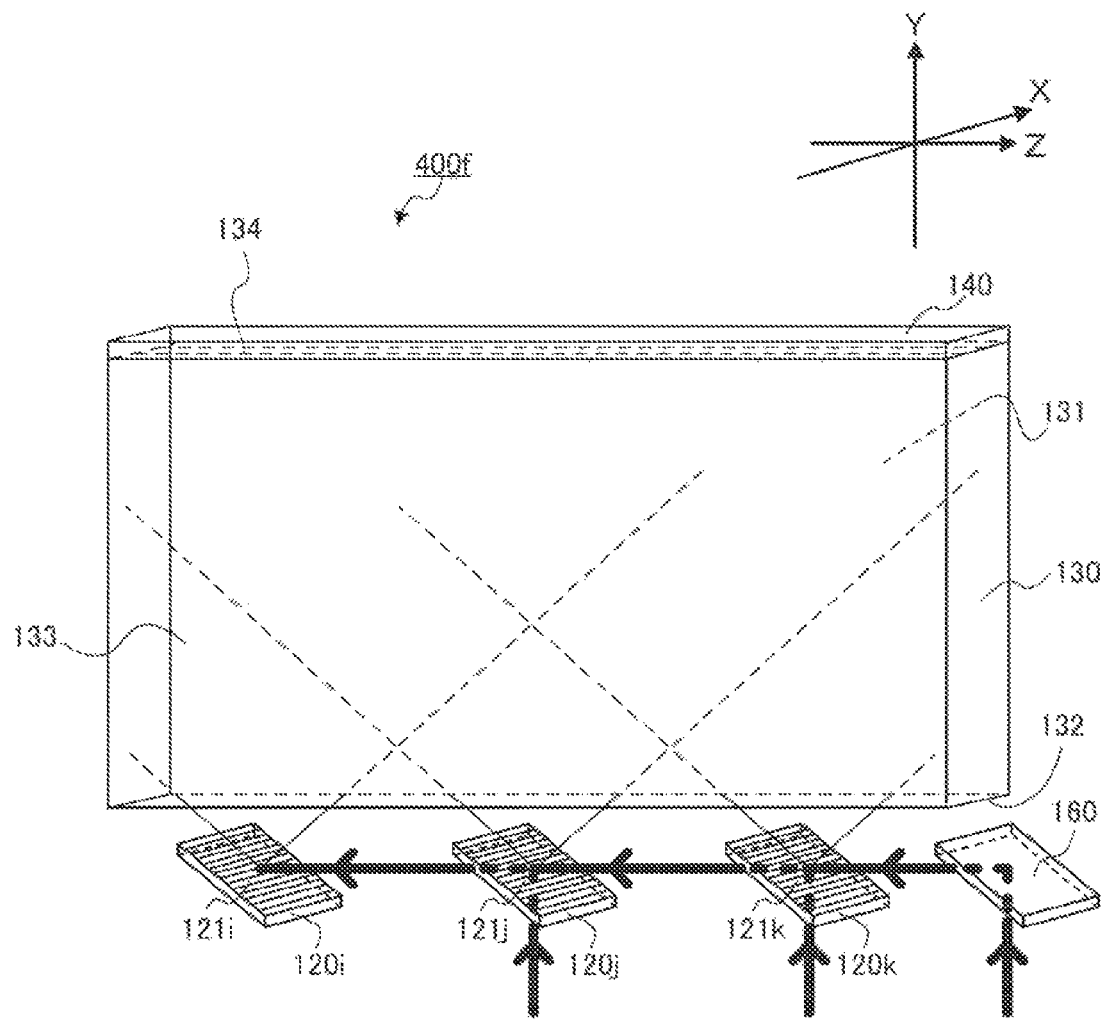
FIG. 64 illustrates a third modified example of how laser lights are incident on a reflection-type diffusing plate according to Embodiment 4.

FIG. 64 illustrates a third modified example of how a laser light is incident on reflection-type diffusing plate 120, and corresponds to FIG. 63. With planar light source apparatus 400f according to this modified example, the way laser light is incident on reflection-type diffusing plate 120 is different from planar light source apparatus 400e of FIG. 63.

Planar light source apparatus 400f has a plurality of (here "three") reflection-type diffusing plates 120i, 120j and 120k on the first end surface 132 side of light guiding plate 130. A mirror is formed in each back surface of reflection-type diffusing plates 120i, 120j and 120k. A laser light having been reflected on the back surface of an adjacent reflection-type diffusing plate and deflected 90 degrees is incident on each diffusing plate reflecting surface 120i, 120j and 120k. Mirror 160 is additionally used to allow the laser light to be incident on reflection-type diffusing plate 120k in the rightmost position in FIG. 64.

With this planar light source apparatus 400f, it is possible to arrange a laser light source below light guiding plate 130 even in a case where the laser light source cannot be arranged between reflection-type diffusing plates.

Further, it is possible to effectively utilize the back surface of each reflection-type diffusing plate, and, consequently, decrease the number of components compared to the case where mirrors are additionally prepared for all reflection-type diffusing plates.

Note that the reflection-type diffusing plates and the reflecting plates including groove structures in the above embodiments are examples of reflection-type diffusing members. Further, the reflecting plates, the reflecting mirrors and the mirror coating parts other than the above reflection-type diffusing members in the above embodiments, are examples of reflecting members of light guiding plates.

The disclosures of Japanese Patent Application No. 2008-072582, filed on Mar. 19, 2008, and Japanese Patent Application No. 2008-203165, filed on Aug. 6, 2008, including the specifications, drawings and abstracts, are incorporated herein by reference in their entirety.

Industrial Applicability

The light source apparatus according to the present invention is useful as a planar light source apparatus that can have a planar light of a wide and uniform distribution of light intensity, from a laser light which is a spot light.

The invention claimed is:

1. A planar light source apparatus comprising:
a laser light source that emits a laser light;
an optical system that comprises at least one or more reflection-type diffusing members that make the light undergo reflected diffusion;
a light guiding plate that is combined with the optical system to convert the reflected and diffused laser light to emit from a main surface,
wherein the at least one reflection-type diffusing member converts the laser light emitted from the laser light source into linear lights having an arcuate radiation pattern.

2. The planar light source apparatus according to claim 1, wherein the reflection-type diffusing member comprises groove structures in a reflecting surface that reflects the laser light.

3. The planar light source apparatus according to claim 2, wherein the groove structures comprise a plurality of convex parts or concave parts of a polygonal cross-section.

4. The planar light source apparatus according to claim 2, wherein the groove structures further comprise fine concavities and convexities in surfaces of the groove structures.

5. The planar light source apparatus according to claim 2, wherein the groove structures comprise a plurality of convex parts or concave parts of an arcuate cross-section.

6. The planar light source apparatus according to claim 2, wherein the groove structures are formed by applying hairline finishing to a metal surface.

7. The planar light source apparatus according to claim 2, wherein intervals to arrange the groove structures have a predetermined distribution in density matching a direction of light reflection such that beam densities of reflected lights become uniform.

8. The planar light source apparatus according to claim 2, wherein the optical system comprises a collimating lens that converts the light incident on the light guiding plate into parallel lights.

9. The planar light source apparatus according to claim 2, wherein the optical system comprises a focus lens that narrows down the light incident on the light guiding plate, in a direction orthogonal to a width direction of the light guiding plate.

10. The planar light source apparatus according to claim 2, wherein the optical system allows the light emitted from the reflection-type diffusing member to propagate on a back side of the light guiding plate, and returns the light on an end surface side of the light guiding plate and allows the light to be incident on the end surface.

11. The light source apparatus according to claim 2, wherein the optical system allows the laser light from the laser light source to pass inside the light guiding plate and to be incident on the reflecting surface.

12. The light source apparatus according to claim 2, wherein the reflection-type diffusing member is arranged in an end surface on which the laser light of the light guiding plate is incident or in a surface facing the end surface, and diffuses and reflects the light from an inside of the light guiding plate and returns the light toward the inside of the light guiding plate.

13. The light source apparatus according to claim 2, wherein the optical system comprises a light guiding plate reflecting member that is arranged in an end surface of the light guiding plate, and reflects or diffuses by reflection the light from an inside of the light guiding plate and returns the light toward the inside of the light guiding plate.

14. The light source apparatus according to claim 13, wherein the light guiding plate comprises a reflecting plate.

15. The light source apparatus according to claim 13, wherein the light guiding plate reflecting member comprises a reflecting mirror.

16. The light source apparatus according to claim 2, wherein the optical system concentrates red, blue and green laser lights, upon one place and allows the lights to be incident on the reflecting surface of the reflection-type diffusing member.

17. The light source apparatus according to claim 2, wherein the optical system mixes red, blue and green laser lights to generate a white laser light, and allows the generated white laser light to be incident on the reflecting surface of the reflection-type diffusing member.

18. The light source apparatus according to claim 2, wherein the optical system comprises an optical fiber to lead the light from the laser light source to the reflecting surface of the reflection-type diffusing member.

19. The light source apparatus according to claim 1, wherein the reflection-type diffusing member performs one of linear vibration and rotary vibration.

20. The light source apparatus according to claim 2, wherein the laser light emitted from the laser light source is incident on the reflection-type diffusing member, from a direction orthogonal to the groove structures upon first diffusion by reflection.

* * * * *